(12) United States Patent
Tanaka

(10) Patent No.: US 8,182,159 B2
(45) Date of Patent: May 22, 2012

(54) LENS ASSEMBLY, OPTICAL DEVICE, OPTICAL AXIS ADJUSTING METHOD FOR AN OPTICAL DEVICE

(75) Inventor: Hirokazu Tanaka, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 484 days.

(21) Appl. No.: 12/311,696

(22) PCT Filed: Dec. 10, 2007

(86) PCT No.: PCT/JP2007/073810
§ 371 (c)(1),
(2), (4) Date: Apr. 9, 2009

(87) PCT Pub. No.: WO2008/078541
PCT Pub. Date: Jul. 3, 2008

(65) Prior Publication Data
US 2009/0269009 A1    Oct. 29, 2009

(30) Foreign Application Priority Data

Dec. 27, 2006 (JP) ................ 2006-352962
Jan. 12, 2007 (JP) ................ 2007-004752

(51) Int. Cl.
*G02B 6/38* (2006.01)
*G02B 6/36* (2006.01)
(52) U.S. Cl. .................... 385/74; 385/73
(58) Field of Classification Search ............ 385/73, 385/74
See application file for complete search history.

(56) References Cited

U.S. PATENT DOCUMENTS

| | | | |
|---|---|---|---|
| 4,563,057 A * | 1/1986 | Ludman et al. | 385/74 |
| 5,682,452 A | 10/1997 | Takahashi | |
| 5,822,478 A | 10/1998 | Kim | |
| 5,917,626 A * | 6/1999 | Lee | 398/88 |
| 6,850,669 B2 * | 2/2005 | Hellman et al. | 385/33 |
| 7,006,728 B1 * | 2/2006 | Jiang et al. | 385/35 |

(Continued)

FOREIGN PATENT DOCUMENTS

JP      3124467    10/2000

(Continued)

OTHER PUBLICATIONS

International Preliminary Report on Patentability and Written Opinion of the International Searching Authority mailed Jul. 9, 2009 for International Application No. PCT/JP2007/073810.

(Continued)

*Primary Examiner* — Michelle R Connelly
(74) *Attorney, Agent, or Firm* — Wenderoth, Lind & Ponack, L.L.P.

(57) ABSTRACT

An optical device includes a first retaining sleeve having a first capillary tube retained therein, the first capillary tube having an optical fiber inserted therein; a second retaining sleeve having a second capillary tube retained therein, the second capillary tube having an optical fiber inserted therein; and a lens assembly. The lens assembly includes a first lens and a second lens each of which has one end surface provided with a spherical surface portion, an optical functional portion, and an accommodation sleeve for accommodating the optical functional component. An end surface of the first retaining sleeve is fixed to one end surface of the accommodation sleeve, and an end surface of the second retaining sleeve is fixed to the other end surface of the accommodation sleeve.

6 Claims, 30 Drawing Sheets

U.S. PATENT DOCUMENTS

| | | | |
|---|---|---|---|
| 7,184,620 B1* | 2/2007 | Richard et al. | 385/24 |
| 2003/0063853 A1* | 4/2003 | Huang et al. | 385/34 |
| 2003/0103725 A1* | 6/2003 | Li | 385/34 |
| 2003/0138215 A1* | 7/2003 | Zhou et al. | 385/47 |
| 2004/0091210 A1 | 5/2004 | Tanaka et al. | |

FOREIGN PATENT DOCUMENTS

| | | |
|---|---|---|
| JP | 3135511 | 12/2000 |
| JP | 2002-174748 | 6/2002 |
| JP | 2002-182061 | 6/2002 |
| JP | 2002174748 A * | 6/2002 |
| JP | 2003-307644 | 10/2003 |
| JP | 2003-344697 | 12/2003 |
| JP | 2004-163535 | 6/2004 |
| JP | 2004-271894 | 9/2004 |
| JP | 2005-10372 | 1/2005 |
| JP | 2005-24928 | 1/2005 |
| JP | 2006-138929 | 6/2006 |

OTHER PUBLICATIONS

International Search Report mailed Apr. 1, 2008 for International Application No. PCT/JP2007/073810.

* cited by examiner

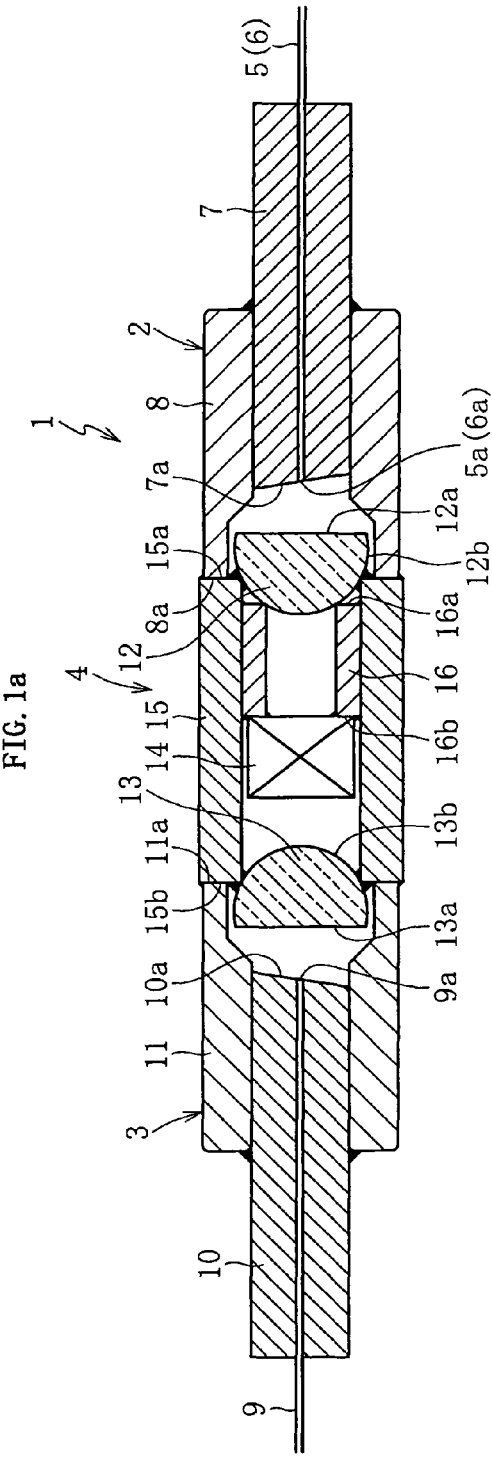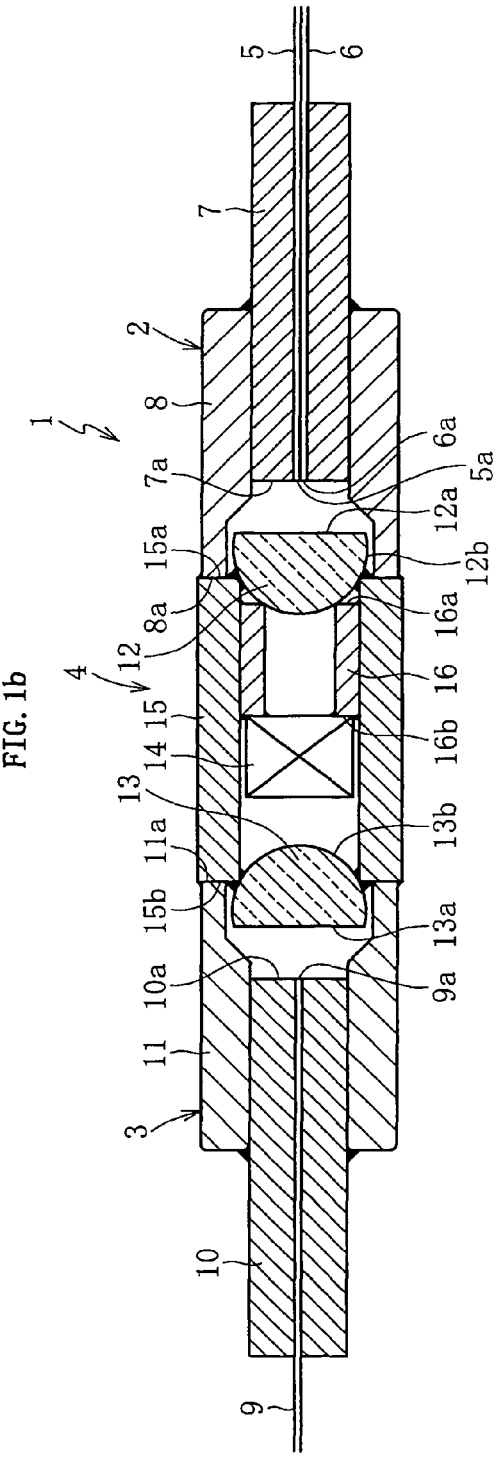

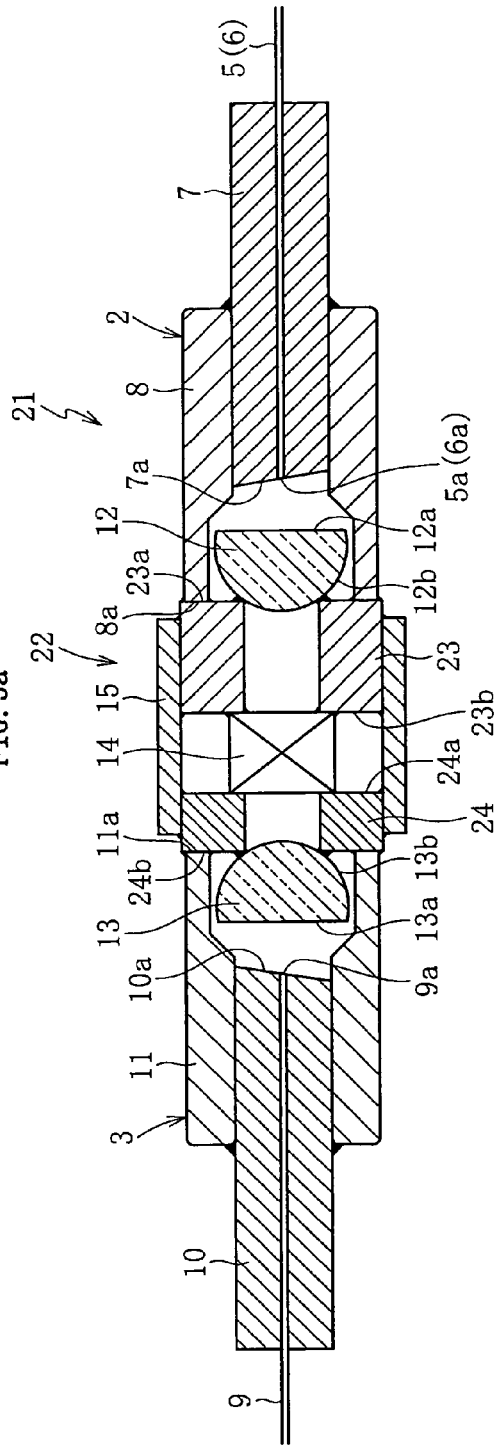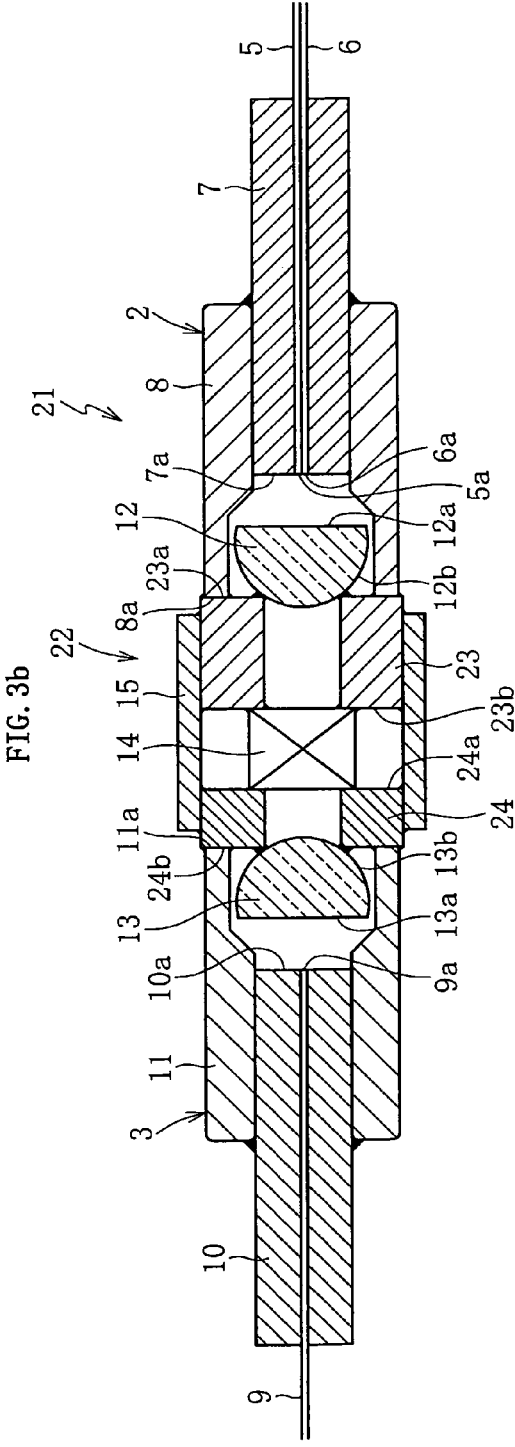

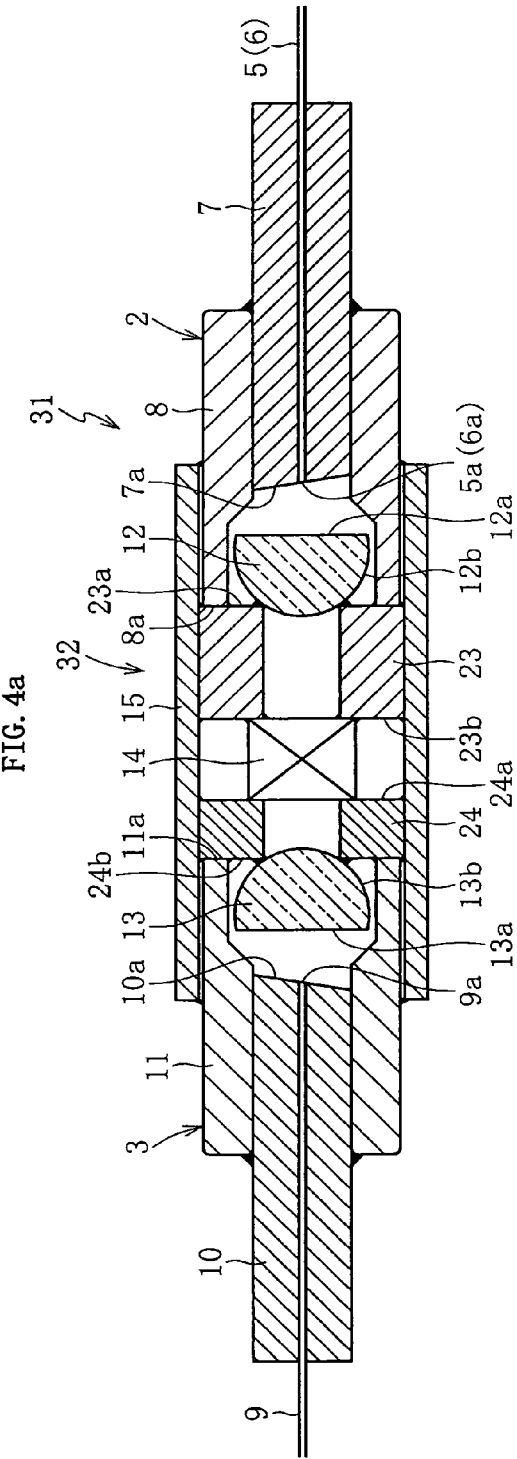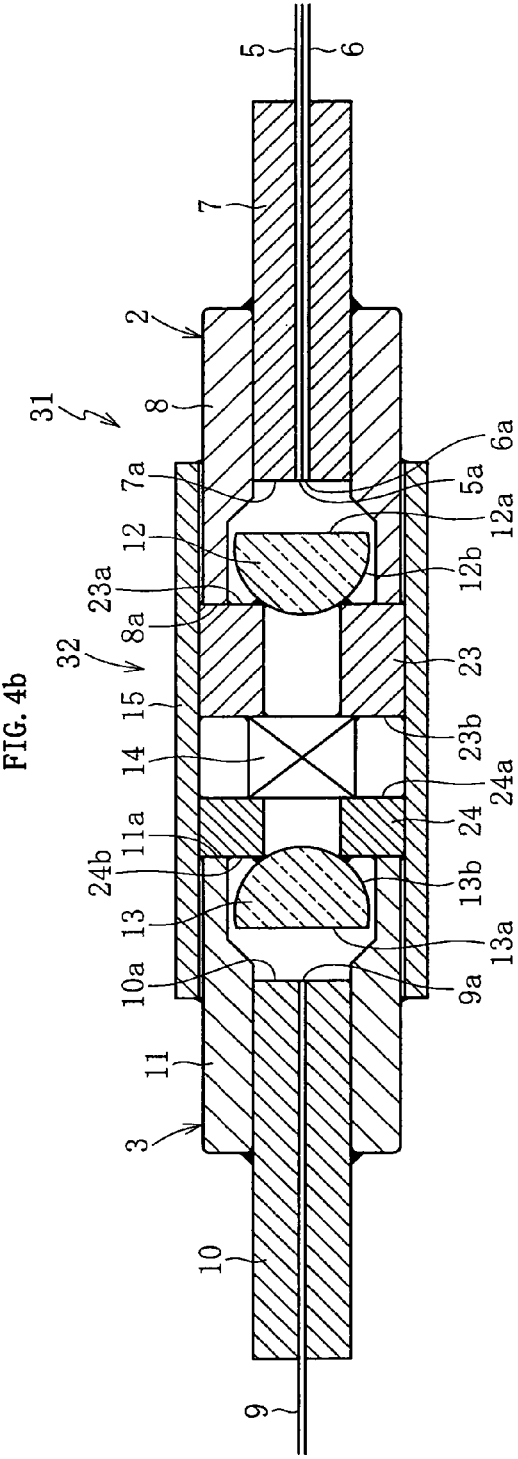

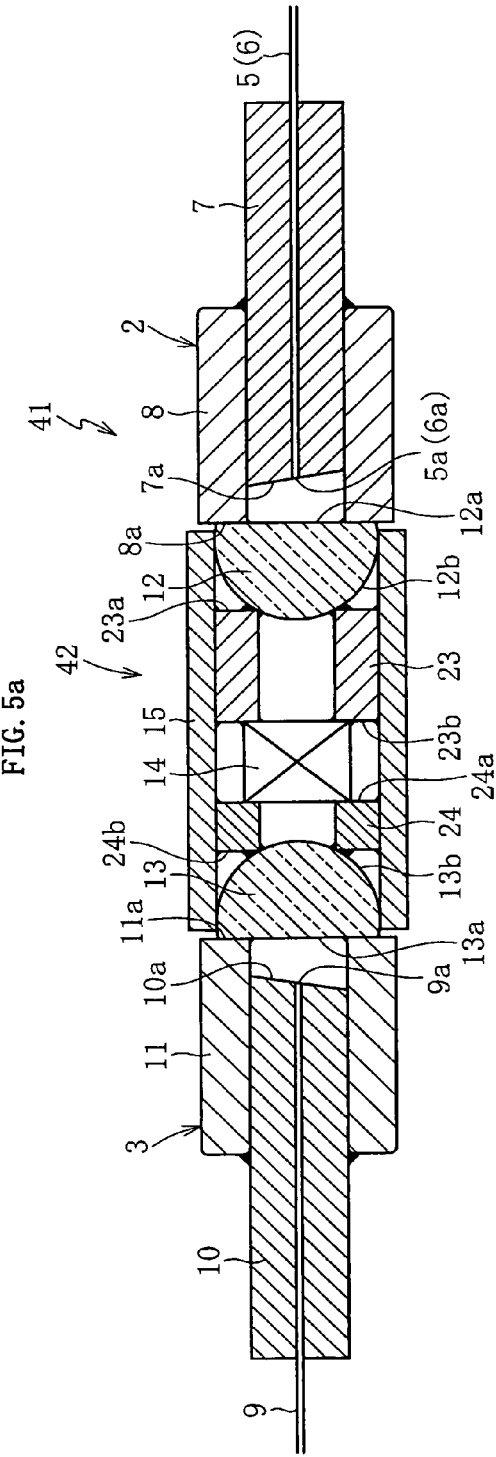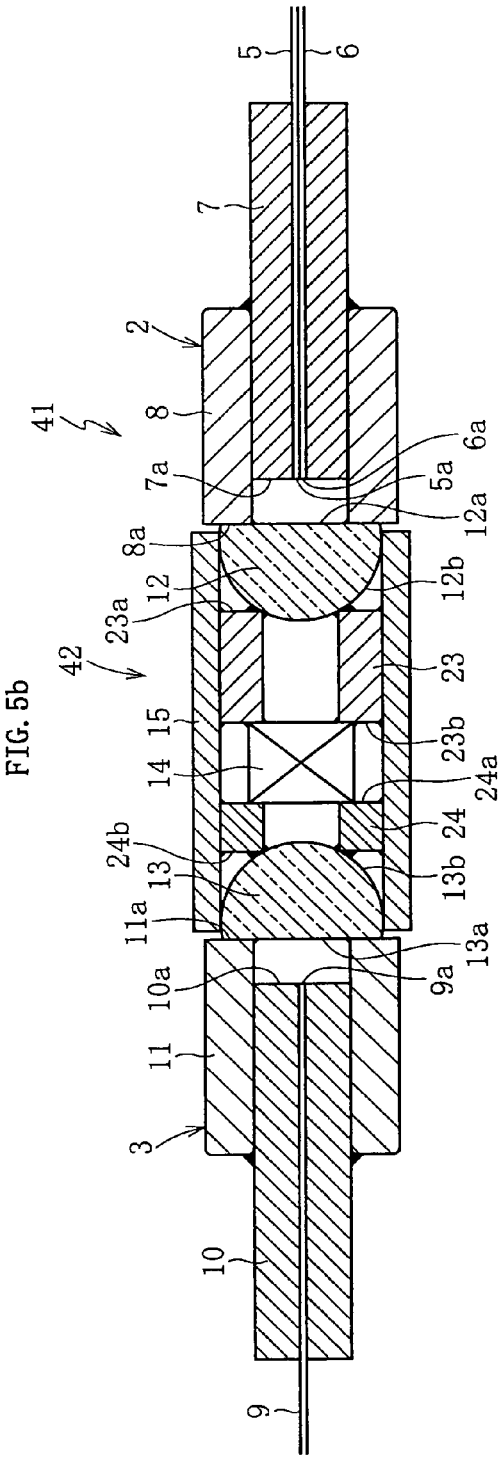

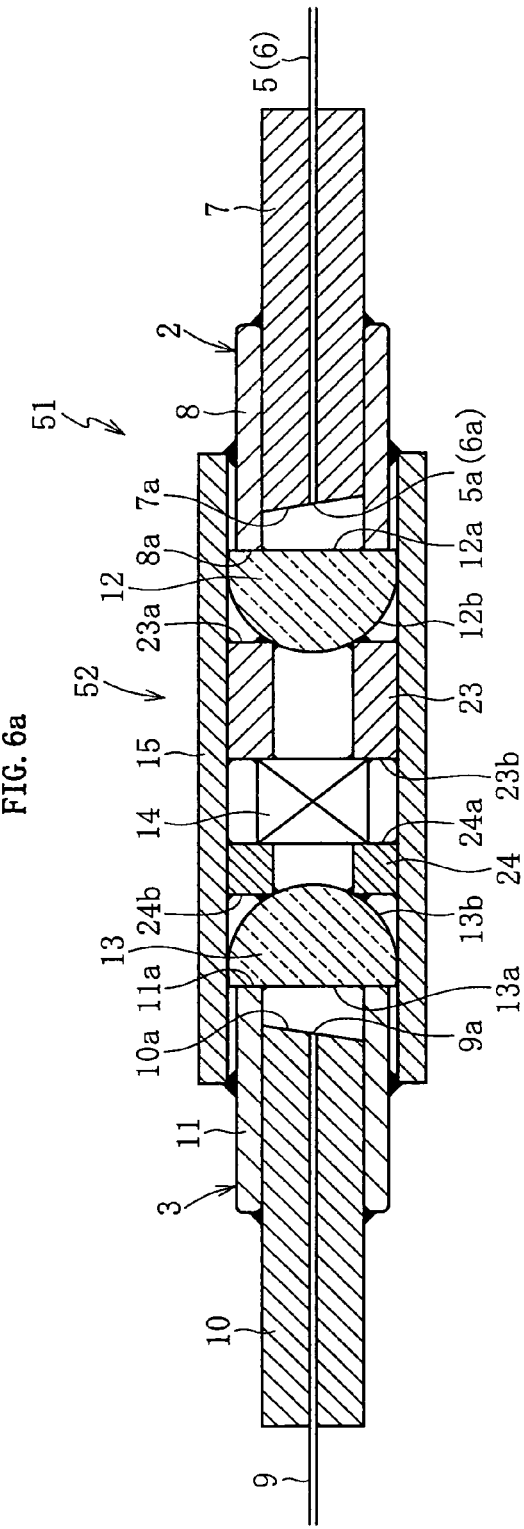
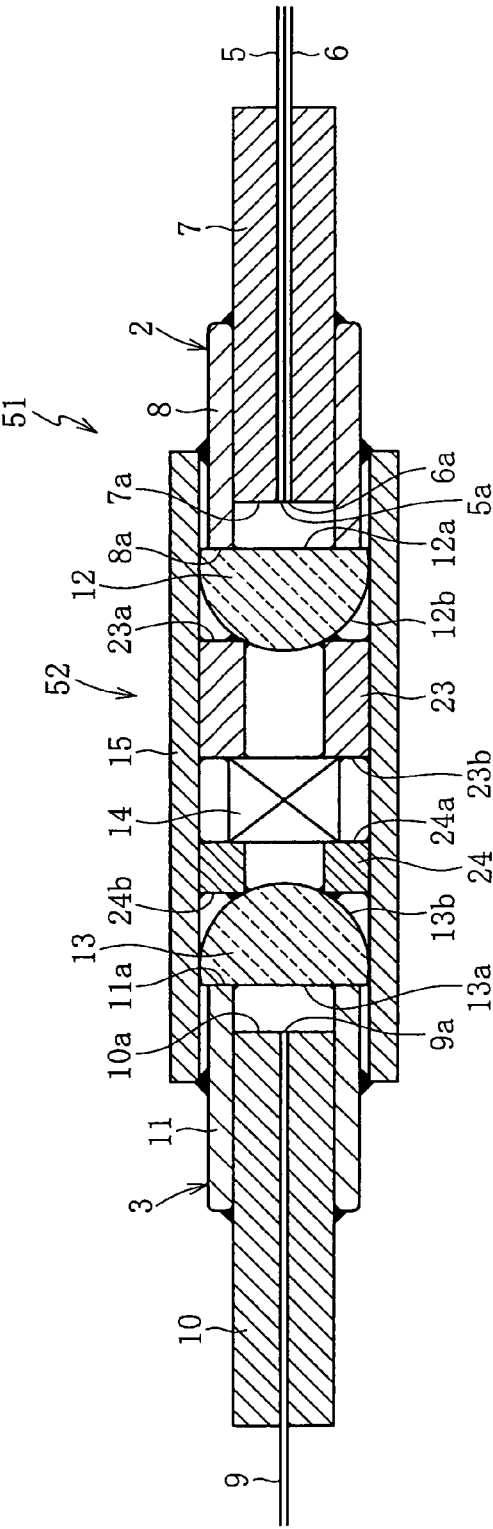

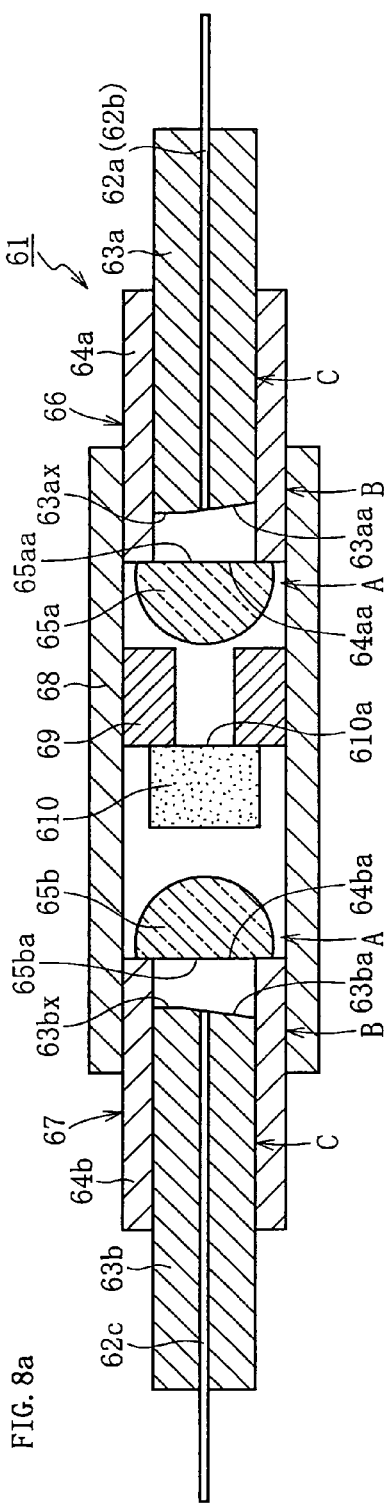
FIG. 8a
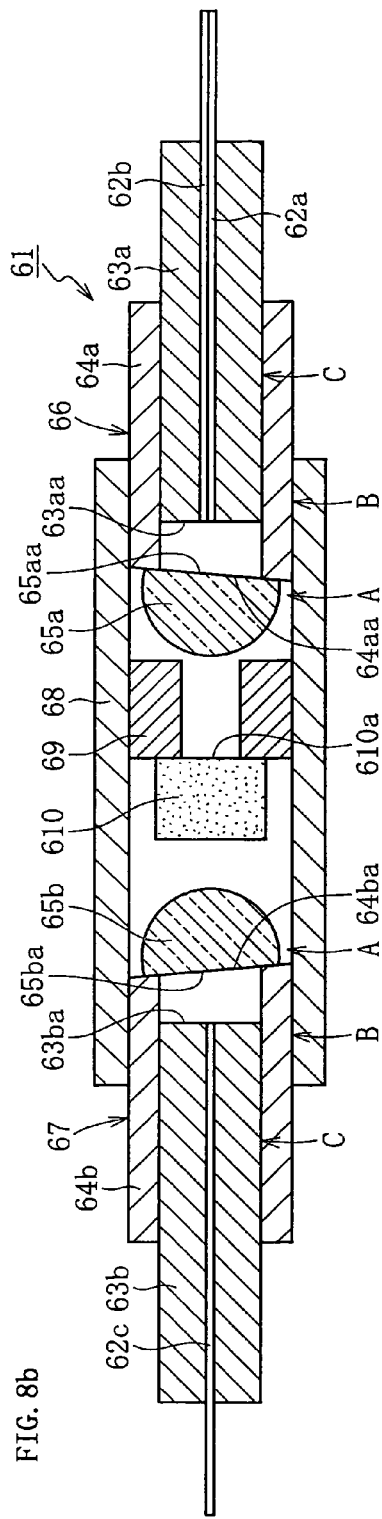
FIG. 8b
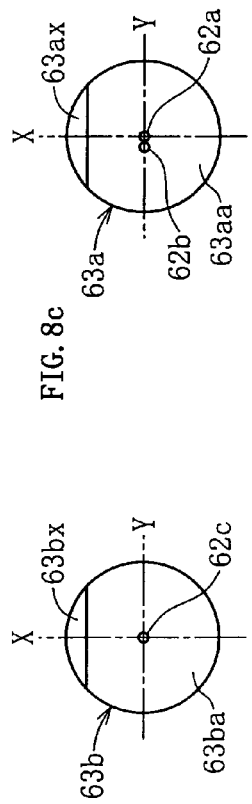
FIG. 8c
FIG. 8d

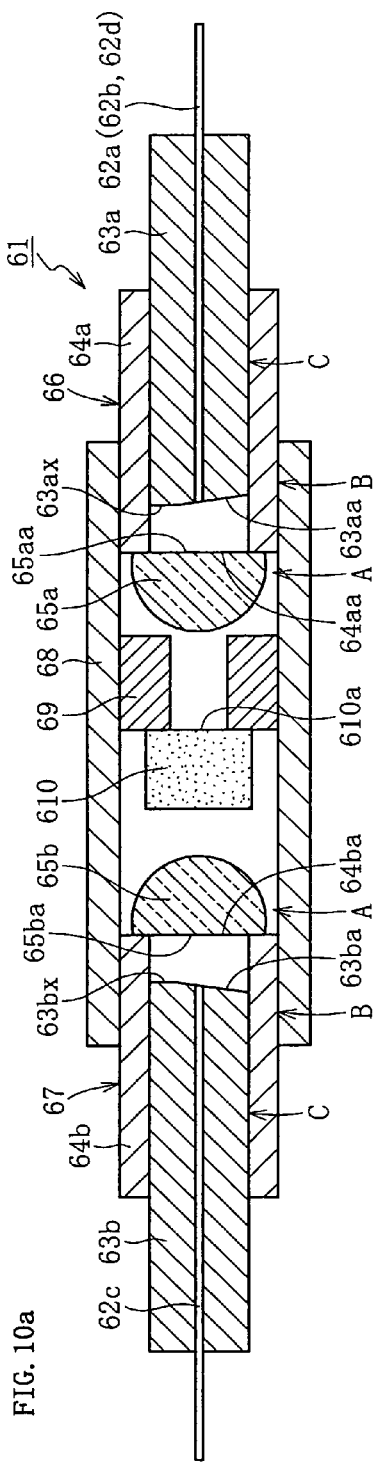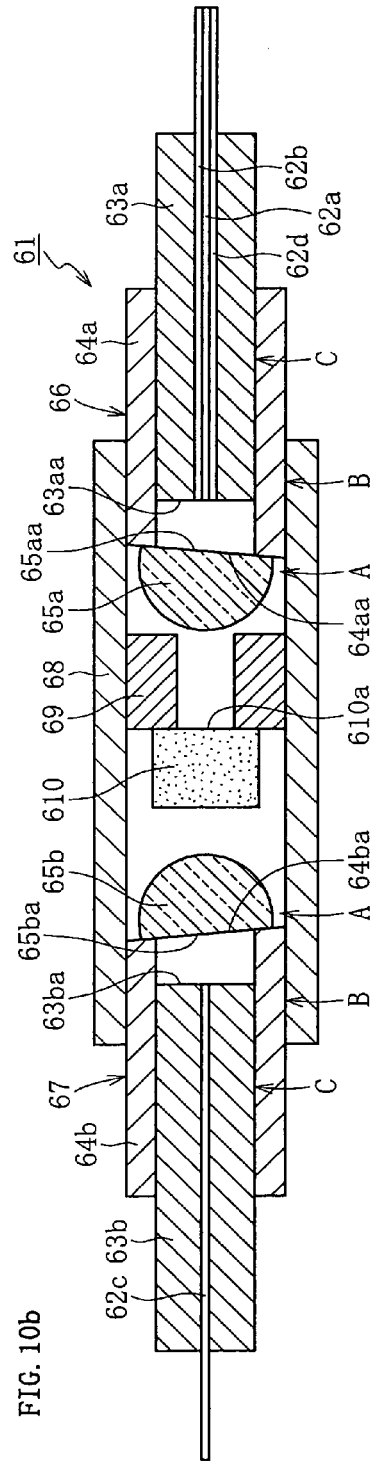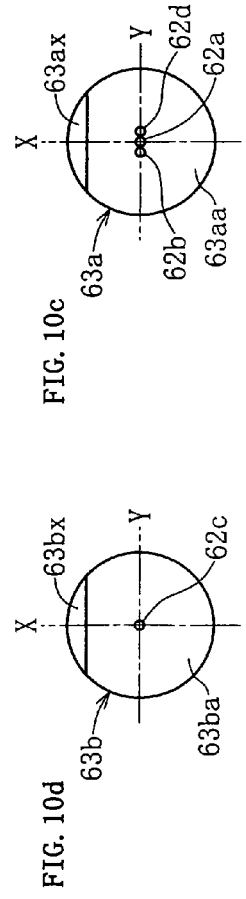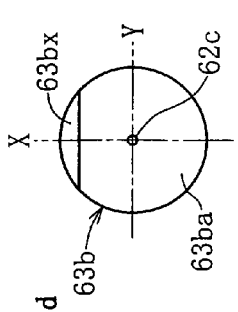

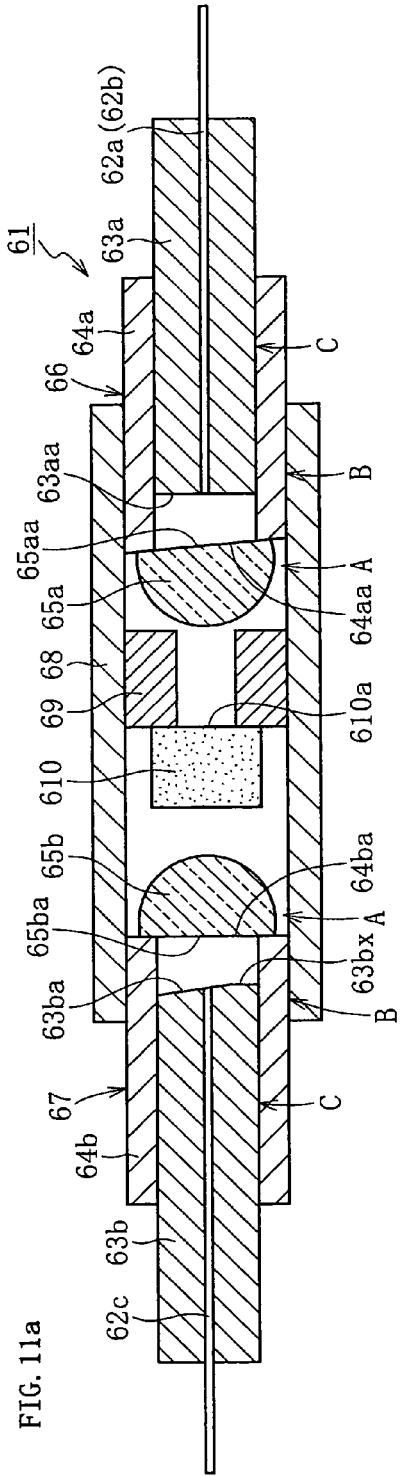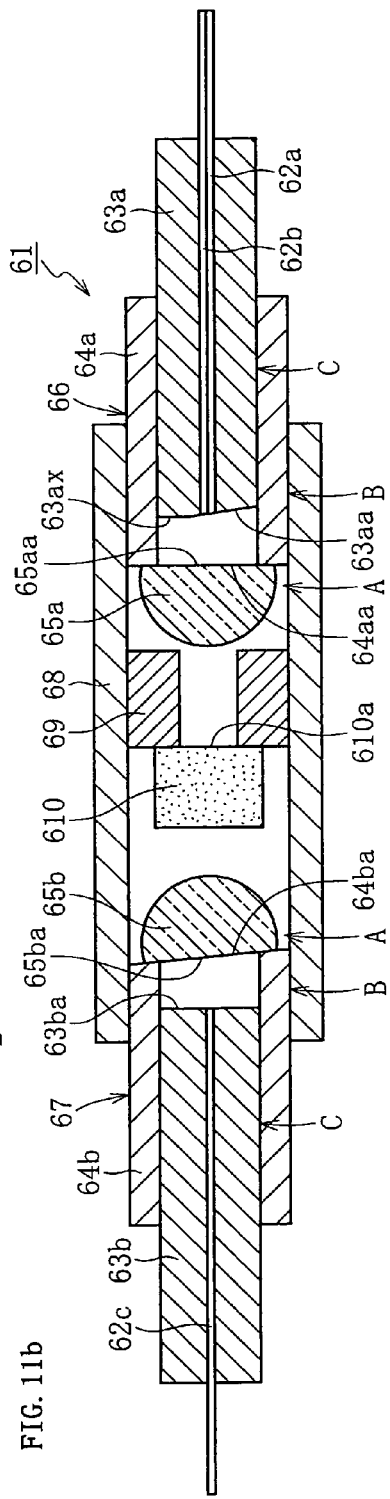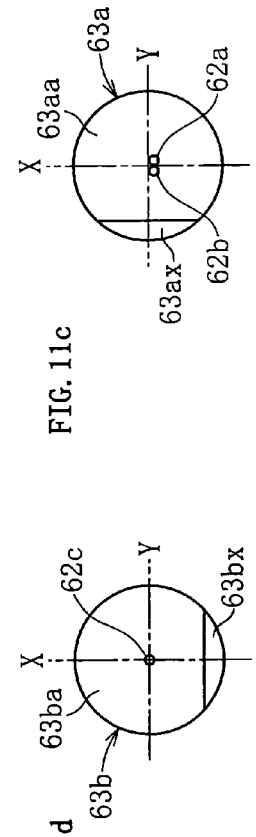
FIG. 11a
FIG. 11b
FIG. 11c
FIG. 11d

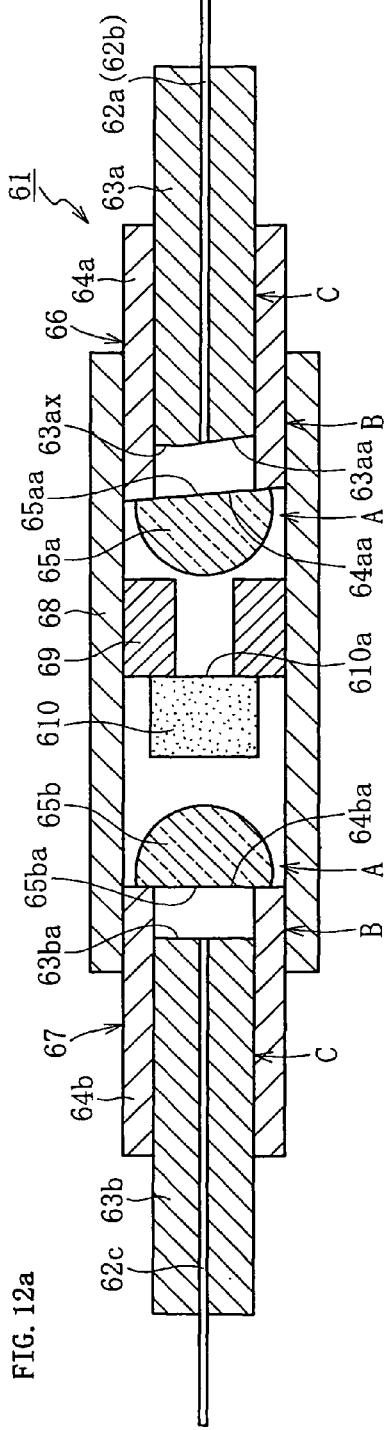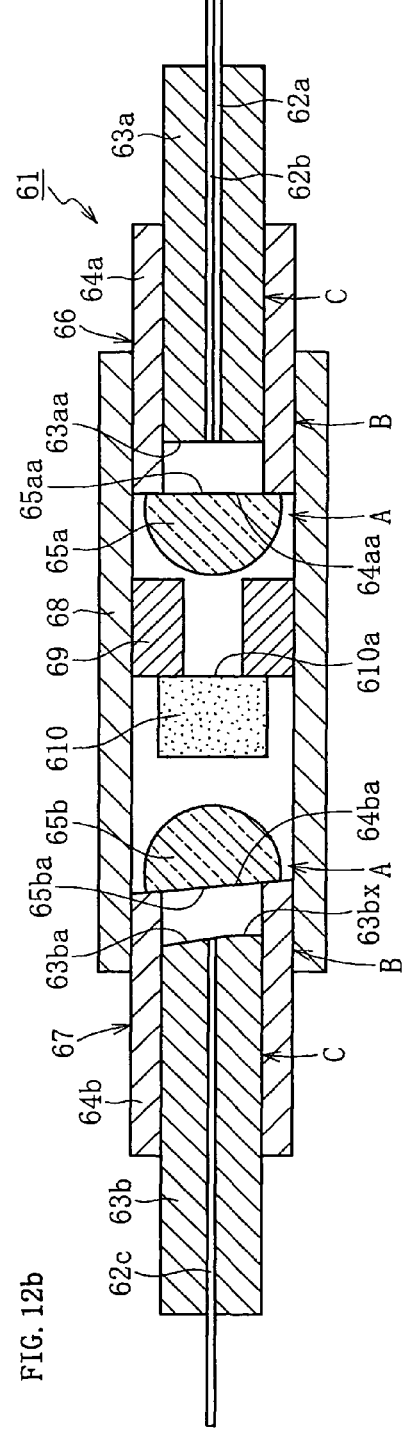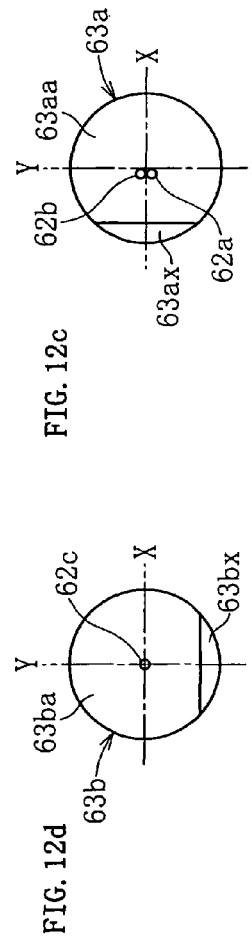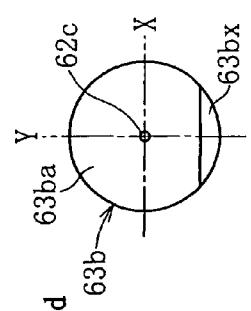
FIG. 12a
FIG. 12b
FIG. 12c
FIG. 12d

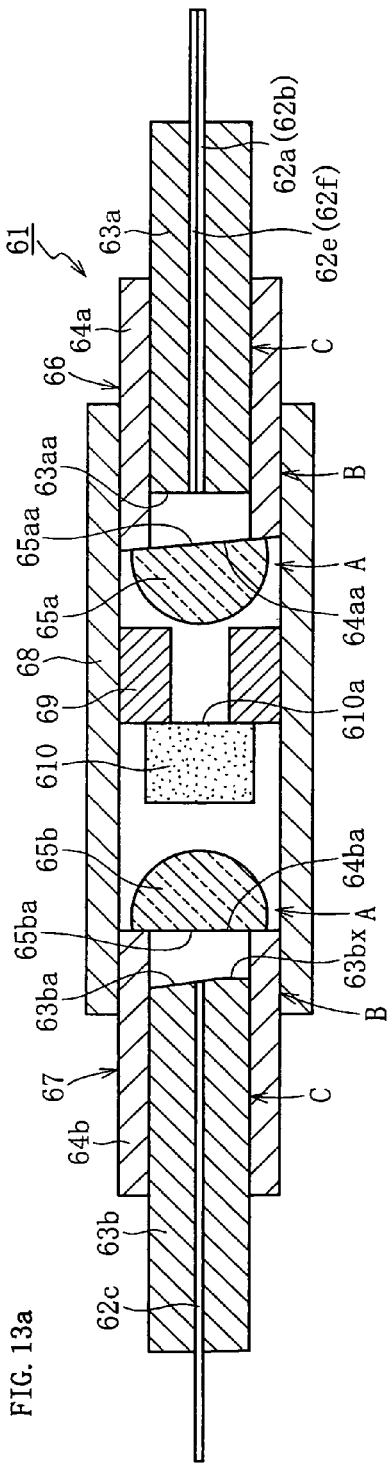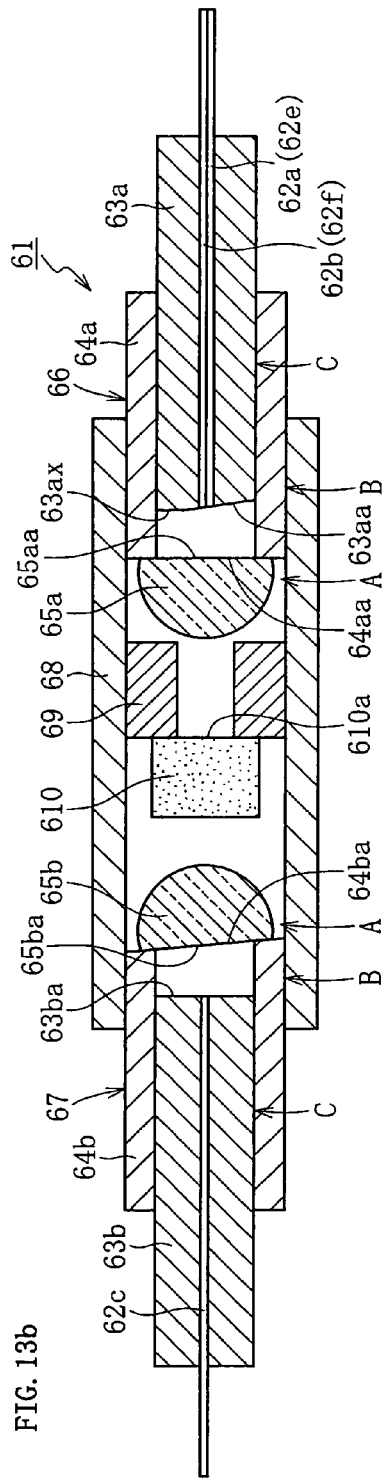
FIG. 13a
FIG. 13b
FIG. 13c
FIG. 13d

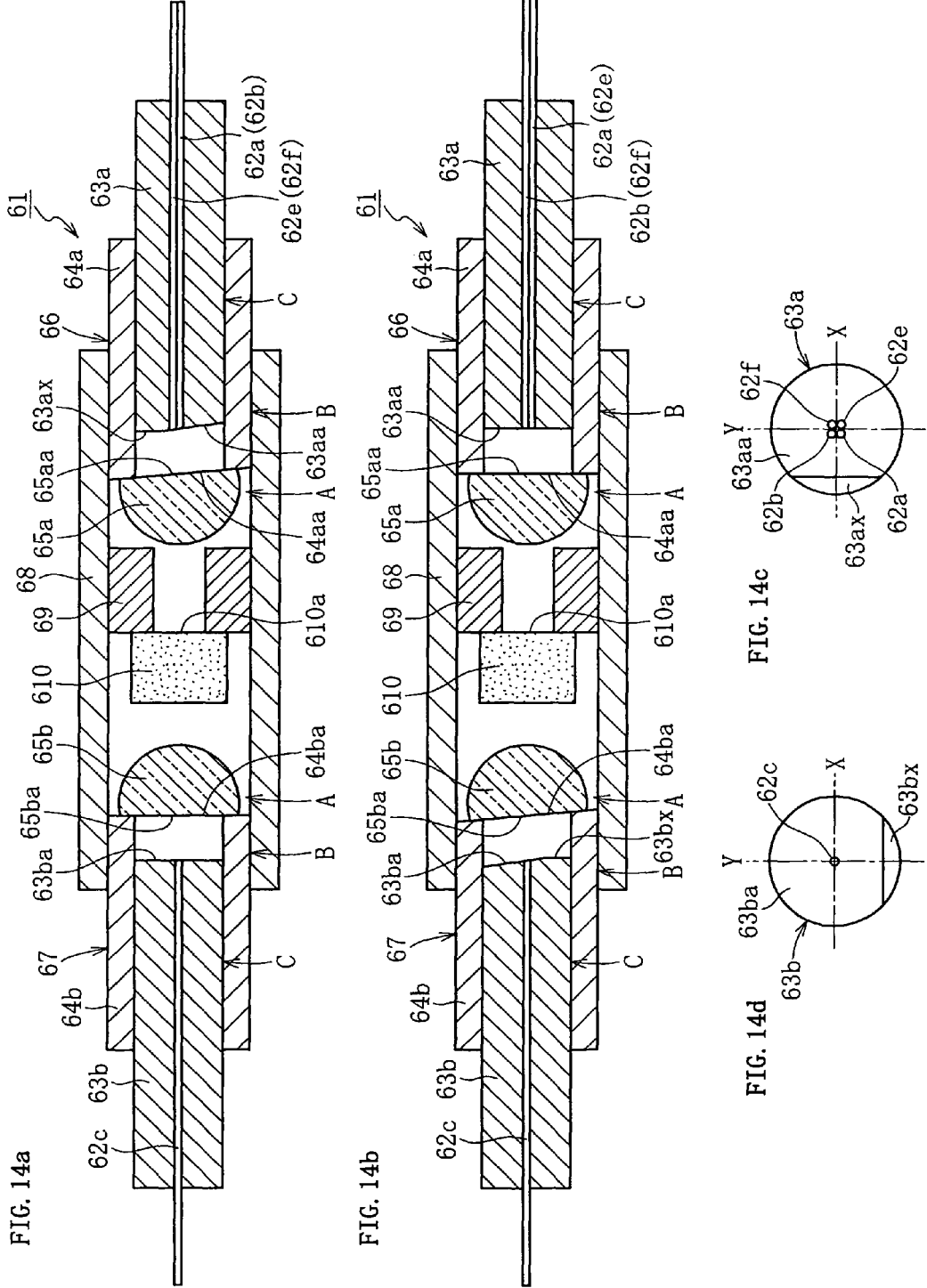

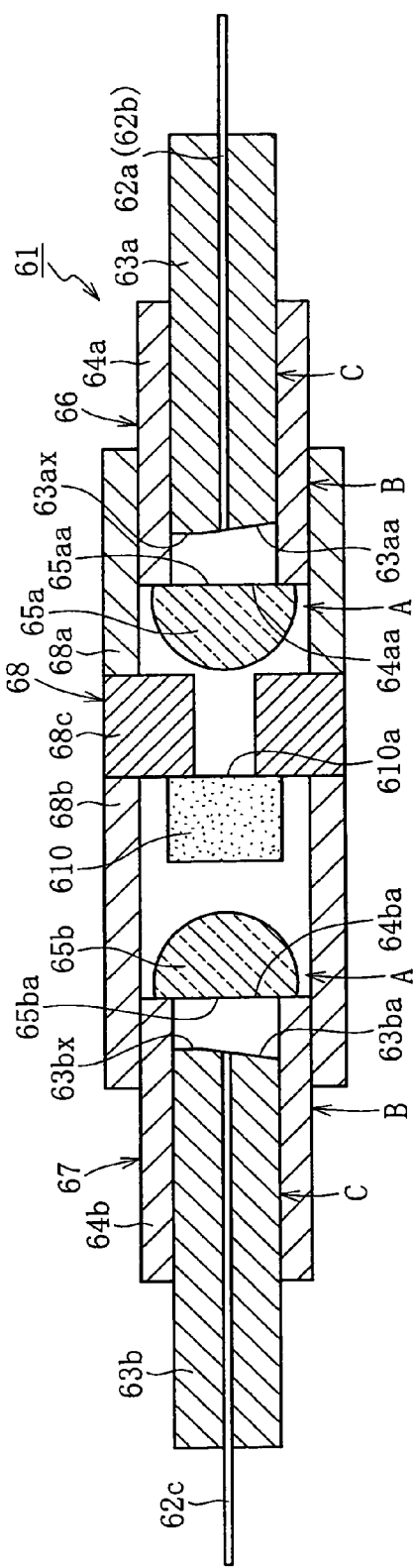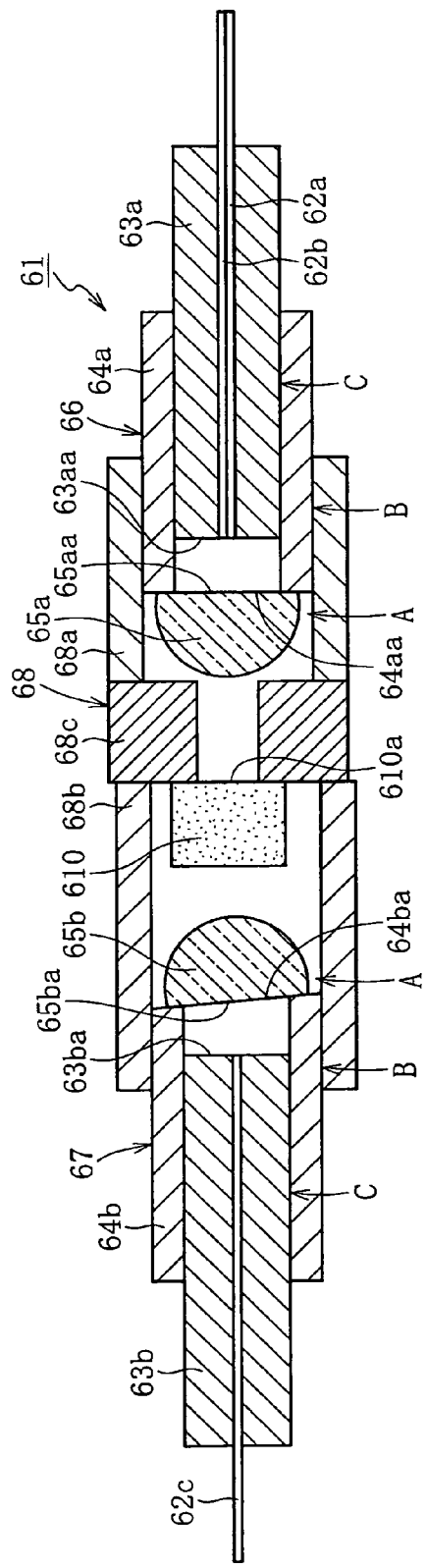
FIG. 20a
FIG. 20b

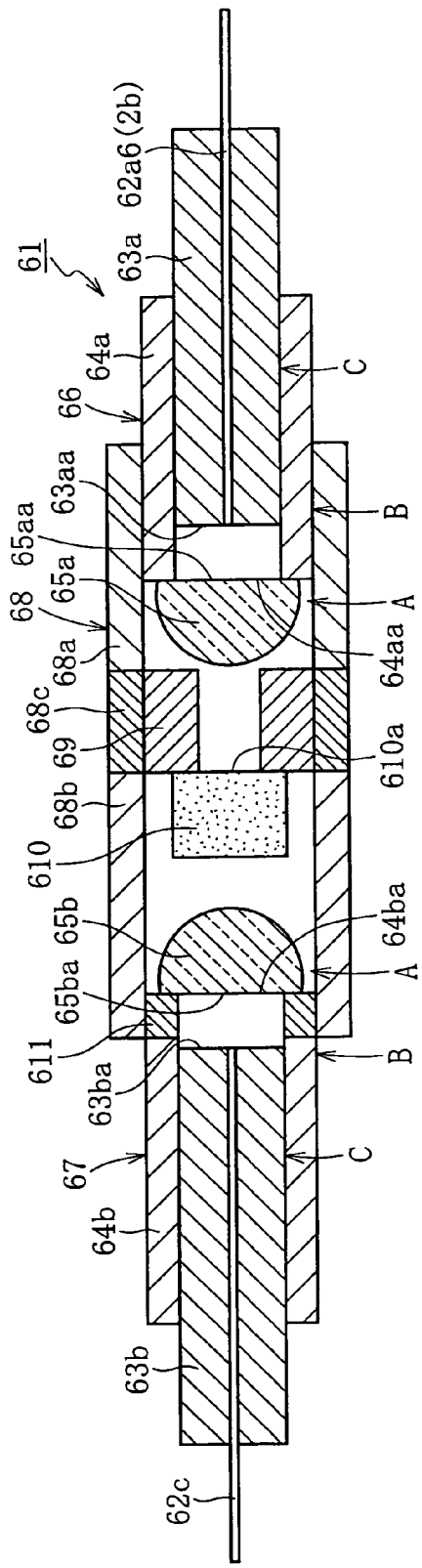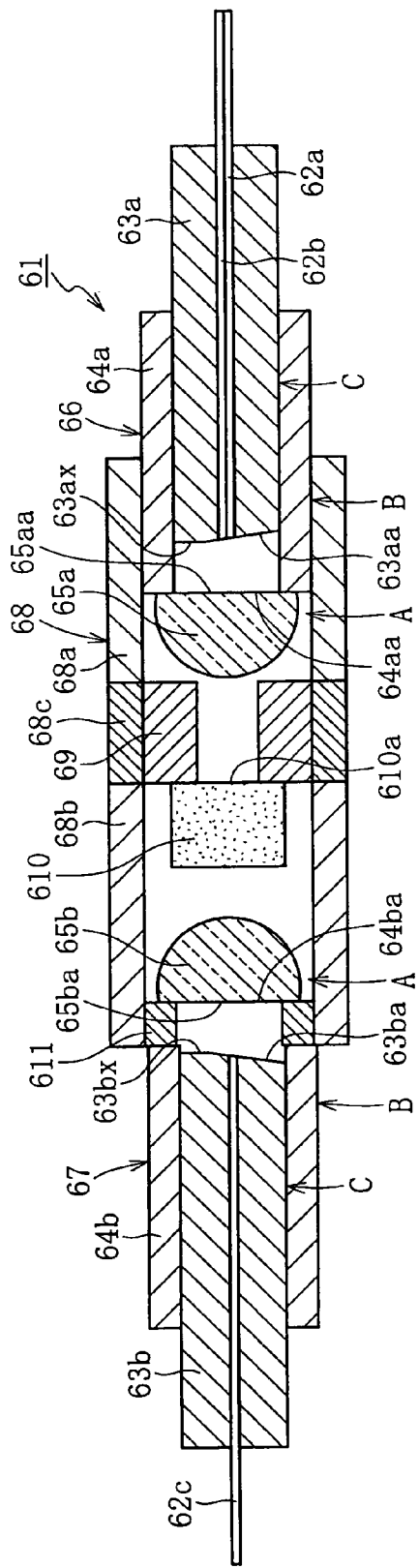
FIG. 25a
FIG. 25b

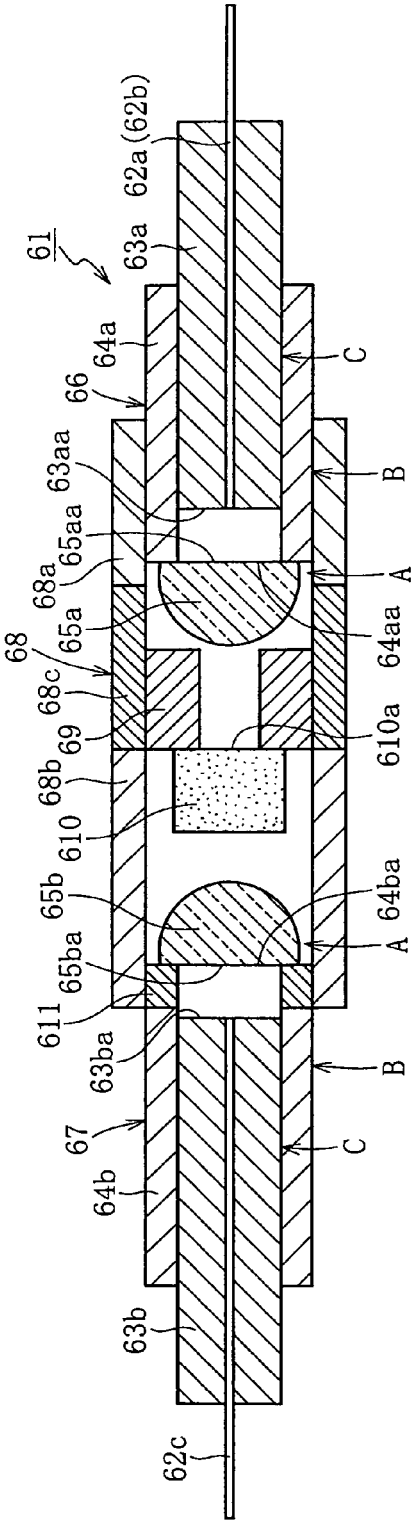
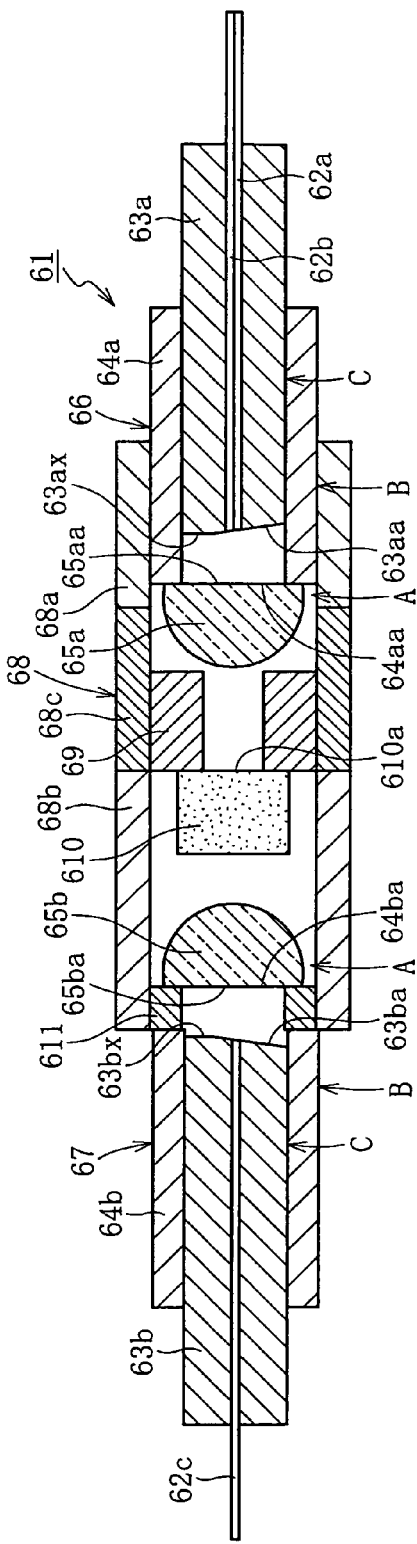
FIG. 29a
FIG. 29b

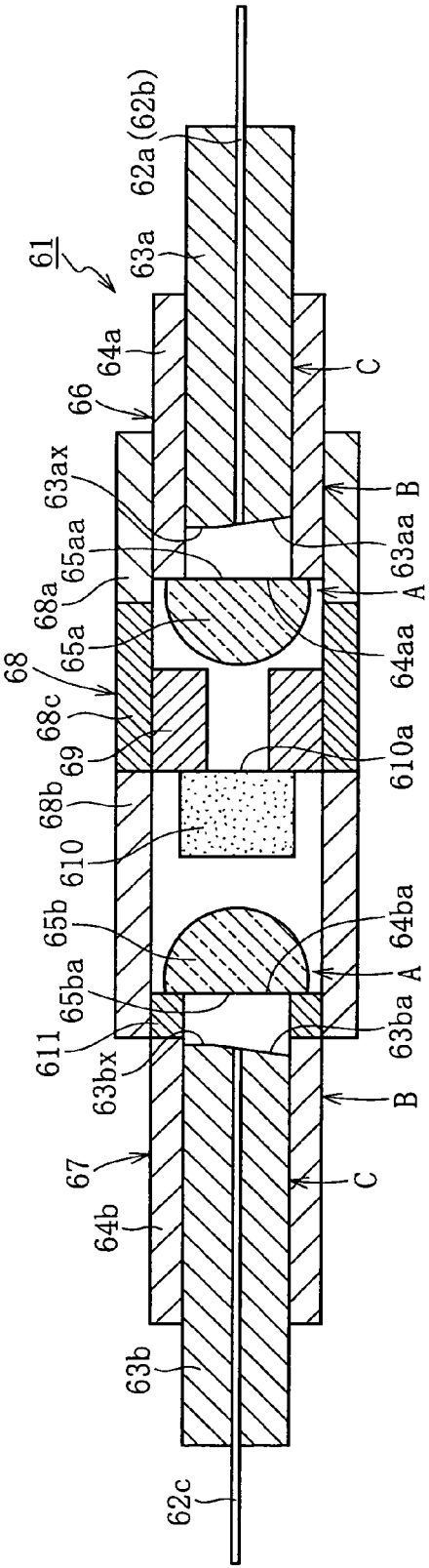
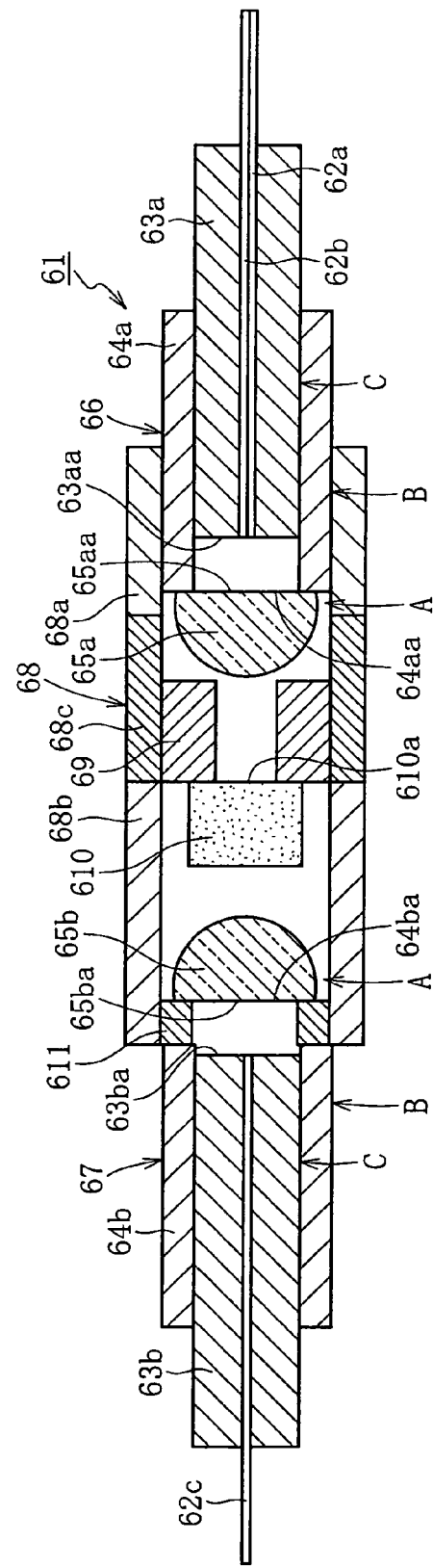
FIG. 30a
FIG. 30b

LENS ASSEMBLY, OPTICAL DEVICE, OPTICAL AXIS ADJUSTING METHOD FOR AN OPTICAL DEVICE

BACKGROUND OF THE INVENTION

1. Field of the Invention

The present invention relates to an optical device such as an optical multiplexer/demultiplexer, an optical isolator, an optical circulator, an optical switch, and an optical gain equalizer, a lens assembly for use in the optical device, and an optical axis adjusting method for the optical device.

2. Description of the Related Art

In an optical device of this type, normally, in an accommodation sleeve of a cylindrical shape, a lens assembly in which two lenses are fixed by an adhesive or the like so as to be opposed to each other through an intermediation of an optical functional component (such as optical filter or optical isolator core) is incorporated. There is known an optical device in which a capillary tube to which an end portion of an optical fiber is fixed is fixed by an adhesive or the like while being inserted into the accommodation sleeve of the lens assembly (for example, Patent Document 1 mentioned below). The lens has a function of making light emitted from the optical fiber parallel and of collecting the parallel light to allow the collected light to incident onto the optical fiber. As the lens, there is used a cylindrical shape lens of a gradient index type (so-called GRIN lens: one end thereof is set to be vertical surface perpendicular to optical axis, and another end thereof is set to be inclined surface in many cases), a cylindrical shape lens having a uniform refractive index, in which two partial spherical lens surfaces having the same center of curvature as each other are provided on both ends (so-called drum lens), a cylindrical shape lens having the uniform refractive index, in which the partial spherical lens surface is provided on one end (so-called C lens: another end thereof is set to be inclined surface in many cases), an aspherical lens, or the like.

Further, as the optical device of this type, there are commonly known the optical device in which a pair of lens capillary tube assemblies are manufactured, in each of which a capillary tube, to which an end portion of an optical fiber is fixed, and a lens are fixed by an adhesive to a common sleeve, and the pair of lens capillary tube assemblies are fixed by the adhesive to an inner portion of an accommodation member (cylindrical member or box member) such that the lenses are opposed to each other through an intermediation of an optical functional component (for example, Patent Documents 1 to 4 mentioned below).

Each of the lenses of the pair of lens capillary tube assemblies has a function of collimating light emitted from the optical fiber into parallel light and of collecting the parallel light to allow the collected light to be incident on the optical fiber. As the lens, there is used a cylindrical shape lens of a gradient refractive index type, which is called a GRIN lens, a cylindrical shape lens having a uniform refractive index, which is called a drum lens, a cylindrical shape lens having the uniform refractive index, which is called a C lens, an aspherical lens, or the like.

According to Patent Document 5 mentioned below, there is disclosed an optical device including a pair of lens capillary tube assemblies in each of which a capillary tube having two optical fibers are inserted thereinto and fixed thereto is inserted into an inner hole of a retaining sleeve, and a lens is inserted and fixed in a position on a leading end side with respect to the capillary tube in the inner hole of the retaining sleeve, with the pair of lens capillary tube assemblies being fixed to an inner portion of an accommodation member such that the lenses are opposed to each other through an intermediation of an optical functional component (filter).

Further, according to Patent Document 6 mentioned below, there is disclosed an optical multiplexer/demultiplexer for demultiplexing multiplexed light having two wavelengths passing through one optical fiber to two optical fibers, or multiplexing single light beams having different wavelengths separately passing through the two optical fibers, respectively, to one optical fiber. The optical multiplexer/demultiplexer has a structure including a pair of lens capillary tube assemblies in each of which a quadruple-core capillary tube having four optical fibers inserted therein and fixed thereto and a lens (GRIN rod lens) abutted on a leading end of the quadruple-core capillary tube are inserted into an inner hole of a first alignment sleeve, the pair of lens capillary tube assemblies being fixed to each other such that the lenses are opposed to each other through an intermediation of an optical functional component (glass plate having a surface applied with mirror coating). In this case, the pair of lens capillary tube assemblies are fixed to each other by inserting both the lenses into an inner hole of the second alignment sleeve (accommodation member). One of the lens capillary tube assemblies uses two optical fibers of the four optical fibers, which are positioned on a diagonal line in a plane perpendicular to an axis, and another of the lens capillary tube assemblies uses only one of the four optical fibers, thereby making it possible to align both the lens capillary tube assemblies without being decentered.

Further, in Patent Document 7 mentioned below, in order to enable optical axis adjustment between an optical fiber and a lens, a capillary tube assembly in which a capillary tube (ferrule) to which an end portion of the optical fiber is fixed is embedded in a recessed portion of a sleeve and a lens assembly in which a lens is fixed to an inside of a cylindrical bush are manufactured, relative positions of the capillary tube assembly and the lens assembly are adjusted, to thereby perform optical axis adjustment between the optical fiber and the lens, and then an end surface of the sleeve and an end surface of the cylindrical bush are fixed to each other. In this case, a leading end surface of the optical fiber and an end surface of the capillary tube retaining the optical fiber is polished to form a spherical shape and the capillary tube is pressed by the sleeve, thereby allowing the leading end surface of the optical fiber to be brought into PC contact (physical contact) with an incident/emission surface of the lens. As the lens, the GRIN lens is used and a filter serving as the optical functional component is fixed to a member (base member 7b) separate from the lens assembly to be interposed between lens assemblies which are opposed to each other.

[Patent Document 1] JP 2002-182061 A
[Patent Document 2] JP 2003-344697 A
[Patent Document 3] JP 2005-10372 A
[Patent Document 4] JP 2005-24928 A
[Patent Document 5] JP 3135511 B
[Patent Document 6] JP 3124467 B
[Patent Document 7] JP 2004-271894 A

DISCLOSURE OF THE INVENTION

Problems to be Solved by the Invention

As disclosed in Patent Document 1 mentioned above, in an optical device including a lens assembly in which lenses are fixed to an inner portion of an accommodation sleeve (protection tube) so as to be opposed to each other through an intermediation of an optical functional component, in order to ensure favorable optical characteristics, it is necessary that positions of the lens assembly and a capillary tube which are to be fixed to the lens assembly be adjusted such that an optimum optical alignment state is obtained. In particular, in the lens assembly, in order to realize the optimum optical alignment state based on a relationship with an optical fiber, it is necessary that the fixation be performed after adjusting positions of the two lenses accurately with respect to the accommodation sleeve. Thus, in order to enable the position adjustment of the lenses, there is normally taken such a measure that a relatively large space (diameter difference) is ensured between an inner peripheral surface of the accommodation sleeve and an outer peripheral surface of each of the lenses. As a result, when the outer periphery of each of the lenses is fixed by an adhesive to the inner peripheral surface of the accommodation sleeve, a relatively large amount of the adhesive enters the space. Accordingly, due to shrinkage on curing or aged deterioration of the adhesive, there is caused displacement in fixing position of each of the lenses whose position has been adjusted. Therefore, there are cases where high reliability cannot be obtained in view of performances such as optical characteristics and weatherability of the optical device which is a finished product.

In particular, recently, in a field of optical communication, along with development of a multimedia information society, there is an increasing need of high-speed optical communication, wavelength division multiplexing communication (WDM), dense wavelength division multiplexing communication (DWDM), and the like. For optical devices used in those communication systems, there has been an increasing demand for improving reliability under conditions in which light of higher energy is incident and emitted. Use of the adhesive of a relatively large amount in the optical device of this type leads to increase in fear of heat deterioration of the adhesive along with increase in temperature of the optical device due to incident and emission light of higher energy. Accordingly, a problem in that the fixing positions of the lenses are displaced becomes more conspicuous.

Further, also an operation itself of fixing the lens by the adhesive to the inner periphery of the accommodation sleeve by adjusting the position of the lens in the inner portion of the accommodation sleeve requires troublesome and complicated operations. Therefore, the number of processes to complete fixation of the lens to the inner peripheral surface of the accommodation sleeve unreasonably increases, thereby resulting in increase in manufacturing cost of the optical device which is the finished product.

It is therefore a first object of the present invention to provide an optical device with which high reliability is obtained in view of performances such as optical characteristics and weatherability, and further, to provide an optical device whose manufacturing costs can be reduced.

On the other hand, as disclosed in Patent Documents 5 and 6 mentioned above, in an optical device having a structure in which a pair of lens capillary tube assemblies are fixed to an inner portion of an accommodation member such that lenses are opposed to each other through an intermediation of an optical functional component, in each of the lens capillary tube assemblies, an optical axis of light which is incident and emitted does not coincide with a central axis of a sleeve or a demanded position in a radius direction thereof in many cases. Accordingly, it is necessary that, in a state where the lens capillary tube assemblies are inserted into the inner portion of the accommodation member to which the optical functional element is fixed in advance, a position of each of the lens capillary tube assemblies is adjusted such that an optimum optical alignment state is obtained. In order to enable the position adjustment, a relatively large clearance (diameter difference) has to be ensured between an outer periphery of the sleeve of each of the lens capillary tube assemblies and an inner periphery of the accommodation member. As a result, also regarding the optical device of this type, when the outer periphery of the sleeve of each of the lens capillary tube assemblies is fixed by the adhesive to the inner periphery of the accommodation member, a relatively large amount of the adhesive enters the clearance. Accordingly, there are cases where high reliability cannot be obtained in performances such as optical characteristics and weatherability.

Further, in a current situation in which, in view of a need for high-speed optical communication, wavelength division multiplexing communication (WDM), dense wavelength division multiplexing communication (DWDM), and the like, there is a demand for improvement in reliability under conditions in which light of higher energy is input and output, when the adhesive for fixing the outer periphery of the sleeve of each of the lens capillary tube assemblies to the inner periphery of the accommodation member is in an optical path of the input/output light, there is expected a risk in that, depending on conditions, the adhesive cannot withstand the high energy of the input/output light, thereby causing breakage such as burnout of the adhesive.

Further, in an optical device as disclosed in Patent Document 7 described above, two lenses and an optical functional component (filter) are separately assembled, and six elements in total inclusive of right and left base members (7a and 7b) and a pair of right and left capillary assemblies are stacked to be fixed to each other. Further, two optical fibers are inserted into and fixed to one of the capillary tube assemblies, and one optical fiber is inserted into another of the capillary tube assemblies. Owing to this relationship, the pair of capillary tube assemblies are fixed while being decentered. With this structure, optical axis adjustment of each element, in particular, the optical adjustment in a radius direction becomes extremely difficult. Accordingly, an operation thereof becomes complicated, and labor required for the optical adjustment becomes excessive. As a result, manufacturing costs increase.

It is therefore a second object of the present invention to enable appropriate and easy optical adjustment of a lens capillary tube assembly, and further, to provide an optical device with which high reliability is obtained in view of performances such as optical characteristics and weatherability in a case of using the lens capillary tube assembly.

SUMMARY OF THE INVENTION

A lens assembly according to a first means for solving the above-mentioned first object is characterize by including: a first lens and a second lens each of which has one end surface provided with a spherical surface portion; an optical functional component; and an accommodation sleeve for accommodating the optical functional component, and is characterized in that: the first lens is fixed to the accommodation sleeve in a state where the spherical surface portion of the first lens is abutted on a one end-side opening edge portion of the accommodation sleeve; and the second lens is fixed to the accommodation sleeve in a state where the spherical surface portion of the second lens is abutted on an another end-side opening edge portion of the accommodation sleeve. Note that the optical functional component herein means an optical filter (such as bandpass filter, long wavelength transmission/reflection filter, short wavelength transmission/reflection filter, or correction gain equalizer filter), an optical isolator core, or the like (the same in the following).

With this structure, a center of curvature of the spherical surface portion of each of the first lens and the second lens can easily be made to coincide with a central axis of an inner periphery of the accommodation sleeve. That is, only by abutting the spherical surface portion of each of the lenses on the opening edge portion of the accommodation sleeve, a center of curvature of the spherical surface portion can be aligned on the central axis of the inner periphery of the accommodation sleeve with high accuracy. Further, compared to a case where alignment is performed by ensuring a large space between an inner peripheral surface of the accommodation sleeve and an outer peripheral surface of the lens, an amount of the adhesive required for fixing the lens can be significantly reduced. Therefore, by incorporating the lens assembly into an optical device, an optimum optical alignment state can be ensured while suppressing deterioration in optical characteristics, weatherability, or the like of the optical device due to shrinkage on curing or aged deterioration of the adhesive, thereby making it possible to construct the optical device having high reliability. That is, in a case where the lens assembly is incorporated into the optical device such as an optical multiplexer/demultiplexer, an optical isolator, an optical circulator, an optical switch, or an optical gain equalizer, it is possible to obtain high reliability in view of performances such as optical characteristics and weatherability.

Further, each of the lenses are aligned in optimum positions only by abutting the spherical surface portion of each of the lenses on the opening edge portion of the accommodation sleeve. Accordingly, the alignment operation for the lenses does not require troublesome and complicated operation. Therefore, by incorporating the lens assembly into the optical device, in addition to the high reliability in view of performances as described above, reduction in manufacturing cost can be achieved at the same time.

Note that, in this case, the first lens and the second lens are fixed to the opening edge portions on both ends of the common accommodation sleeve. Accordingly, by controlling an axial dimension of the accommodation sleeve, an interval between the first lens and the second lens can easily be set with high accuracy.

In the above-mentioned structure, it is preferable that the accommodation sleeve have an inner periphery to which an inner sleeve is fitted, the inner sleeve be fixed to at least one of the spherical surface portion of one of the first lens and the second lens and an inner peripheral surface of the accommodation sleeve in a state where a one end-side opening edge portion of the inner sleeve is abutted on the spherical surface portion of one of the first lens and the second lens, and the optical functional component be fixed to another end surface of the inner sleeve.

With this structure, only by controlling a dimension (dimension in axial direction of accommodation sleeve) of each of the accommodation sleeve, the inner sleeve, and the optical functional component, distances between the first lens, the second lens, and the optical functional component can easily be set with high accuracy. Note that an inner space of the inner sleeve constitutes an optical path for light, so even in a case where the optical functional component is fixed by the adhesive to the end surface of the inner sleeve, it is possible to inhibit the adhesive from entering the optical path as much as possible.

A lens assembly according to a second means for solving the above-mentioned first object is characterized by including: a first lens and a second lens each of which has one end surface provided with a spherical surface portion; a first inner sleeve; a second inner sleeve; an optical functional component; and an accommodation sleeve for accommodating, of those components, at least the first inner sleeve, the second inner sleeve, and the optical functional component, and is characterized in that: the first inner sleeve and the second inner sleeve are coaxially fitted and fixed to an inner periphery of the accommodation sleeve in a state where the optical functional component is interposed between one side end surfaces of the first inner sleeve and the second inner sleeve, which are opposed to each other; the first lens is fixed to the first inner sleeve in a state where the spherical surface portion of the first lens is abutted on a one end-side opening edge portion of the first inner sleeve; and the second lens is fixed to the second inner sleeve in a state where the spherical surface portion of the second lens is abutted on an another end-side opening edge portion of the second inner sleeve.

With this structure, a center of curvature of the spherical surface portion of the first lens can easily be made to coincide with a central axis of an inner periphery of the first inner sleeve, and a center of curvature of the spherical surface portion of the second lens can easily be made to coincide with a central axis of an inner periphery of the second inner sleeve. The first inner sleeve and the second inner sleeve are coaxially fitted and fixed to the inner periphery of the common accommodation sleeve. Accordingly, the center of curvature of the spherical surface portion of each of the first lens and the second lens coincides with a central axis of the inner periphery of the accommodation sleeve. That is, only by abutting the spherical surface portion of each of the lenses on the opening edge portion of the corresponding inner sleeve, the center of curvature of the spherical surface portion can be aligned on the central axis of the inner periphery of the accommodation sleeve with high accuracy. Further, compared to a case where the alignment is performed by ensuring a large space between an inner peripheral surface of the accommodation sleeve and an outer peripheral surface of the lens, an amount of the adhesive required for fixing the lens can be significantly reduced. Therefore, by incorporating the lens assembly into the optical device, an optimum optical alignment state can be ensured while suppressing deterioration in optical characteristics, weatherability, or the like of the optical device due to shrinkage on curing or aged deterioration of the adhesive, thereby making it possible to construct the optical device having high reliability. That is, in a case where the lens assembly is incorporated into the optical device such as an optical multiplexer/demultiplexer, an optical isolator, an optical circulator, an optical switch, or an optical gain equalizer, it is possible to obtain high reliability in view of performances such as optical characteristics and weatherability. Note that, each of the inner sleeves is fitted and fixed to the inner peripheral surface of the accommodation sleeve, so there is no need of forming a large space between the inner peripheral surface of each of the inner sleeves and the accommodation sleeve, and when those members are fixed to each other, an amount of the adhesive can be reduced.

Further, each of the lenses are aligned in optimum positions only by abutting the spherical surface portion of each of the lenses on the opening edge portion of the accommodation sleeve. Accordingly, the alignment operation for the lenses does not require troublesome and complicated operation. Therefore, by incorporating the lens assembly into the optical device, in addition to the high reliability in view of performances as described above, reduction in manufacturing cost can be achieved at the same time.

In the above-mentioned structure, it is preferable that the first inner sleeve, the second inner sleeve, and the optical functional component be continuous and brought into contact with each other in the accommodation sleeve.

With this structure, only by controlling a dimension (dimension in axial direction of accommodation sleeve) of each of the first inner sleeve, the second inner sleeve, and the optical functional component, distances between the first lens, the second lens, and the optical functional component can easily be set with high accuracy. Note that an inner space of the inner sleeve constitutes an optical path for light, so even in a case where the optical functional component is fixed by an adhesive to the end surface of the inner sleeve, it is possible to inhibit the adhesive from entering the optical path as much as possible.

In the above-mentioned structure, each of the first lens and the second lens may be the above-mentioned drum lens or C lens, but is preferably the one manufactured by machining a part of a spherical lens to have a flat surface portion. (Hereinafter, lens manufactured in this manner is referred to as "hemisphere-like lens.")

With this structure, the spherical surface portion of the first lens and the spherical surface portion of the second lens can be machined relatively easily with high accuracy, and the optimum optical alignment state of the lenses is obtained more reliably.

The hemisphere-like lens has the above-mentioned flat surface portion and a spherical surface portion (partial spherical surface) which is a part left as it is of a spherical surface of the spherical lens. It is preferable that a length (L) of a line extending from a vertex of the spherical surface of the spherical surface portion to the flat surface portion through the center of curvature (O: center of spherical surface of original spherical lens) be equal to or larger than a radius of curvature of the spherical surface portion (R: radius of original spherical lens). With this configuration, an acute angle portion is not formed in a boundary between the spherical surface portion and the flat surface portion, so damages such as crack are not easily caused in the hemisphere-like lens. Note that the flat surface portion constitutes a surface perpendicular to the above-mentioned line.

The above-mentioned hemisphere-like lens has such an advantage that, compared to the GRIN lens or the like, only by changing a lens shape such as the radius of curvature (R: radius of original spherical lens) of the spherical surface portion, the length (L) of the above-mentioned line, and the like, or a lens material (kind or composition of material), optical characteristics of the hemisphere-like lens can easily be changed. Further, the spherical lens serving as the material can be manufactured with high accuracy, so the hemisphere-like lens obtained by machining the spherical lens can be manufactured with high accuracy and at relatively low costs.

An optical device according to a third means for solving the above-mentioned first object is characterized by including the lens assembly according to the first means and is characterized in that, to each of one end surface and another end surface of the accommodation sleeve in the lens assembly, a capillary tube retaining member retaining a capillary tube having at least one optical fiber inserted therein and fixed thereto is fixed.

With this structure, the operational effect of the lens assembly according to the above-mentioned first means can similarly be received.

Note that the optical device may have a structure in which another end surface of each of the first lens and the second lens in the lens assembly according to the first means is made to be a flat surface portion, and to the flat surface portion, a capillary tube retaining member retaining a capillary tube having an optical fiber inserted therein and fixed thereto is fixed.

An optical device according to a fourth means for solving the above-mentioned first object is characterized in that, to each of an end surface on a side of the first inner sleeve, to which the first lens is fixed and an end surface on a side of the second inner sleeve, to which the second lens is fixed, in the lens assembly according to the second means, a capillary tube retaining member retaining a capillary tube having at least one optical fiber inserted therein and fixed thereto is fixed.

With this structure, the operational effect of the lens assembly according to the above-mentioned second means can similarly be received.

An optical device according to a fifth means for solving the above-mentioned first object is characterized by including the lens assembly according to the second means, and is characterized in that, to a flat surface portion provided on another end surface of each of the first lens and the second lens, a capillary tube retaining member retaining a capillary tube having at least one optical fiber inserted therein and fixed thereto is fixed.

With this structure, the operational effect of the lens assembly according to the above-mentioned first means can similarly be received.

In the above-mentioned structure, each of the first lens and the second lens is preferably the hemisphere-like lens.

With this structure, using the hemisphere-like lens, in a state where the lens assembly is incorporated into the optical device, a space amount with respect to the leading end of the optical fiber can be made larger than that in a case of using the drum lens having the same refractive index and the same focal distance. Accordingly, the hemisphere-like lens is advantageous in reducing effects of reflected return light to the optical fiber. Further, the hemisphere-like lens is arranged such that the flat surface portion thereof is perpendicular to an optical axis of the optical fiber, thereby making it possible to prevent or suppress deviation in inclination of the optical axis due to refraction of light passing through the lens in the flat surface portion.

An optical axis adjusting method for an optical device, according to a sixth means for solving the above-mentioned second object is characterized in that the optical axis adjusting method for the optical device including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, and in at least one of the lens capillary tube assemblies, the capillary tube and the retaining sleeve are relatively rotated about an axis and the retaining sleeve and the accommodation member are relatively rotated about the axis, thereby adjusting an optical axis of at least one of the lens capillary tube assemblies. Here, the optical functional component means an optical filter such as a WDM filter, a bandpass filter, a long wavelength transmission/reflection filter, a short wavelength transmission/reflection filter, or a correction gain equalizer filter, or an optical isolator core, or the like (the same in the following).

In this method, unlike in a conventional case where the lens capillary tube assembly is manufactured by fixing the lens and the capillary tube to the retaining sleeve before the optical axis adjustment of the lens capillary tube assembly is performed, in a state where the lens is fixed to the retaining sleeve, relative rotation is caused in two positions between the retaining sleeve and the capillary tube and between the retaining sleeve and the accommodation member, thereby performing the optical axis adjustment. That is, a degree of freedom in the case of the optical axis adjustment increases, so accurate optical axis adjustment can be performed easily. Further, in one of the relative rotation positions, a clearance can be made smaller to reduce an offset as much as possible. Accordingly, an adhesive layer in a case where the clearance is filled with the adhesive can be made thinner, and at the same time, variation in thickness of the adhesive layer in a peripheral direction thereof can be appropriately suppressed. As a result, characteristics against temperature changes are improved, and a swelling state corresponding to humidity becomes homogeneous, so it is possible to obtain the optical device having high reliability in view of performances such as optical characteristics and weatherability.

An optical device according to a seventh means for solving the above-mentioned second object is characterized by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, is characterized in that, in at least one of the lens capillary tube assemblies, the capillary tube and the retaining sleeve are relatively rotated about an axis and the retaining sleeve and the accommodation member are relatively rotated about the axis, thereby adjusting an optical axis of at least one of the lens capillary tube assemblies.

With this structure, the same operational effects as those of the above-mentioned sixth means can be received.

An optical device according to an eighth means for solving the above-mentioned second object is characterize by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, and is characterized in that, in at least one of the lens capillary tube assemblies, a diameter of a base end surface of the lens is larger than that of an inner hole of the retaining sleeve, the base end surface of the lens is fixed to a leading end surface of the retaining sleeve, and a clearance between an outer peripheral surface of a maximum outer diameter portion of the lens and an inner peripheral surface of an accommodation member is set to be larger than an adhesive-filled clearance between an outer peripheral surface of the retaining sleeve and an inner peripheral surface of the accommodation member.

With this structure, the diameter of the base end surface of the lens is larger than that of the inner hole of the retaining sleeve in the lens capillary tube assembly and the base end surface of the lens is fixed to the leading end surface of the retaining sleeve, so a shape or a size of the lens becomes less prone to be affected by the retaining sleeve and the capillary tube. As a result, a degree of design freedom of the lens increases. Accordingly, a curved surface having an appropriate radius of curvature can be formed with the lens being downsized, and optical characteristics such as abeam diameter is less prone to be constrained, so preferable optical characteristics is obtained. Further, the retaining sleeve and the capillary tube can be downsized by being less prone to be constrained by the size of the lens or the like. With the downsizing of the lens, downsizing of the optical device as a whole is achieved. Further, even if there is a thermal expansion difference between the lens and the retaining sleeve, expansion and contraction of those can be prevented from adversely affecting each other, and in particular, deviation of optical characteristics such as refractive index or optical dispersion due to concentration of stress to the lens is suppressed. Accordingly, the stable optical characteristics are obtained. Further, the clearance between the outer peripheral surface of the maximum outer diameter portion of the lens and the inner peripheral surface of the accommodation member is set to be larger than the adhesive-filled clearance between the outer peripheral surface of the retaining sleeve and the inner peripheral surface of the accommodation member. Accordingly, in a case where the optical axis adjustment is performed before filling the clearance with the adhesive, even when the retaining sleeve is relatively rotated with respect to the accommodation member, the lens and the accommodation member do not interfere with each other. Therefore, compared to a case where the outer diameters of the lens and the retaining sleeve are made equal to each other, the clearance required for inclining the retaining sleeve by a predetermined angle can be made small. As a result, an adhesive layer can be made thinner to suppress variation therein, and the above-mentioned advantage involved therein can be received.

An optical device according to a ninth means for solving the above-mentioned second object is characterized by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, and is characterized in that: in the first lens capillary tube assembly on one side, two optical fibers are used; in the second lens capillary tube assembly on another side, only one optical fiber is inserted into and fixed on a central axis of a single-core capillary tube; and in the pair of lens capillary tube assemblies, all of the capillary tubes and the retaining sleeves are coaxially arranged in the inner hole of the accommodation member.

With this structure, all of the capillary tubes and the retaining sleeves in the pair of lens capillary tube assemblies are coaxially arranged in the inner hole of the accommodation member, so machining of the components including the accommodation member becomes easier and assembly thereof can be performed more easily. In other words, the components can be accurately machined and the assembly can be accurately performed. Accordingly, the clearance for performing the optical axis adjustment can be made smaller to suppress variation therein. As a result, the adhesive layer can be made thinner to eliminate variation in thickness thereof, and the above-mentioned advantage involved therein can be received. Further, for the manufacture of the second lens capillary tube assembly, there can be used the inexpensive single-core capillary tube having a single hole formed in the central axis, for inserting the optical fiber, so costs of the optical device are reduced.

In this case, in order to achieve a structure of the first lens capillary tube assembly, in which two optical fibers are used, as a first optical fiber use mode, there is suggested a mode in which a triple-core capillary tube is used, and of three optical fibers in total including the optical fiber inserted into and fixed to the central axis of the capillary tube and two optical fibers inserted and fixed so as to be adjacent to both sides of the optical fiber, the optical fiber on the central axis and one of the other optical fibers are used, or in which a double-core capillary tube having holes in the same positions as those of the two optical fibers is manufactured and the two optical fibers inserted into and fixed to the holes of the capillary tube, respectively, are used. Further, as a second optical fiber use mode, there is suggested a mode in which a quadruple-core capillary tube is used, and of four optical fibers inserted and fixed uniformly about the central axis of the capillary tube, the adjacent two optical fibers are used, or in which a double-core capillary tube having holes in the same positions as those of the two optical fibers is manufactured and the two optical fibers inserted into and fixed to the holes of the capillary tube, respectively, are used.

In the ninth means, it is preferable that the lens of each of the pair of lens capillary tube assemblies be disposed so that a central axis of the lens is inclined.

In this case, as a mode of inclination of the lens, there are provided a first lens inclination mode in which the lens of one of the lens capillary tube assemblies and the lens of another of the lens capillary tube assemblies are inclined so as to be symmetric on both sides of the optical functional component, and a second lens inclination mode in which in the first lens inclination mode, one of the lenses is inclined while being rotated by 90 degrees about an axis of the retaining sleeve. In a case of adopting the first lens inclination mode, the first optical fiber use mode is adopted. In a case of adopting the second lens inclination mode, the second optical fiber use mode is adopted.

An optical device according to a tenth means for solving the above-mentioned second object is characterized by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that the lenses thereof are opposed to each other, an optical functional component being interposed between both the lenses, the pair of retaining sleeves being inserted into an inner hole of an accommodation member for accommodating the optical functional component, and is characterized in that: in the first lens capillary tube assembly on one side, two optical fibers are used; in the second lens capillary tube assembly on another side, only one optical fiber is inserted into and fixed on a central axis of a single-core capillary tube; the accommodation member is divided into two in an axial direction; a first accommodation member on one side and a second accommodation member on another side, which are obtained by dividing, are fixed to each other in a state where inner holes thereof are decentered; the capillary tube and the retaining sleeve of the first lens capillary tube assembly are coaxially arranged in the inner hole of the first accommodation member; and the capillary tube and the retaining sleeve of the second lens capillary tube assembly are coaxially arranged in the inner hole of the second accommodation member.

With this structure, the accommodation member is divided into two, that is, the first accommodation member and the second accommodation member, both the accommodation members are fixed in a state where the inner holes of those are decentered, so the optical axis adjustment can be performed by adjusting a degree of decentering thereof. Therefore, the clearance between the capillary tube and the retaining sleeve of each of the lens capillary tube assemblies and the clearance between each of the retaining sleeves and each of the accommodation members can also be made smaller and variation therein can be reduced more, so the extremely superior adhesive layer can be formed. Note that, the advantage obtained by inserting and fixing only one optical fiber to the single-core capillary tube on the central axis thereof in the second lens capillary tube assembly is as described above in the above-mentioned ninth means.

In the tenth means, it is preferable that the lens of the first lens capillary tube assembly be disposed so that a central axis of the lens is not inclined and the lens of the second lens capillary tube assembly is disposed so that a central axis of the lens is inclined.

With this structure, the leading end surface of the retaining sleeve of the first lens capillary tube assembly is not necessarily inclined, thereby facilitating manufacture thereof.

An optical device according to an eleventh means for solving the above-mentioned second object is characterized by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, and is characterized in that: in the first lens capillary tube assembly on one side, two optical fibers are used; in the second lens capillary tube assembly on another side, only one optical fiber is inserted into and fixed on a central axis of a single-core capillary tube; the accommodation member is divided into two in an axial direction; a first accommodation member on one side and a second accommodation member on another side, which are obtained by dividing, are fixed to each other in a state where inner holes thereof are not decentered; the capillary tube and the retaining sleeve of the first lens capillary tube assembly are coaxially arranged in the inner hole of the first accommodation member; the retaining sleeve of the second lens capillary tube assembly is divided into two in the axial direction; to a leading end of a retaining sleeve on a leading end side, which is obtained by dividing, the lens is fixed; into an inner hole of a retaining sleeve on a base end side, the single-core capillary tube is inserted; into an inner hole of the second accommodation member, the retaining sleeve on the leading end side is inserted; and the retaining sleeve on the base end side is fixed to a base end of the retaining sleeve on the leading end side while being decentered.

With this structure, the accommodation member is divided into two, that is, the first accommodation member on one side and the second accommodation member on the other side with the inner holes thereof not being decentered, the retaining sleeve and the capillary are arranged in the first accommodation member while not being decentered and the retaining sleeve and the capillary tube on the base end side are arranged in the second accommodation member while being decentered. Accordingly, the optical axis adjustment can also be performed by adjusting a degree of decentering thereof. Therefore, the clearance between the capillary tube and the retaining sleeve of each of the lens capillary tube assemblies and the clearance between each of the retaining sleeves and each of the accommodation members can be made smaller and variations therein can be reduced. As a result, extremely superior adhesive layers can be formed. Note that, an advantage obtained by inserting and fixing only one optical fiber to the single-core capillary tube on the central axis thereof in the second lens capillary tube assembly is as described above in the above-mentioned ninth means.

In the eleventh means, it is preferable that the lens of the first lens capillary tube assembly and the lens of the second lens capillary tube assembly be arranged so that central axes of those are not inclined.

With this structure, the leading end surfaces of both the retaining sleeves in the first lens capillary tube assembly and the second lens capillary tube assembly are not necessarily inclined, thereby further facilitating manufacture thereof.

An optical device according to a twelfth means for solving the above-mentioned second object is characterized by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, and is characterized in that: in the first lens capillary tube assembly on one side, two optical fibers are used; in the second lens capillary tube assembly on another side, only one optical fiber is inserted into and fixed on a central axis of a single-core capillary tube; the accommodation member is divided into three in an axial direction; a first accommodation member and a second accommodation member on both end sides in the axial direction, which are obtained by dividing, are fixed to each other so that inner holes thereof are decentered, through an intermediation of a third accommodation member; in the inner hole of the first accommodation member, the capillary tube and the retaining sleeve of the first lens capillary tube assembly are coaxially arranged; in the inner hole of the second accommodation member, the capillary tube and the retaining sleeve of the second lens capillary tube assembly are coaxially arranged; and to an inner peripheral-side portion of the third accommodation member, the optical functional component is attached.

With this structure, the third accommodation member to which the optical functional component is attached is fixed as a separate body between the first accommodation member and the second accommodation member. Accordingly, in addition to the advantage obtained by the tenth means of the present invention, there is obtained an advantage of being capable of accurately and easily performing the position adjustment between each of the lens capillary assemblies and the optical functional component.

In the twelfth means, it is preferable that the lens of the first lens capillary tube assembly be disposed so that the central axis of the lens is not inclined, and the lens of the second capillary tube assembly be disposed so that the central axis of the lens is inclined.

With this structure, the same advantage as an item which is already described in relation to the tenth means is obtained.

An optical device according to a thirteenth means for solving the above-mentioned second object is characterized by including a pair of lens capillary tube assemblies in each of which a capillary tube having at least one optical fiber inserted thereinto and fixed thereto is inserted into an inner hole of a retaining sleeve and a lens is fixed to a leading end of the retaining sleeve, the pair of lens capillary tube assemblies being arranged so that lenses thereof are opposed to each other, an optical functional component being interposed between both the lenses, the pair of retaining sleeves being inserted into an inner hole of an accommodation member for accommodating the optical functional component, and is characterized in that: in the first lens capillary tube assembly on one side, two optical fibers are used; in the second lens capillary tube assembly on another side, only one optical fiber is inserted into and fixed on a central axis of a single-core capillary tube; the accommodation member is divided into three in an axial direction; a first accommodation member and a second accommodation member on both end sides in the axial direction, which are obtained by dividing, are fixed to each other in a state where inner holes thereof are not decentered, through an intermediation of a third accommodation member; the capillary tube and the retaining sleeve of the first lens capillary tube assembly are coaxially arranged in the inner hole of the first accommodation member; the retaining sleeve of the second lens capillary tube assembly is divided into two in the axial direction; to a leading end of a retaining sleeve on a leading end side, which is obtained by dividing, the lens is fixed; into an inner hole of a retaining sleeve on a base end side, the single-core capillary tube is inserted; into the inner hole of the second accommodation member, the retaining sleeve on the leading end side is inserted; and the retaining sleeve on the base end side is fixed to a base end of the retaining sleeve on the leading end side while being decentered; and to an inner peripheral-side portion of the third accommodation member, the optical functional component is attached.

With this structure, the third accommodation member to which the optical functional component is attached is fixed as a separate body between the first accommodation member and the second accommodation member. Accordingly, in addition to the advantage obtained by the eleventh means of the present invention, there is obtained an advantage of being capable of accurately and easily performing the position adjustment between each of the lens capillary assemblies and the optical functional component.

In the thirteenth means, it is preferable that the lens of the first lens capillary tube assembly and the lens of the second lens capillary tube assembly be arranged so that central axes of those are not inclined.

With this structure, the same advantage as an item which is already described in relation to the eleventh means is obtained.

In the above-mentioned seventh to thirteenth means, it is preferable that at least one of the lenses of the pair of lens capillary tube assemblies have a hemisphere-like shape and has a flat surface portion forming a base end surface of the one of the lenses, the flat surface portion being fixed to the leading end surface of the corresponding retaining sleeve.

In this case, each of the first lens of the lens capillary tube assembly on the one side and the second lens of the lens capillary tube assembly on the another side has a function of collimating light emitted from the optical fiber into parallel light and collecting the parallel light to allow the collected light to be incident on the optical fiber. Further, the first lens and the second lens may be a GRIN lens, a drum lens, a C lens, or an aspherical lens. One or both of those are preferably lenses each having a hemisphere-like shape. (Hereinafter, referred to also as hemisphere-like lens.) It is preferable that a length (L) of a line extending from a vertex of the spherical surface of the spherical surface portion to the flat surface portion through the center of curvature in the hemisphere-like lens be equal to or larger than a radius of curvature of the spherical surface portion. With this configuration, an acute angle portion is not formed in a boundary between the spherical surface portion and the flat surface portion, so damages such as crack are less prone to be caused in the hemisphere-like lens. Further, the hemisphere-like lens can be handled more easily by using a gripping tool such as tweezers. Note that the flat surface portion constitutes a surface perpendicular to the above-mentioned line. The hemisphere-like lens has such an advantage that, compared to the GRIN lens or the like, only by changing a lens shape such as the radius of curvature of the spherical surface portion, or the length (L) of the line, or a lens material (kind or composition of material), optical characteristics of the hemisphere-like lens can easily be changed.

In this case, it is preferable that the hemisphere-like lens be manufactured by machining a part of a spherical lens.

That is, the hemisphere-like lens has the flat surface portion and the spherical surface portion (partial spherical surface) which is a part left as it is of a spherical surface of the spherical lens. Since the spherical lens serving as the material can be manufactured with high accuracy, the hemisphere-like lens obtained by machining the spherical lens can be manufactured with high accuracy and at relatively low costs.

Note that it is preferable that a surface of the flat surface portion of the lens, through which light passes and/or a surface of the leading end surface of the lens, through which light passes be applied with antireflection coating.

With this structure, noise due to return light reflected by the lens is reduced, thereby being advantageous in performing stable high-speed optical communication.

Effects of the Invention

According to the present invention, an optical device with which high reliability is obtained in view of performances such as optical characteristics and weatherability can be provided.

Further, according to the present invention, an optical device which is less expensive can be provided by reducing manufacturing costs.

Further, according to the present invention, appropriate and easy optical axis adjustment of the lens capillary tube assembly is enabled.

BRIEF DESCRIPTION OF THE DRAWINGS

FIG. 1a is a horizontal sectional view showing a schematic structure of an optical device according to a first embodiment of the present invention, and FIG. 1b is a vertical sectional view thereof.

FIG. 3a is a horizontal sectional view showing a schematic structure of an optical device according to a second embodiment of the present invention, and FIG. 3b is a vertical sectional view thereof.

FIG. 4a is a horizontal sectional view showing a schematic structure of an optical device according to a third embodiment of the present invention, and FIG. 4b is a vertical sectional view thereof.

FIG. 5a is a horizontal sectional view showing a schematic structure of an optical device according to a fourth embodiment of the present invention, and FIG. 5b is a vertical sectional view thereof.

FIG. 6a is a horizontal sectional view showing a schematic structure of an optical device according to a fifth embodiment of the present invention, and FIG. 6b is a vertical sectional view thereof.

FIG. 8a is a horizontal sectional plan view showing a schematic structure of an optical device according to a seventh embodiment of the present invention, FIG. 8b is a vertical sectional side view thereof, FIG. 8c is an end surface view of a first capillary tube thereof, and FIG. 8d is an end surface view of a second capillary tube thereof.

FIG. 10a is a horizontal sectional plan view showing a schematic structure of an optical device according to ninth embodiment of the present invention, FIG. 10b is a vertical sectional side view thereof, FIG. 10c is an end surface view of a first capillary tube thereof, and FIG. 10d is an end surface view of a second capillary tube thereof.

FIG. 11a is a horizontal sectional plan view showing a schematic structure of an optical device according to a tenth embodiment of the present invention, FIG. 11b is a vertical sectional side view thereof, FIG. 11c is an end surface view of a first capillary tube thereof, and FIG. 11d is an end surface view of a second capillary tube thereof.

FIG. 12a is a horizontal sectional plan view showing a schematic structure of an optical device according to an eleventh embodiment of the present invention, FIG. 12b is a vertical sectional side view thereof, FIG. 12c is an end surface view of a first capillary tube thereof, and FIG. 12d is an end surface view of a second capillary tube thereof.

FIG. 13a is a horizontal sectional plan view showing a schematic structure of an optical device according to a twelfth embodiment of the present invention, FIG. 13b is a vertical sectional side view thereof, FIG. 13c is an end surface view of a first capillary tube thereof, and FIG. 13d is an end surface view of a second capillary tube thereof.

FIG. 14a is a horizontal sectional plan view showing a schematic structure of an optical device according to a thirteenth embodiment of the present invention, FIG. 14b is a vertical sectional side view thereof, FIG. 14c is an end surface view of a first capillary tube thereof, and FIG. 14d is an end surface view of a second capillary tube thereof.

FIG. 20a is a horizontal sectional plan view showing a schematic structure of an optical device according to a nineteenth embodiment of the present invention, and FIG. 20b is a vertical sectional side view thereof.

FIG. 25a is a horizontal sectional plan view showing a schematic structure of an optical device according to a twenty-fourth embodiment of the present invention, and FIG. 25b is a vertical sectional side view thereof.

FIG. 29a is a horizontal sectional plan view showing a schematic structure of an optical device according to a twenty-eighth embodiment of the present invention, and FIG. 29b is a vertical sectional side view thereof.

FIG. 30a is a horizontal sectional plan view showing a schematic structure of an optical device according to a twenty-ninth embodiment of the present invention, and FIG. 30b is a vertical sectional side view thereof.

Figure 2:
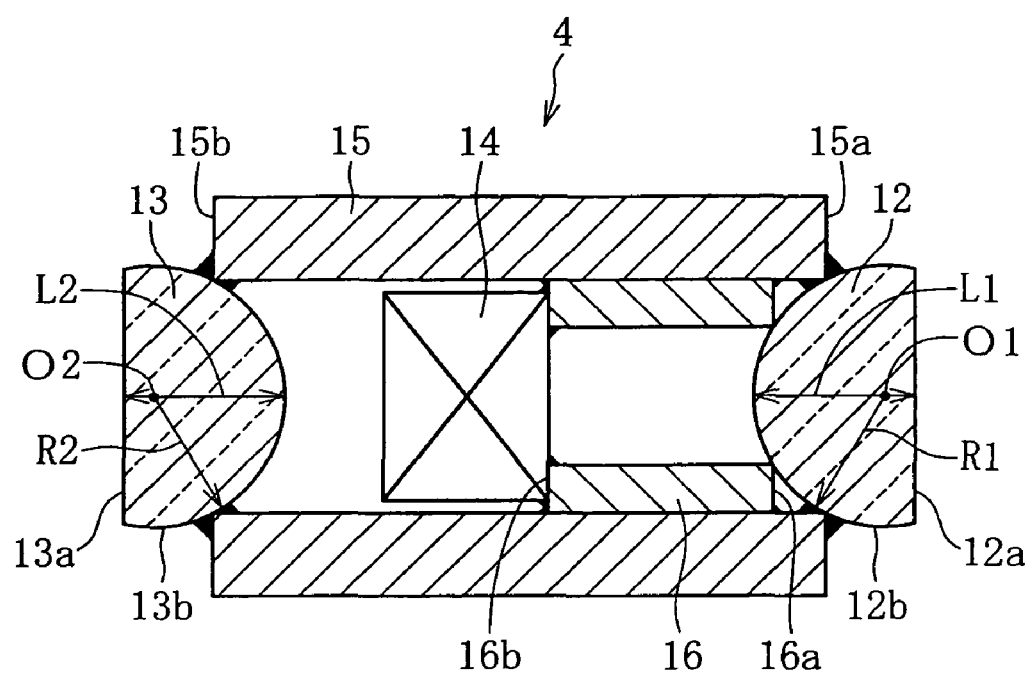
FIG. 2 is a vertical sectional view showing a schematic structure of a lens assembly of the optical device according to the first embodiment of the present invention.

DESCRIPTION OF SYMBOLS 1, 21, 31, 41, 51 optical device
2 first capillary tube assembly
3 second capillary tube assembly
4, 22, 32, 42, 52 lens assembly
5, 6, 9 optical fiber
5a, 6a, 9a leading end surface
7, 10 capillary tube
7a, 10a leading end surface
8, 11 retaining sleeve (capillary tube retaining member)
8a, 11a one end surface
12 first lens
12a flat surface portion (another end surface)
12b spherical surface portion (one end surface)
O1 center of curvature
L1 length of line extending from vertex of spherical surface to flat surface portion through center of curvature
R1 radius of curvature of spherical surface portion
13 second lens
13a flat surface portion (another end surface)
13b spherical surface portion (one end surface)
O2 center of curvature
L2 length of line extending from vertex of spherical surface to flat surface portion through center of curvature
R2 radius of curvature
14 bandpass filter (optical functional component)
15 accommodation sleeve
15a one end surface
15b another end surface
16 inner sleeve
16a one end surface
16b another end surface
23 first inner sleeve
23a one end surface
23b another end surface
24 second inner sleeve
24a one end surface
24b another end surface
61 optical device
62a first optical fiber
62b second optical fiber
62c third optical fiber
62d fourth optical fiber
62e fifth optical fiber
62f sixth optical fiber
63a first capillary tube
63aa leading end surface of first capillary tube
63ax non-inclined portion at lower end of leading end surface of first capillary tube
63b second capillary tube
63ba leading end surface of second capillary tube
63bx non-inclined portion at lower end of leading end surface of second capillary tube
64a first retaining sleeve
64aa leading end surface of first retaining sleeve
64b second retaining sleeve
64ba leading end surface of second retaining sleeve
65a first lens (hemisphere-like lens)
65aa flat surface of first lens
65b second lens (hemisphere-like lens)
65ba flat surface of second lens
66 first lens capillary tube assembly
67 second lens capillary tube assembly
68 accommodation sleeve (accommodation member)
68a first accommodation sleeve
68b second accommodation sleeve
68c third accommodation sleeve
69 mounting sleeve
610 optical filter (optical functional component)
610a end surface of optical filter
611 auxiliary retaining sleeve
A clearance between outer peripheral surface of maximum outer diameter portion of lens and inner hole (inner peripheral surface) of accommodation sleeve
B clearance to be charged with adhesive, between outer peripheral surface of retaining sleeve and inner peripheral surface of accommodation sleeve C clearance between inner peripheral surface of retaining sleeve and outer peripheral surface of capillary tube

DETAILED DESCRIPTION OF THE PREFERRED EMBODIMENTS

Hereinafter, embodiments of the present invention will be described with reference to the drawings.

FIG. 1(a) is a horizontal sectional view showing a schematic structure of an optical device 1 according to a first embodiment of the present invention, and FIG. 1(b) is a vertical sectional view of the optical device 1. As shown in FIGS. 1(a) and 1(b), the optical device 1 has a structure in which a dual-fiber collimator and a single-fiber collimator are combined with each other. The optical device 1 can be used for wavelength division multiplex (WDM) or the like.

The optical device 1 includes, as main components thereof, a first capillary tube assembly 2, a second capillary tube assembly 3, and a lens assembly 4.

The first capillary tube assembly 2 includes a capillary tube 7 made of glass, in which two optical fibers 5 and 6 are fixed by an adhesive to inner holes of two cores, respectively, and a retaining sleeve (capillary tube retaining member) 8 made of glass, coaxially fitted onto an outer periphery of the capillary tube 7 and fixed thereto by the adhesive or the like. Leading end surfaces 5a and 6a of the optical fibers 5 and 6 and an leading end surface 7a of the capillary tube 7 are subjected to polishing so as to form the same inclined surface inclined with respect to optical axes of the optical fibers 5 and 6. As a result, return light reflected by ends of the optical fibers 5 and 6 are suppressed (see, FIG. 1(a)). Further, on each of the leading end surfaces 5a and 6a of the optical fibers 5 and 6, there is formed an antireflection film. A one end surface 8a of the retaining sleeve 8 is formed to be a surface perpendicular to the optical axes of the optical fibers 5 and 6. A perpendicularity of the end surface 8a is controlled with an accuracy of, for example, ±0.5 degrees or less, preferably, ±0.2 degrees or less with respect to a geometrically ideal flat surface in which the optical axes of the optical fibers 5 and 6 serve as normal lines.

The second capillary tube assembly 3 includes a capillary tube 10 made of glass, in which one optical fiber 9 is fixed by the adhesive in an inner hole of a single core, and a retaining sleeve 11 made of glass, which is coaxially fitted onto an outer periphery of the capillary tube 10 and fixed thereto by the adhesive. The leading end surface 9a of the optical fiber 9 and the leading end surface 10a of the capillary tube 10 are subjected to polishing to form the same inclined surface inclined with respect to the optical axis of the optical fiber 9. As a result, return light reflected by a leading end of the optical fiber 9 is suppressed (see, FIG. 1(a)). Further, on the leading end surface 9a of the optical fiber 9, there is formed the antireflection film. A one end surface 11a of the retaining sleeve 11 is formed to be a surface perpendicular to the optical axis of the optical fiber 9. A perpendicularity of the end surface 11a is controlled with an accuracy of, for example, ±0.5 degrees or less, preferably, ±0.2 or less degrees with respect to a geometrically ideal flat surface in which the optical axis of the optical fiber 9 serves as the normal line.

The lens assembly 4 includes, as main components thereof, a first lens 12 opposed to the leading end surfaces 5a and 6a of the optical fibers 5 and 6 of the first capillary tube assembly 2 through an intermediation of a space, a second lens 13 opposed to the leading end surface 9a of the optical fiber 9 of the second capillary tube assembly 3 through an intermediation of a space, an optical functional component interposed between the first lens 12 and the second lens 13, for example, an optical filter, particularly, a bandpass filter 14, and an accommodation sleeve 15 made of glass, for accommodating those components.

As shown in FIG. 2 while being enlarged, in this embodiment, the first lens 12 is a lens manufactured by machining a part of a spherical lens to have a flat surface portion (hemisphere-like lens), which has a flat surface portion 12a formed by removing a part of the spherical lens by polishing or the like and a spherical surface portion 12b which is a remaining portion of the spherical lens. A length (L1) of a line extending from a vertex of a spherical surface of the spherical surface portion 12b to the flat surface portion 12a through a center of curvature (O1: center of spherical surface of original spherical lens) is larger than a radius of curvature (R1: radius of original spherical lens) of the spherical surface portion 12b. Further, the second lens 13 is also a lens manufactured by machining a portion of the spherical lens to have the flat surface portion (hemisphere-like lens), which has a flat surface portion 13a formed by removing a part of the spherical lens by polishing or the like and a spherical surface portion 13b which is a remaining portion of the spherical lens. A length (L2) of a line extending from a vertex of a spherical surface of the spherical surface portion 13b to the flat surface portion 13a through a center of curvature (O2: center of spherical surface of original spherical lens) is larger than a radius of curvature (R2: radius of original spherical lens) of the spherical surface portion 13b. Note that, in this embodiment, the first lens 12 and the second lens 13 have the lengths (L1 and L2) of the lines and the radii of curvature (R1 and R2) which are the same with each other (L1=L2, R1=R2), and the lengths (L1 and L2) of the lines and the radii of curvature (R1 and R2) have a relationship of L1(L2)=1.2×R1(R2).

Each of the first lens 12 and the second lens 13 is formed of, for example, optical glass of a uniform refractive index type. Examples of the optical glass can include MK-18 (manufactured by Nippon Electric Glass Co., Ltd.) having a refractive index of 1.7 or more and RH-21 (manufactured by Nippon Electric Glass Co., Ltd.) having a refractive index of 1.9 or more. Note that, for example, each of the first lens 12 and the second lens 13, which is formed of MK-18 and has a relationship of L1(L2)=1.2×R1(R2), enables increase in space amount with respect to the leading end of the optical fiber about 3.7 times larger than that of a drum lens having the same refractive index and the same focal length. Accordingly, the strength of the reflected return light to the optical fiber can be reduced to about one tenth or lower than that in the case using the drum lens. Further, on a portion of each of the flat surface portions 12a and 13a and the spherical surface portions 12b and 13b of the first lens 12 and the second lens 13, respectively, through which light passes, there is formed the antireflection film.

The first lens 12 is fixed by the adhesive to one end side of the accommodation sleeve 15 in a state where the spherical surface portion 12b thereof is abutted on a one end-side opening edge portion of the accommodation sleeve 15. The second lens 13 is fixed by the adhesive to another end side of the accommodation sleeve 15 in a state where the spherical surface portion 13b thereof is abutted on an another end-side opening edge portion of the accommodation sleeve 15.

In this embodiment, the bandpass filter 14 serving as the optical functional component is fixed to an inner peripheral surface of the accommodation sleeve 15 through the intermediation of an inner sleeve 16. The inner sleeve 16 is made of glass, metal, ceramics, or the like (glass in this embodiment), and is formed into a circular ring shape or a cylindrical shape. Specifically, the inner sleeve 16 is fitted to an inner periphery of the accommodation sleeve 15, and is fixed by the adhesive to the inner peripheral surface of the accommodation sleeve 15 in a state where a one end-side opening edge portion of the inner sleeve 16 is abutted on the spherical surface portion 12b of the first lens 12. Note that the inner sleeve 16 may be fixed by the adhesive to the spherical surface portion 12b of the first lens in stead of the inner peripheral surface of the accommodation sleeve 15. The bandpass filter 14 is fixed by the adhesive to an another end surface 16b of the inner sleeve 16. In this state, the bandpass filter 14 is opposed to the spherical surface portion 12b of the first lens 12 through the intermediation of an inner space of the inner sleeve 16, and is opposed to the spherical surface portion 13b of the second lens 13 through the intermediation of an inner space of the accommodation sleeve 15. That is, relative intervals between the first lens 12, the second lens 13, and the bandpass filter 14 can be easily set with high accuracy by controlling an axial dimension of each of the accommodation sleeve 15 and the inner sleeve 16. Note that there may be adopted a structure in which an another-end opening portion of the inner sleeve 16 may be fixed by the adhesive to the inner peripheral surface of the accommodation sleeve 15 while being abutted on the spherical surface portion 13b of the second lens 13, thereby fixing the bandpass filter 14 to a one end surface 16a of the inner sleeve 16 by the adhesive. In this case, the inner sleeve 16 may be fixed by the adhesive to the spherical surface portion 13b of the second lens instead of the inner peripheral surface of the accommodation sleeve 15.

Each of end surfaces 15a and 15b of the accommodation sleeve 15 is formed in a flat surface perpendicular to a central axis of an inner periphery of the accommodation sleeve 15. Perpendicularity thereof is controlled with an accuracy of ±0.5 degree or less, preferably ±0.2 degree or less with respect to a geometrically ideal flat surface in which the central axis of the inner periphery thereof serves as the normal line. The flat surface portion 12a of the first lens 12 and the flat surface portion 13a of the second lens 13 are in parallel to the both end surfaces 15a and 15b of the accommodation sleeve 15.

Further, each of the end surfaces 16a and 16b of the inner sleeve 16 is formed in a flat surface perpendicular to a central axis of an inner periphery of the inner sleeve 16. Perpendicularity thereof is controlled with an accuracy of ±0.5 degree or less, preferably ±0.2 degree or less with respect to a geometrically ideal flat surface in which the central axis of the inner periphery thereof is the normal line.

As shown in FIGS. 1(a) and 1(b), the first capillary tube assembly 2 and the lens assembly 4 are fixed to each other by the adhesive in a state where the one end surface 8a of the retaining sleeve 8 and the one end surface 15a of the accommodation sleeve 15 abut on each other. The second capillary tube assembly 3 and the lens assembly 4 are fixed to each other by the adhesive in a state where the one end surface 11a of the retaining sleeve 11 and the another end surface 15b of the accommodation sleeve 15 abut on each other. The flat surface portion 12a of the first lens 12 is opposed to the leading end surfaces 5a and 6a of the optical fibers 5 and 6, respectively, of the first capillary tube assembly 2 through an intermediation of a space. The flat surface portion 13a of the second lens 13 is opposed to the leading end surface 9a of the optical fiber 9 of the second capillary tube assembly 3 through an intermediation of a space. Note that the inner peripheral surface of the retaining sleeve 8 of the first capillary tube assembly 2 is provided with a large diameter portion and a small diameter portion which is smaller in diameter than the large diameter portion in the stated order from the lens assembly 4 side. The capillary tube 7 is inserted into and fixed to the small diameter portion. The first lens 12 is accommodated in the large diameter portion through an intermediation of a space. In the same manner, the inner peripheral portion of the retaining sleeve 11 of the second capillary tube assembly 3 is provided with a large diameter portion and a small diameter portion, and the capillary tube 10 is inserted into and fixed to the small diameter portion, and the second lens 13 is accommodated in the large diameter portion through an intermediation of a space.

The optical device 1 of this embodiment can be assembled as described below.

First, the first lens 12 is fixed by the adhesive to the one end side of the accommodation sleeve 15 in the above-mentioned mode. In this case, pressing by a positioning jig is appropriately performed, thereby performing the fixation such that the flat surface portion 12a of the first lens 12, and the one end surface 15a of the accommodation sleeve and/or the another end surface 15b, whose perpendicularity with respect to the central axis are/is controlled, are in parallel or substantially in parallel to each other. After that, the inner sleeve 16 to which the bandpass filter 14 is adhered and fixed is inserted into the inner periphery of the accommodation sleeve 15 from the another end side of the accommodation sleeve 15. In the state where the one end-side opening edge portion of the inner sleeve 16 is abutted on the spherical surface portion 12b of the first lens 12, the outer peripheral surface of the inner sleeve 16 is fixed by the adhesive to the inner peripheral surface of the accommodation sleeve 15. Note that the inner sleeve 16 may be fixed by the adhesive to the spherical surface portion 12b of the first lens 12 in stead of the inner peripheral surface of the accommodation sleeve 15. Further, in order to enable smooth insertion of the inner sleeve 16 into the inner periphery of the accommodation sleeve 15, an outer diameter of the inner sleeve 16 and an inner diameter of the accommodation sleeve 15 are set to be substantially equal to each other. Specifically, a clearance between the inner peripheral surface of the accommodation sleeve 15 and the outer peripheral surface of the inner sleeve 16 is set to be, for example, 0.030 mm or smaller, preferably, 0.015 mm or smaller.

As described above, on the another end side of the accommodation sleeve 15, to which the first lens 12, the inner sleeve 16, and the bandpass filter 14 are fixed, the second lens 13 is fixed by the adhesive in the above-described mode, thereby making it possible to manufacture the lens assembly 4. In this case, pressing by the positioning jig is appropriately performed, thereby performing the fixation such that the flat surface portion 13a of the second lens 13, and the another end surface 15b of the accommodation sleeve 15 and/or the one end surface 15a, whose perpendicularity with respect to the central axis are/is controlled, are in parallel or substantially in parallel to each other.

With this structure, the center of curvature O1 of the spherical surface portion 12b of the first lens 12 can be made to coincide or substantially coincide with the central axis of the inner periphery of the accommodation sleeve 15. Further, the center of curvature O2 of the spherical surface portion 13b of the second lens 13 can be made to coincide or substantially coincide with the central axis of the inner periphery of the accommodation sleeve 15. The first lens 12 and the second lens 13 are fixed to both the end opening edge portions of the common accommodation sleeve 15. Accordingly, by controlling the axial dimension of the accommodation sleeve 15, an interval between the first lens 12 and the second lens 13 can be easily set with high accuracy. Further, the bandpass filter 14 is fixed to the another end surface 16b of the inner sleeve 16 in the state where the one end-side opening edge portion of the inner sleeve 16 is abutted on the spherical surface portion 12b of the first lens 12. Accordingly, by controlling the axial dimension of the inner sleeve 16, an interval between the bandpass filer 14 and the first lens 12 can be easily set with high accuracy. Accordingly, by controlling the axial dimension of each of the accommodation sleeve 15, the inner sleeve 16, and the bandpass filter 14, the intervals between the first lens 12, the second lens 13, and the bandpass filter 14 can be set easily with high accuracy.

Next, on the one end surface 15a of the accommodation sleeve 15 of the lens assembly 4 manufactured as described above, the one end surface 8a of the retaining sleeve 8 of the first capillary tube assembly 2 is abutted, and relative positions of those are adjusted in directions (X-axis and Y-axis directions) perpendicular to an optical axis direction (Z-axis direction) of the optical fibers 8 and 9. At the same time, in the abutted retaining sleeve 8 of the first capillary tube assembly 2, the capillary tube 7 is moved in the optical axis direction (Z-axis direction), thereby adjusting a position of the leading end surfaces 5a and 6a of the optical fibers 5 and 6 fixed to the capillary tube 7. Then, for example, adhesion and fixation are performed in an optimum optical alignment state such that, for example, light emitted from the optical fiber 5 on one side is reflected by the bandpass filter 14, and is returned to the optical fiber 6 on another side.

Further, on the another end surface 15b of the accommodation sleeve 15 of the lens assembly 4, the one end surface 11a of the retaining sleeve 11 of the second capillary tube assembly 3 is abutted, and relative positions of those are adjusted in directions (X-axis and Y-axis directions) perpendicular to an optical axis direction (Z-axis direction) of the optical fiber 9. At the same time, in the abutted retaining sleeve 11 of the second capillary tube assembly 3, the capillary tube 10 is moved in the optical axis direction (Z-axis direction), thereby adjusting a position of the leading end surface 9a of the optical fiber 9 fixed to the capillary tube 10. Further, the capillary tube 10 is rotated, thereby adjusting an inclination direction of the leading end surface 9a inclined with respect to the optical axis of the optical fiber 9 fixed to the capillary tube 10. Then, for example, adhesion and fixation are performed in an optimum optical alignment state such that, for example, light emitted from the optical fiber 5 on one side of the first capillary tube assembly 2 passes through the bandpass filter 14, and is incident on the optical fiber 9.

In an assembling method for the optical device 1 described above, when all components constituting the optical device 1 is made of a transparent material (for example, resin or glass), a UV-curing adhesive can be used as the adhesive, thereby improving an operability of an assembling operation. Further, in the adhesion between the retaining sleeve 8(11) and the capillary tube 7(10), and/or the adhesion between the capillary tube assembly 2(3) and the lens assembly 4, after temporal fixation is performed by the UV-curing adhesive, fixation may be performed by a thermosetting adhesive with higher reliability.

Next, a description will be made of a use example of the optical device 1 according to this embodiment by taking a case where the optical device 1 is used as an optical demultiplexer as an example.

For example, light of relatively different wavelengths λ1 and λ2 are emitted from the optical fiber 5 on the one side of the first capillary tube assembly 2. The bandpass filter 14 has optical characteristics allowing reflection of the light of wavelength λ1 and passage of the light of wavelength λ2. The light of wavelength λ1 emitted from the optical fiber 5 of the first capillary tube assembly 2 is collimated to be parallel light by the first lens 12 and is reflected by the bandpass filter 14. The light of wavelength λ1 reflected by the bandpass filter 14 is collected by the first lens 12 and is returned to the optical fiber 6 on another side of the first capillary tube assembly 2. On the other hand, the light of wavelength λ2 emitted from the optical fiber 5 of the first capillary tube assembly 2 is collimated to be parallel light by the first lens 12 and enters the bandpass filter 14. Then, the light passes through the bandpass filter 14 and is collected by the second lens 13 to be incident on the optical fiber 9 of the second capillary tube assembly 3.

FIG. 3(a) is a horizontal sectional view showing a schematic structure of an optical device 21 according to a second embodiment of the present invention. FIG. 3(b) is a vertical sectional view thereof. Note that, components and portions substantially the same as those of the optical device 1 according to the first embodiment are denoted by the same reference symbols, and repetitive descriptions will be omitted.

The optical device 21 according to this embodiment differs from the optical device 1 according to the first embodiment in structure of a lens assembly 22 and a method of fixing the first capillary tube assembly 2 and the second capillary tube assembly 3 to the lens assembly 22. That is, as shown in FIGS. 3(a) and (b), in the lens assembly 22, a first inner sleeve 23 and a second inner sleeve 24 are coaxially fitted and fixed to the inner periphery of the accommodation sleeve 15. Between an another end surface 23b of the first inner sleeve 23 and a one end surface 24a of the second inner sleeve 24, which are fitted and fixed, a bandpass filter 14 is fixed while being brought into contact with the end surfaces 23b and 24a. In this case, the band path filter 14 is fixed by the adhesive to at least one of the another end surface 23b of the first inner sleeve 23 and the one end surface 24a of the second inner sleeve 24 (in this embodiment, the bandpass filter 14 is fixed by the adhesive to the another end surface 23b of the first inner sleeve 23). The first lens 12 is fixed by the adhesive to a one end side of the first inner sleeve 23 in a state where the spherical surface portion 12b thereof is abutted on a one end-side opening edge portion of the first inner sleeve 23. The second lens 13 is fixed by the adhesive to an another end side of the second inner sleeve 24 in a state where the spherical surface portion 13b thereof is abutted on an another end-side opening edge portion of the second inner sleeve 24.

Further, a one end surface 23a of the first inner sleeve 23 and an another end surface 24b of the second inner sleeve 24 slightly protrude outwardly from both ends of the accommodation sleeve 15. The retaining sleeve 8 in the first capillary tube assembly 2 is fixed by the adhesive to the one end surface 23a of the first inner sleeve 23. Further, the retaining sleeve 11 in the second capillary tube assembly 3 is fixed by the adhesive to the another end surface 24b of the second inner sleeve 24. Note that each of both the end surfaces 23a and 23b of the first inner sleeve 23 and both the end surfaces 24a and 24b of the second inner sleeve 24 is formed to be a flat surface perpendicular to a central axis of an inner periphery of each of the first inner sleeve 23 and the second inner sleeve 24. Perpendicularity thereof is controlled with accuracy of, for example, ±0.5 degree or less, preferably ±0.2 degree or less with respect to a geometrically ideal flat surface in which the central axis of the inner periphery of each of the first inner sleeve 23 and the second inner sleeve 24 is the normal line.

With this structure, the center of curvature of the spherical surface portion 12b of the first lens 12 can easily be allowed to coincide with the central axis of the inner periphery of the first inner sleeve 23. Further, the center of curvature of the spherical surface portion 13b of the second lens 13 can easily be made to coincide with the central axis of the inner periphery of the second inner sleeve 24. Since both the inner sleeves 23 and 24 are coaxially fitted and fixed to the inner periphery of the common accommodation sleeve 15, the center of curvature of each of the spherical surface portions 12b and 13b of the first lens 12 and the second lens 13, respectively, can easily be made to coincide with the central axis of the inner periphery of the accommodation sleeve 15. Further, the first lens 12, the second lens 13, and the bandpass filter 14 are continuous with each other in the axial direction through the intermediation of the first inner sleeve 23 and the second inner sleeve 24. Accordingly, by controlling axial dimensions of the first inner sleeve 23, the second inner sleeve 24, and the bandpass filter 14, intervals between the first lens 12, the second lens 13, and the bandpass filter 14 can be easily set with high accuracy.

The optical device 21 according to this embodiment can be assembled as described below.

First, the first lens 12 and the bandpass filter 14 are fixed by the adhesive to the first inner sleeve 23 in the above-mentioned mode, and an assembly including those three components is manufactured. In this case, pressing by the positioning jig is appropriately performed, thereby performing the fixation such that the flat surface portion 12a of the first lens 12, and the one end surface 23a and/or the another end surface 23b, whose perpendicularity with respect to the central axis of the first inner sleeve 23 are/is controlled, are in parallel or substantially in parallel to each other. The assembly is inserted into the inner periphery of the accommodation sleeve 15 and a position of the assembly is adjusted. After that, an outer periphery of the first inner sleeve 23 is fixed by the adhesive to the inner periphery of the accommodation sleeve 15. Note that, in order to enable smooth insertion of the first inner sleeve 23 of the assembly into the inner periphery of the accommodation sleeve 15, an outer peripheral diameter of the first inner sleeve 23 and an inner peripheral diameter of the accommodation sleeve 15 are made substantially equal to each other. Specifically, a clearance between the inner peripheral surface of the accommodation sleeve 15 and the outer peripheral surface of the first inner sleeve 23 is set to be, for example, 0.030 mm or smaller, preferably, 0.015 mm or smaller. With this structure, the assembly can be fixed to the accommodation sleeve 15 such that there is realized a state where the flat surface portion 12a of the first lens 12 is in parallel to the one end surface 23a of the first inner sleeve 23 and/or the another end surface 23b thereof, and the flat surface portion 12a is perpendicular to the central axis of the inner periphery of the accommodation sleeve 15, or a state close to this state.

Next, the first lens 13 is fixed by the adhesive to the second inner sleeve 24 in the above-mentioned mode, thereby manufacturing an assembly including those two components. In this case, pressing by the positioning jig is appropriately performed, thereby performing the fixation such that the flat surface portion 13a of the second lens 13, and the another end surface 24b and/or the one end surface 24a, whose perpendicularity with respect to the central axis of the second inner sleeve 24 are/is controlled, are in parallel or substantially in parallel to each other. The assembly is inserted into the inner periphery of the accommodation sleeve 15, and the one end surface 24a of the second inner sleeve 24 of the assembly is abutted on the bandpass filter 14 and fixed by the adhesive to the inner periphery of the accommodation sleeve 15, thereby making it possible to manufacture the lens assembly 22. Note that, in order to enable smoothly inserting the second inner sleeve 24 of the assembly into the inner periphery of the accommodation sleeve 15, the outer diameter of the second inner sleeve 24 and the inner diameter of the accommodation sleeve 15 are made substantially the same as each other. Specifically, a clearance between the inner peripheral surface of the accommodation sleeve 15 and the outer peripheral surface of the second inner sleeve 24 is set to, for example, 0.030 mm or smaller, preferably, 0.015 mm or smaller. With this structure, the assembly can be fixed to the accommodation sleeve 15 such that there is realized a state or a state close to the state where the flat surface portion 13a of the second lens 13 is in parallel to the another end surface 24b and/or the one end surface 24a of the second inner sleeve 24, and the flat surface portion 13a is perpendicular to the central axis of the inner periphery of the accommodation sleeve 15.

Next, to the one end surface 23a of the first inner sleeve 23 in the lens assembly 22 manufactured as described above, the retaining sleeve 8 of the first capillary tube assembly 2 is fixed by the adhesive, and to the another end surface 24b of the second inner sleeve 24, the retaining sleeve 11 of the second capillary tube assembly 3 is fixed by the adhesive. In this case, a method of positioning both the capillary tube assemblies 2 and 3 with respect to the lens assembly 22 is performed in the same manner as that of the method according to the first embodiment of the present invention.

FIG. 4(a) is a horizontal sectional view showing a schematic structure of an optical device 31 according to a third embodiment of the present invention. FIG. 4(b) is a vertical sectional view thereof. Note that, components and portions substantially the same as those of the optical devices 1 and 21 according to the first and second embodiments are denoted by the same reference symbols, and repetitive descriptions will be omitted.

The optical device 31 according to this embodiment differs from the optical device 21 according to the second embodiment of the present invention in structure of a lens assembly 32. Specifically, a first difference is that the accommodation sleeve 15 is elongated in the axial direction to completely accommodate the first inner sleeve 23 and the second inner sleeve 24 in the inner periphery of the accommodation sleeve 15. A second difference is that the leading end portion (end surface 8a on one side) of the retaining sleeve 8 of the first capillary tube assembly 2 is fixed by the adhesive to the one end surface 23a of the first inner sleeve 23 while being inserted into the inner periphery of the accommodation sleeve 15, and the leading end portion (end surface 11a on one side) of the retaining sleeve 11 of the second capillary tube assembly 3 is fixed by the adhesive to the another end surface 24b of the second inner sleeve 24 while being inserted into the inner periphery of the accommodation sleeve 15. Note that, between the outer peripheral surface of each of the retaining sleeves 8 and 11 and the inner peripheral surface of the accommodation sleeve 15, there is formed a space (for example, space of about 0.125 mm to 0.25 mm) which enables adjustment of an optical alignment state between each of the capillary tube assemblies 2 and 3 and the lens assembly 32. Further, in this embodiment, in order to increase a fixation force and/or to further improve weatherability of the retaining sleeves 8 and 11, each of the retaining sleeves 8 and 11 is fixed by the adhesive to a part of the inner periphery of the accommodation sleeve 15.

FIG. 5(a) is a horizontal sectional view showing a schematic structure of an optical device 41 according to a fourth embodiment of the present invention. FIG. 5(b) is a vertical sectional view thereof. Note that, components and portions substantially the same as those of the optical devices 1, 21, and 31 according to the first to third embodiments are denoted by the same reference symbols, and repetitive descriptions will be omitted.

The optical device 41 according to this embodiment differs from the optical devices 21 and 31 of the second and third embodiments of the present invention in structure of a lens assembly 42 and method of fixing the first capillary tube assembly 2 and the second capillary tube assembly 3 to the lens assembly 42. Specifically, a first difference is that the flat surface portion 12a of the first lens 12 and the flat surface portion 13a of the second lens 13 are allowed to slightly protrude outwardly from the both ends of the accommodation sleeve 15. A second difference is that the end surface 8a on the one side of the retaining sleeve 8 of the first capillary tube assembly 2 is fixed by the adhesive to the flat surface portion 12a of the first lens 12, and the end surface 11a on the one side of the retaining sleeve 11 of the second capillary tube assembly 3 is fixed by the adhesive to the flat surface portion 13a of the second lens 13.

FIG. 6(a) is a horizontal sectional view showing a schematic structure of an optical device 51 according to a fifth embodiment of the present invention. FIG. 6(b) is a vertical sectional view thereof. Note that, components and portions substantially the same as those of the optical devices 1, 21, 31, and 41 according to the first to fourth embodiments are denoted by the same reference symbols, and repetitive descriptions will be omitted.

The optical device 51 according to this embodiment differs from the optical device 41 according to the fourth embodiment in structure of a lens assembly 52 and a method of fixing the first capillary tube assembly 2 and the second capillary tube assembly 3 to the lens assembly 52. Specifically, a first difference is that the accommodation sleeve 15 is elongated in the axial direction to completely accommodate the first lens 12 and the second lens 13 in the inner periphery of the accommodation sleeve 15. A second difference is that the leading end portion (end surface 8a on one side) of the retaining sleeve 8 of the first capillary tube assembly 2 is fixed by the adhesive to the flat surface portion 12a of the first lens 12 while being inserted into the inner periphery of the accommodation sleeve 15, and the leading end portion (end surface 11a on one side) of the retaining sleeve 11 of the second capillary tube assembly 3 is fixed by the adhesive to the flat surface portion 13 of the second lens 13 while being inserted into the inner periphery of the accommodation sleeve 15. Note that, between the outer peripheral surface of each of the retaining sleeves 8 and 11 and the inner peripheral surface of the accommodation sleeve 15, there is formed a space (for example, space of about 0.125 mm to 0.25 mm) which enables adjustment of an optical alignment state between each of the capillary tube assemblies 2 and 3 and the lens assembly 52. Further, in this embodiment, in order to increase a fixation force and/or to further improve weatherability of the retaining sleeves 8 and 11, each of the retaining sleeves 8 and 11 is fixed by the adhesive to a part of the inner periphery of the accommodation sleeve 15.

Note that, the present invention is not limited to the above embodiments. For example, there may be adopted a structure in which the single-core collimators are combined with each other and an optical isolator core is used as the optical functional component. That is, in the above first to fifth embodiments, similarly to the second capillary tube assembly, there may be adopted a structure in which the one optical fiber is fixed by the adhesive also to the inner hole of the capillary tube of the first capillary tube assembly, and the optical isolator core is fixed in stead of the bandpass filter.

Further, in the above embodiments, the retaining sleeve having the large diameter portion and the small diameter portion in the inner peripheral surface thereof may be changed to a retaining sleeve having a substantially constant inner diameter. Further, conversely, the retaining sleeve having the substantially constant inner diameter may be changed to the retaining sleeve having the large diameter portion and the small diameter portion in the inner peripheral surface thereof.

Figures 7A, 7B, 7C, 7D:
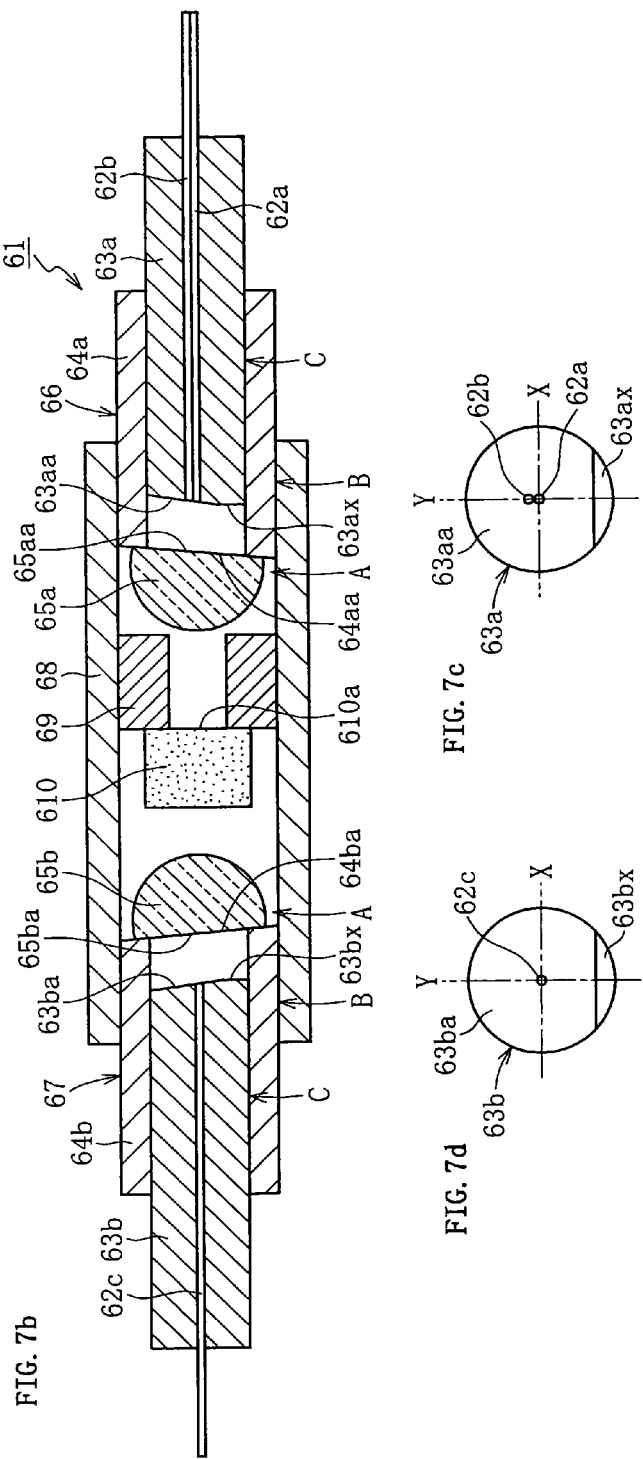
FIG. 7a is a horizontal sectional plan view showing a schematic structure of an optical device according to a sixth embodiment of the present invention.
FIG. 7b is a vertical sectional side view thereof.
FIG. 7c is an end surface view of a first capillary tube thereof.
FIG. 7d is an end surface view of a second capillary tube thereof.
Figure 9A:
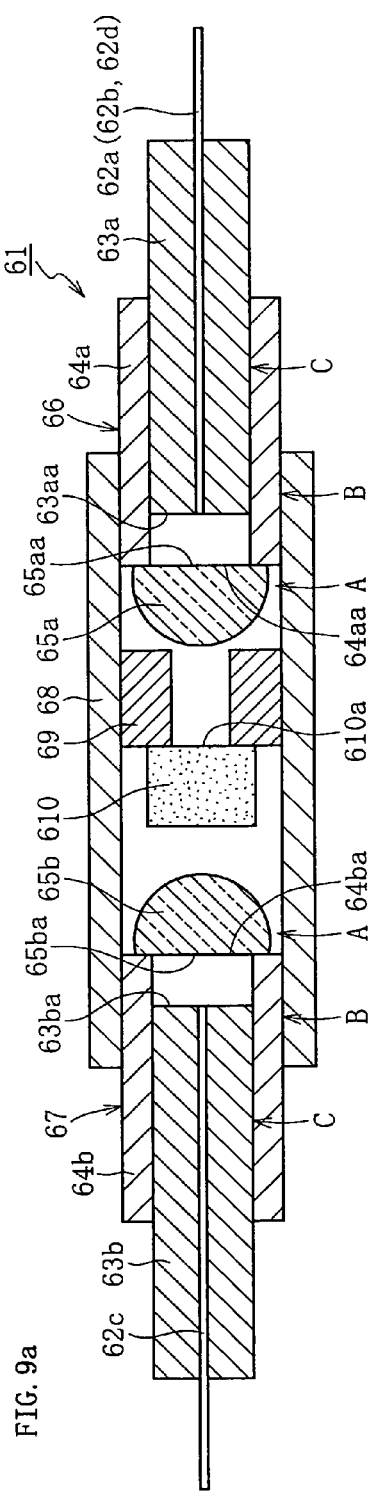
FIG. 9a is a horizontal sectional plan view showing a schematic structure of an optical device according to an eighth embodiment of the present invention.
Figure 9B:
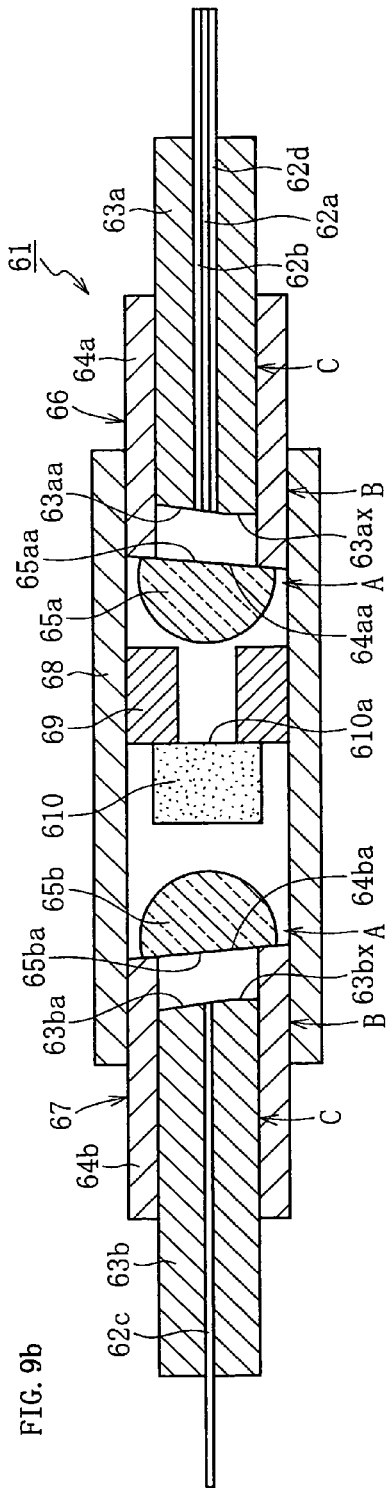
FIG. 9b is a vertical sectional side view thereof.
Figure 9C:
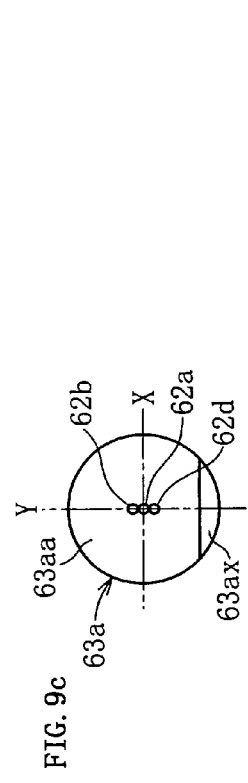
FIG. 9c is an end surface view of a first capillary tube thereof.
Figure 9D:
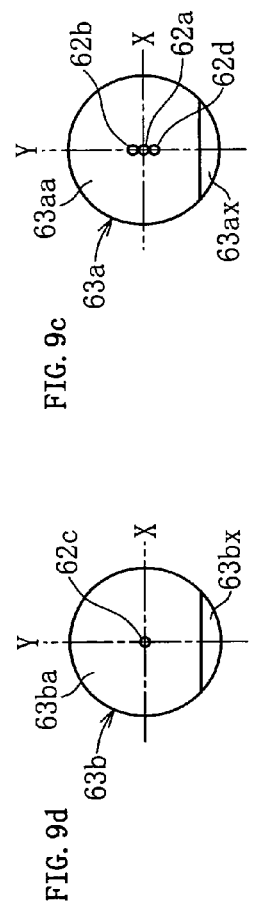
FIG. 9d is an end surface view of a second capillary tube thereof.

FIG. 7 show the schematic structures of an optical device 61 according to a sixth embodiment of the present invention. FIG. 7(a) shows a horizontal sectional plan view. FIG. 7(b) is a vertical sectional side view. FIG. 7(c) is an end surface view of a first capillary tube 63a on the right side of FIG. 7(b), which is viewed from an optical functional component 610 side. FIG. 7(d) is an end surface view of a second capillary tube 63b on the left side of FIG. 7(b), which is viewed from an optical functional component 610 side (the same in Parts (a) to (d) of each of FIGS. 8 to 14 and Parts (a) and (b) of each of FIGS. 15 to 30, provided that, in Parts (c) and (d) of each of FIGS. 8, 10, 11, and 13, X/Y axes are shifted by 90 degrees).

As shown in FIGS. 7(a) and 7(b), the optical device (in this embodiment, optical multiplexer/demultiplexer) 61 includes a first lens capillary tube assembly 66 in which the double-core first capillary tube 63a having two optical fibers 62a and 62b inserted thereinto and fixed thereto is inserted into an inner hole of a first retaining sleeve 64a and a first lens 65a is fixed to a leading end of the first retaining sleeve 64a, and a second capillary tube assembly 67 in which the single-core second capillary tube 63b having one optical fiber 62c inserted thereinto and fixed thereto is inserted into an inner hole of a second retaining sleeve 64b and a second lens 65b is fixed to a leading end of the second retaining sleeve 64b. The first lens capillary tube assembly 66 and the second capillary tube assembly 67 have a leading end side portion of the first retaining sleeve 64a and a leading end side portion of the second retaining sleeve 64b, respectively, are inserted into an inner hole of an accommodation sleeve (accommodation member) 68 in a state where the first lens 65a and the second lens 65b are opposed to each other. Further, to the inner hole of the accommodation sleeve 68, a mounting sleeve 69 is fitted and fixed. To one end surface of the mounting sleeve 69, an optical filter (in this embodiment, WDM filter) 610 serving as the optical functional component is fixed. The optical filter 610 is interposed between the first lens 65a and the second lens 65b with predetermined intervals from both of those.

Both the first lens 65a and the second lens 65b are hemisphere-like lenses having flat surface portions 65aa and 65ba, respectively, each of which is formed by cutting a part of each of spherical lenses. Each of the first lens 65a and the second lens 65b has a mode in which a dimension from each of the flat surface portions 65aa and 65ba to a vertex of each of spherical surfaces on a central axis perpendicular to the flat surface portions 65aa and 65ba is a little longer than a radius of curvature of the each spherical surface. Further, the leading end surface 64aa of the first retaining sleeve 64a and the leading end surface 64ba of the second retaining sleeve 64b are inclined so as to be symmetrical on both sides of the optical filter 610 in the side view shown in FIG. 7(b) The central axes of the first lens 65a and the second lens 65b having the flat surface portions 65aa and 65ba fixed to the leading end surfaces 64aa and 64ba, respectively, are also inclined at the same angle with the same directivity as those of the leading end surfaces 64aa and 64ba, respectively. Further, a leading end surface 63aa of the first capillary tube 63a and a leading end surface 63ba of the second capillary tube 63b are also provided at predetermined intervals from the flat surface portion 65aa of the first lens 65a and the flat surface portion 65ba of the second lens 65b, respectively, and are inclined with the same directivity as those of the leading end surfaces 64aa and 64ba, respectively. An inclination angle of the leading end surface 63aa and the leading end surface 63ba with respect to a horizontal surface is smaller than an inclination angle of the flat surface portions 65*aa* and 65*ba* of both the lenses 65*a* and 65*b*. Note that, in the plan view shown in FIG. 7(*a*), all of the leading end surfaces 64*aa* and 64*ba* of both the retaining sleeves 64*a* and 64*b*, the leading end surfaces 63*aa* and 63*ba* of both the capillary tubes 63*a* and 63*b*, and the flat surface portions 65*aa* and 65*ba* of both the lenses 65*a* and 65*b*, respectively, are in a non-inclined state. Further, on a lower end portions of the leading end surfaces 63*aa* and 63*ba* of both the capillary tubes 63*a* and 63*b*, there are formed non-inclined portions 63*ax* and 63*bx*, respectively, for allowing a direction of the inclination to be cognized.

As shown in FIG. 7(*c*), to the first capillary tube 63*a*, the first optical fiber 62*a* is inserted and fixed in a central position (on central axis) of the X/Y directions, and the second optical fiber 62*b* is inserted and fixed in a position adjacent thereto on the Y axis (position adjacent in direction of maximum inclination). On the other hand, as shown in FIG. 7(*d*), to the second capillary tube 63*b*, only the third optical fiber 62*c* is inserted and fixed in the central position of the X/Y directions (on central axis). For optical path of the optical device 61, there are provided a demultiplexing mode in which, in a case where multiplexed light having two wavelengths is emitted from the second optical fiber 62*b*, light of one wavelength is reflected by one end surface 610*a* of the optical filter 610 to be incident on the first optical fiber 62*a* and light of another wavelength passes through the optical filter 610 to be incident on the third optical fiber 62*c*, and a multiplexing mode in which, in a case where single light beams having different wavelengths are emitted from the first optical fiber 62*a* and the third optical fiber 62*c*, both the single light beams of two types are incident on the second optical fiber 62*b*.

The accommodation sleeve 68 is a single member having an inner hole and an outer peripheral surface whose central axes coincide with each other, and having the same diameter along an entire length. In the inner hole of the accommodation sleeve 68, both the retaining sleeves 64*a* and 64*b*, both the capillary tubes 63*a* and 63*b*, and the optical filter 610 are all arranged on the same axis. Further, the flat surface portions 65*aa* and 65*ba* which are base end surfaces of both the lenses 65*a* and 65*b*, respectively, are made to have a diameter larger than that of the inner holes of both the retaining sleeves 64*a* and 64*b*. On a surface of each of the flat surface portions 65*aa* and 65*ba* and the spherical surface portions of both the lenses 65*a* and 65*b*, respectively, there is formed the antireflection film. A clearance A between each of outer peripheral surfaces on maximum outer diameter portions of the lenses 65*a* and 65*b* and the inner hole (inner peripheral surface) of the accommodation sleeve 68 is made larger than an adhesive-filled clearance B between each of outer peripheral surfaces of both the retaining sleeves 64*a* and 64*b* and inner peripheral surface of the accommodation sleeve 68. A size of the adhesive-filled clearance B is the same as that of a clearance C between each of inner peripheral surfaces of both the retaining sleeves 64*a* and 64*b* and each of outer peripheral surfaces of both the capillary tubes 63*a* and 63*b*, respectively.

Optical axis adjustment of the optical device 61 is performed as follows. That is, in a state where the first lens 65*a* is fixed to the leading end of the first retaining sleeve 64*a*, the first capillary tube 63*a* having the first and second optical fibers 62*a* and 62*b* inserted thereinto and fixed thereto is rotatably inserted into the inner hole of the first retaining sleeve 64*a*, and the leading end side portion of the first retaining sleeve 64*a* is rotatably inserted into the inner hole of the accommodation sleeve 68. At this time, the mounting sleeve 69 is inserted into and fixed to the inner hole of the accommodation sleeve 68, and the optical filter 610 is fixed to the one end surface of the mounting sleeve 69. In this state, in order to use the optical device 61 in the demultiplexing mode, the first capillary tube 63*a* is relatively rotated about the axis with respect to the first retaining sleeve 64*a*, and at the same time, the first retaining sleeve 64*a* is relatively rotated about the axis with respect to the accommodation sleeve 68, to thereby find a position or a state where, of the multiplexed light having two wavelengths emitted from the second optical fiber 62*b*, the light having one wavelength is reflected by the optical filter 610 to be accurately incident on the first optical fiber 62*a*. In this case, relative axial positions of the members 63*a*, 64*a*, and 68 are adjusted as needed. While maintaining the found state, the adhesives which fill clearances between the first capillary tube 63*a* and the first retaining sleeve 64*a* and between the first retaining sleeve 64*a* and the accommodation sleeve 68 are hardened. As a result, the optical axis adjustment of the first lens capillary tube assembly 66 is completed.

After that, in the inner hole of the second retaining sleeve 64*b* to which the second lens 65*b* is fixed, the second capillary tube 63*b* having the third optical fiber 62*c* inserted thereinto and fixed thereto is rotatably inserted, and the second retaining sleeve 64*b* is rotatably inserted into the inner hole of the accommodation sleeve 68. The second capillary tube 63*b* is relatively rotated about the axis with respect to the second retaining sleeve 64*b*, and at the same time, the second retaining sleeve 64*b* is relatively rotated about the axis with respect to the accommodation sleeve 68, to thereby find a position or a state where, of the multiplexed light having two wavelengths emitted from the second optical fiber 62*b*, the light having the other wavelength passes through the optical filter 610 to be accurately incident on the third optical fiber 62*c*. Also in this case, relative axial positions of the members 63*b*, 64*b*, and 68 are adjusted as needed. While maintaining the found state, the adhesives which fill clearances between the second capillary tube 63*b* and the second retaining sleeve 64*b* and between the second retaining sleeve 64*b* and the accommodation sleeve 68 are hardened. As a result, the optical axis adjustment of the second lens capillary tube assembly 67 is completed.

FIG. 8 shows a schematic structure of the optical device 61 according to a seventh embodiment of the present invention. The optical device 61 according to the seventh embodiment of the present invention differs from that of the above sixth embodiment in that the leading end surfaces 63*aa* and 63*ba* of the first and second capillary tubes 63*a* and 63*b*, respectively, are inclined in a plan view and are in a non-inclined state in a side view. Therefore, the first and second optical fibers 62*a* and 62*b* are adjacent to each other in a non-inclined direction. Also with this structure, substantially the same operational effects as those of the sixth embodiment of the present invention are obtained. The other structural features are the same as those of the sixth embodiment of the present invention, so the common components are denoted by the same reference symbols and descriptions of those will be omitted.

FIG. 9 shows a schematic structure of the optical device 61 according to an eighth embodiment of the present invention. The optical device 61 according to the eighth embodiment of the present invention differs from that of the above sixth embodiment in that the first capillary tube 63*a* is a triple-core capillary tube, and, as shown in FIG. 9(*c*), in addition to the first optical fiber 62*a* on the central axis of the first capillary tube 63*a* and the second optical fiber 62*b* adjacent to one side of the first optical fiber 62*a*, a fourth optical fiber 62*d* adjacent to another side of the first optical fiber 62*a* is provided. The first and second optical fibers 62*a* and 62*b* are practically used for optical transmission. Also with this structure, substantially the same operational effects as those of the sixth embodiment of the present invention are obtained. The other structural features are the same as those of the sixth embodiment of the present invention, so the common components are denoted by the same reference symbols, and the descriptions of those will be omitted.

FIG. 10 shows a schematic structure of the optical device 61 according to a ninth embodiment of the present invention. The optical device 61 according to the ninth embodiment of the present invention differs from that of the above eighth embodiment in that the leading end surfaces 63aa and 63ba of the first and second capillary tubes 63a and 63b, respectively, are inclined in a plan view and are in a non-inclined state in a side view. Therefore, the first, second, and fourth optical fibers 62a, 62b, and 62d are adjacent to each other in a non-inclined direction. Also with this structure, substantially the same operational effects as those of the sixth embodiment of the present invention are obtained. The other structural features are the same as those of the sixth embodiment of the present invention, so the common components are denoted by the same reference symbols and descriptions of those will be omitted.

FIG. 11 shows a schematic structure of the optical device 61 according to a tenth embodiment of the present invention. The optical device 61 according to the tenth embodiment of the present invention differs from that of the above sixth embodiment in that, while the central axis of the first lens 65a is inclined in a plan view and is not inclined in a side view, the central axis of the second lens 65b is not inclined in the plan view and is inclined in the side view, that while the leading end surface 63aa of the first capillary tube 63a is not inclined in the plan view and is inclined in the side view, the leading end surface 63ba of the second capillary tube 63b is inclined in the plan view and is not inclined in the side view, and that the first and second optical fibers 62a and 62b are offset in the same direction with respect to the Y axis and sandwich the X axis therebetween to be adjacent to both sides of the X axis. With this structure, of the multiplexed light having two wavelengths emitted from the second optical fiber 62b, the light having one wavelength is reflected by the optical filter 610 to be incident on the first optical fiber 62a and the light having another wavelength passes through the optical filter 610 to be incident on the third optical fiber 62c (multiplexing is also performed). Other than those, substantially the same operational effects as those of the sixth embodiment of the present invention are obtained. The other structural features are the same as those of the sixth embodiment of the present invention, so the common components are denoted by the same reference symbols, and the descriptions of those will be omitted.

FIG. 12 shows a schematic structure of the optical device 61 according to an eleventh embodiment of the present invention. The optical device 61 according to the eleventh embodiment of the present invention differs from that of the above tenth embodiment in that while the leading end surface 63aa of the first capillary tube 63a is inclined in a plan view and is not inclined in a side view, the leading end surface 63ba of the second capillary tube 63b is not inclined in the plan view and is inclined in the side view. Also with this structure, substantially the same operational effects as those of the tenth embodiment of the present invention are obtained. The other structural features are the same as those of the sixth embodiment of the present invention, so the common components are denoted by the same reference symbols, and the descriptions of those will be omitted.

FIG. 13 shows a schematic structure of the optical device 61 according to a twelfth embodiment of the present invention. The optical device 61 according to the twelfth embodiment of the present invention differs from that of the above tenth embodiment in that the first capillary tube 63a is a quadruple-core capillary tube, and as shown in FIG. 13(c), the first and second optical fibers 62a and 62b and fifth and sixth optical fibers 62e and 62f are arranged around the central axis of the first capillary tube 63a, specifically, the first and second optical fibers 62a and 62b are offset from the Y axis in one direction and are adjacent to both sides of the X axis and the fifth and sixth optical fibers 62e and 62f are offset from the Y axis in another direction and are adjacent to the both sides of the X axis. The first and second optical fibers 62a and 62b are practically used for the optical transmission. Also with this structure, substantially the same operational effects as those of the tenth embodiment of the present invention are obtained. The other structural features are the same as those of the sixth embodiment of the present invention, so the common components are denoted by the same reference symbols, and the descriptions of those will be omitted.

FIG. 14 shows a schematic structure of the optical device 61 according to a thirteenth embodiment of the present invention. The optical device 61 according to the thirteenth embodiment of the present invention differs from that of the above twelfth embodiment in that while the leading end surface 63aa of the first capillary tube 63a is inclined in a plan view and is not inclined in a side view, the leading end surface 63ba of the second capillary tube 63b is not inclined in the plan view and is inclined in the side view. The optical device 61 according to the thirteenth embodiment of the present invention is identical to that of the twelfth embodiment of the present invention in that the first and second optical fibers 62a and 62b are offset with respect to the Y axis in one direction and are adjacent to both sides of the X axis and the fifth and sixth optical fibers 62e and 62f are offset with respect to the Y axis in another direction and are adjacent to the both sides of the X axis. Also with this structure, substantially the same operational effects as those of the tenth embodiment of the present invention are obtained. The other structural features are the same as those of the sixth embodiment of the present invention, so the common components are denoted by the same reference symbols, and the descriptions of those will be omitted.

Figure 15A:
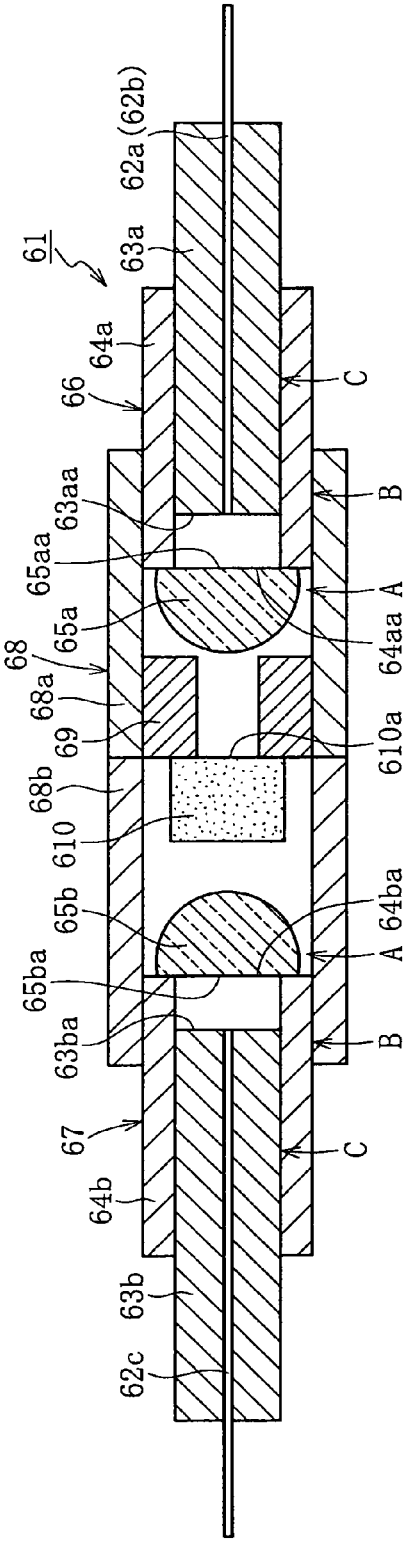
FIG. 15a is a horizontal sectional plan view showing a schematic structure of an optical device according to a fourteenth embodiment of the present invention.
Figure 15B:
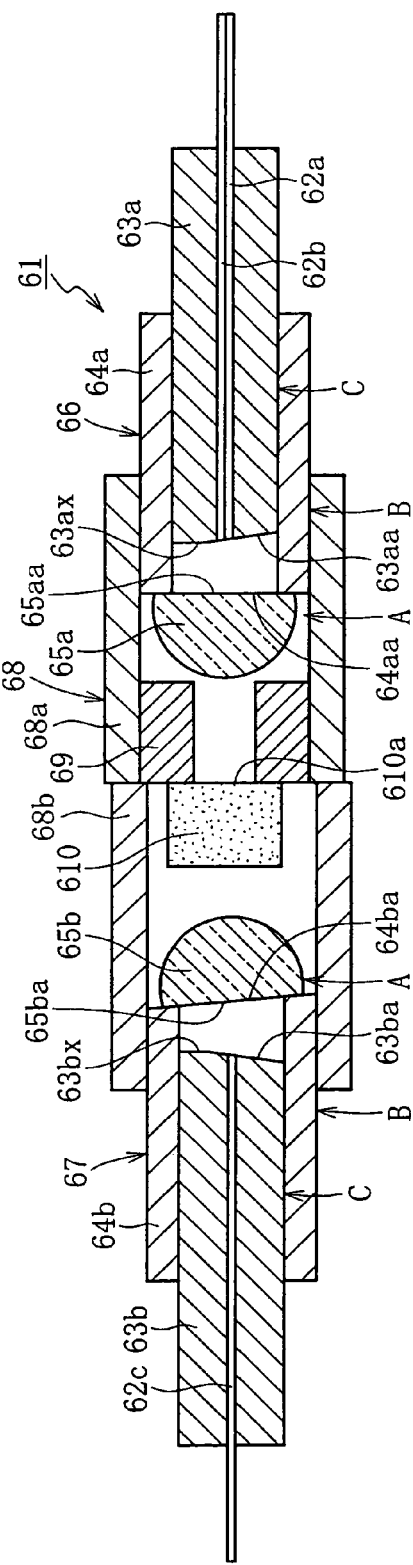
FIG. 15b is a vertical sectional side view thereof.

FIG. 15 shows a schematic structure of the optical device 61 according to a fourteenth embodiment of the present invention. The optical device 61 according to the fourteenth embodiment of the present invention differs from that of the above sixth embodiment in that the accommodation sleeve 68 is divided into two in an axial direction, that is, a first accommodation sleeve 68a and a second accommodation sleeve 68b and the first accommodation sleeve 68a and the second accommodation sleeve 68b are fixed by being decentered, that the optical filter 610 is fixed to one end surface of the mounting sleeve 69 fitted and fixed to the inner hole of the first accommodation sleeve 68a, that the first lens 65a is not inclined in both a plan view and a side view, that inclined directions of the leading end surface 63aa of the first capillary tube 63a and the leading end surface 63b of the second capillary tube 63ba in the side view are different from each other, and that, in the double-core first capillary tube 63a, the first optical fiber 62a and the second optical fiber 62b are adjacent to each other in positions symmetrical on the Y axis with respect to the X axis. Also with this structure, of the multiplexed light having two wavelengths emitted from the second optical fiber 62b, the light having one wavelength is reflected by the optical filter 610 to be incident on the first optical fiber 62a and the light having another wavelength passes through the optical filter 610 to be incident on the third optical fiber 62c (multiplexing is also performed). With the optical device 61 according to the fourteenth embodiment of the present invention, similarly to the sixth embodiment of the present invention, the optical axis adjustment of the first lens capillary tube assembly 66 can be (may be) appropriately performed, and when the optical axis adjustment of the second lens capillary tube assembly 67 is performed, a decentering degree of the two accommodation sleeves 68a and 68b can be adjustably set, thereby being advantageous in achieving accurate optical axis adjustment and thinning of an adhesive layer. The other structural features are the same as those of the sixth embodiment of the present invention, so the common components are denoted by the same reference symbols, and the descriptions of those will be omitted.

Figure 16A:
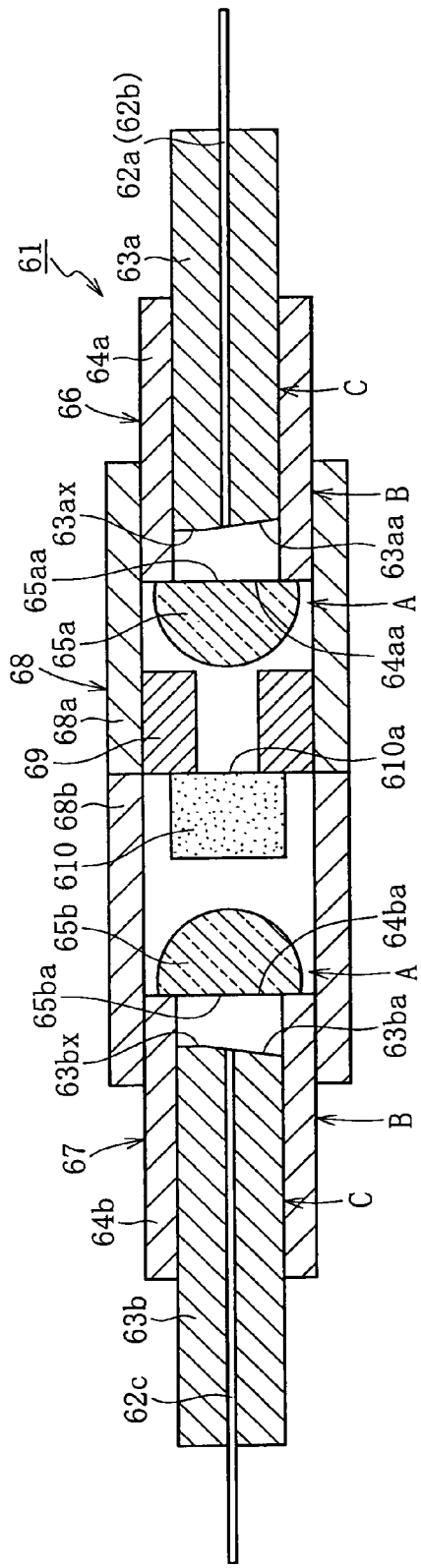
FIG. 16a is a horizontal sectional plan view showing a schematic structure of an optical device according to a fifteenth embodiment of the present invention.
Figure 16B:
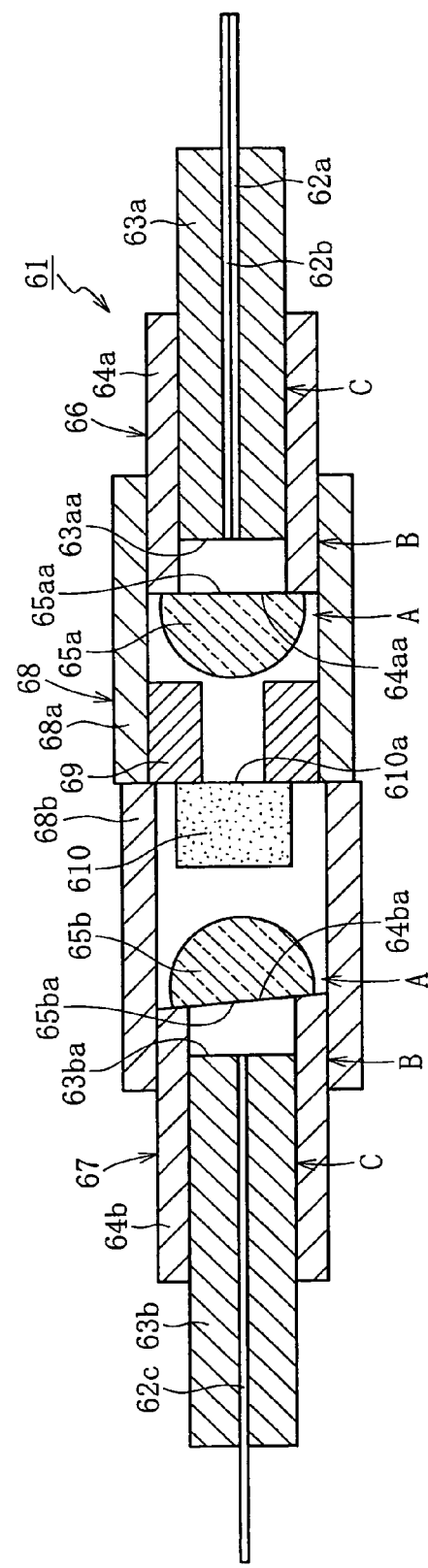
FIG. 16b is a vertical sectional side view thereof.

FIG. 16 shows a schematic structure of the optical device 61 according to a fifteenth embodiment of the present invention. The optical device 61 according to the fifteenth embodiment differs from that of the above fourteenth embodiment in that the leading end surface 63aa of the first capillary tube 63a and the leading end surface 63ba of the second capillary tube 63b are symmetrically inclined in a plan view and are not inclined in a side view. With this structure, the same operational effects as those of the fourteenth embodiment of the present invention are obtained. The other structural features are the same as those of the sixth embodiment of the present invention, so the common components are denoted by the same reference symbols, and the descriptions of those will be omitted.

Figure 17A:
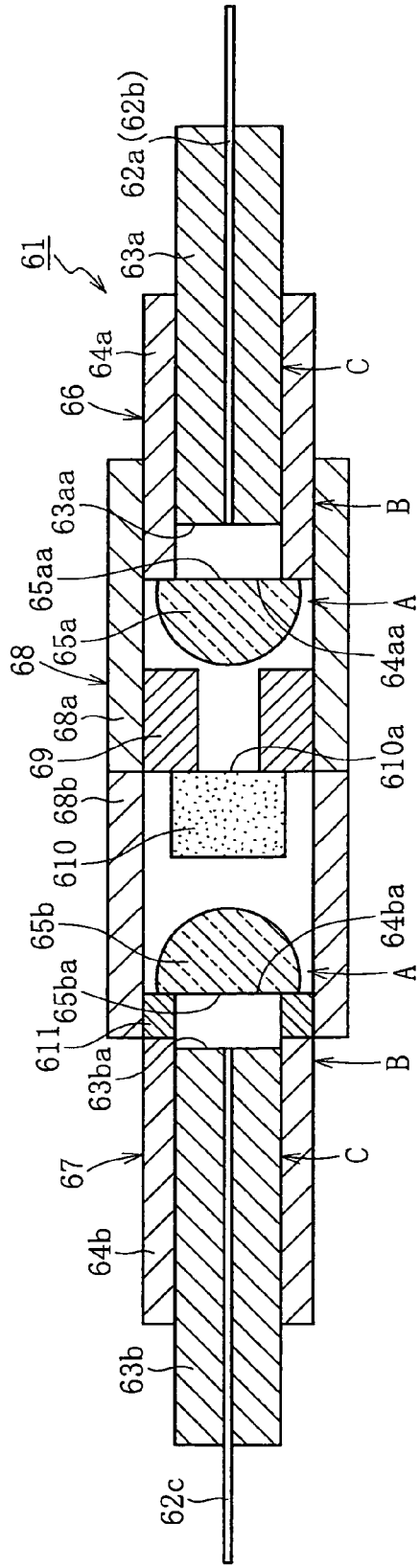
FIG. 17a is a horizontal sectional plan view showing a schematic structure of an optical device according to a sixteenth embodiment of the present invention.
Figure 17B:
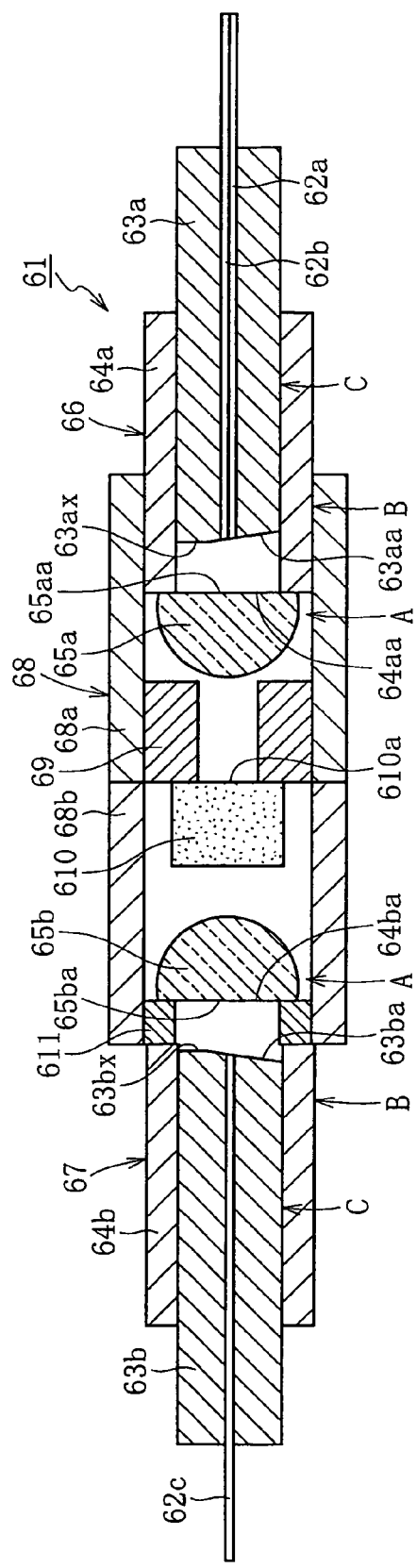
FIG. 17b is a vertical sectional side view thereof.

FIG. 17 shows a schematic structure of the optical device 61 according to a sixteenth embodiment of the present invention. The optical device 61 according to the sixteenth embodiment of the present invention differs from that of the above fourteenth embodiment in that the first accommodation sleeve 68a and the second accommodation sleeve 68b which are obtained by dividing the accommodation sleeve into two are arranged and fixed to the same axis while not being decentered, that the second retaining sleeve is divided into two in the axial direction, an auxiliary retaining sleeve 611 on the leading end side thereof is inserted into the inner hole of the second accommodation sleeve 68b, and a retaining sleeve 64b on a base end side is fixed to the base end of the auxiliary retaining sleeve 611 while being decentered, and that the second lens 65b is fixed to the leading end of the auxiliary retaining sleeve 611 in the non-inclined state in both a plan view and a side view. Also with this structure, similarly to the above fourteenth embodiment, there is such an operational effect that, for example, by adjusting the decentering degree between the auxiliary retaining sleeve 611 on the leading end side of the second retaining sleeve and the retaining sleeve 64b on the base end side, the optical alignment can be advantageously performed. The other structural features are the same as those of the sixth embodiment of the present invention, so the common components are denoted by the same reference symbols, and the descriptions of those will be omitted.

Figure 18A:
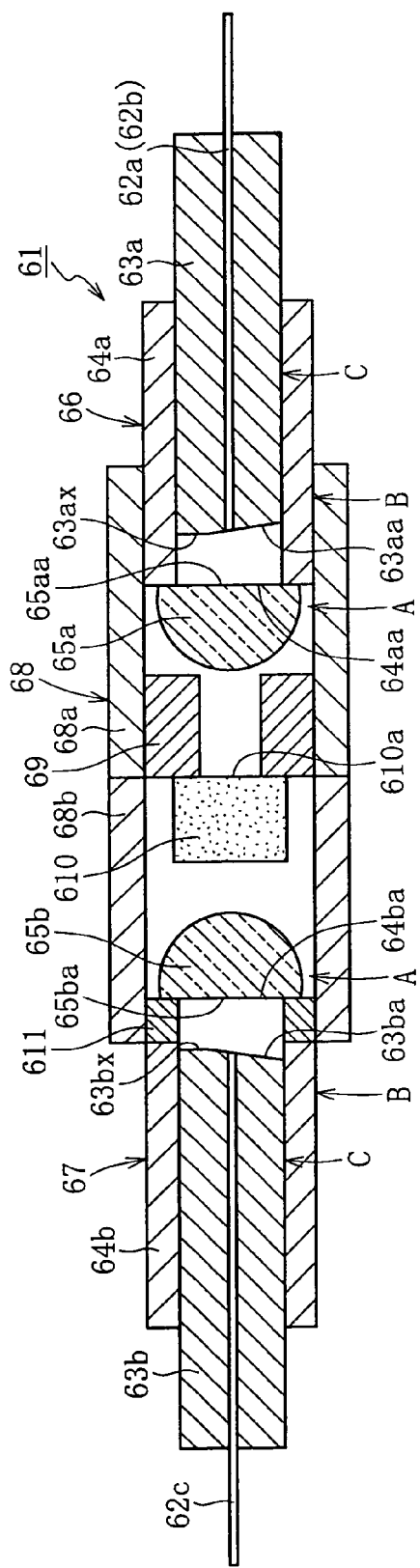
FIG. 18a is a horizontal sectional plan view showing a schematic structure of an optical device according to a seventeenth embodiment of the present invention.
Figure 18B:
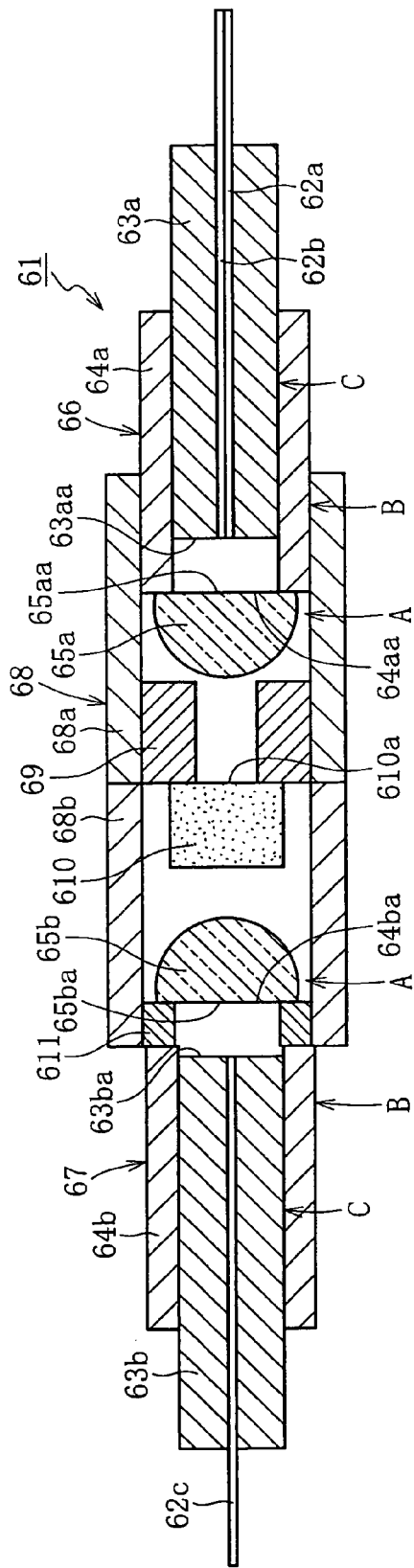
FIG. 18b is a vertical sectional side view thereof.

FIG. 18 shows a schematic structure of the optical device 61 according to a seventeenth embodiment of the present invention. The optical device 61 according to the seventeenth embodiment differs from that of the above sixteenth embodiment in that the leading end surface 63aa of the first capillary tube 63a and the leading end surface 63ba of the second capillary tube 63b are symmetrically inclined in a plan view and are not inclined in a side view. Also with this structure, the same operational effects as those of the fourteenth embodiment of the present invention are obtained. The other structural features are the same as those of the sixth embodiment of the present invention, so the common components are denoted by the same reference symbols, and the descriptions of those will be omitted.

Figure 19A:
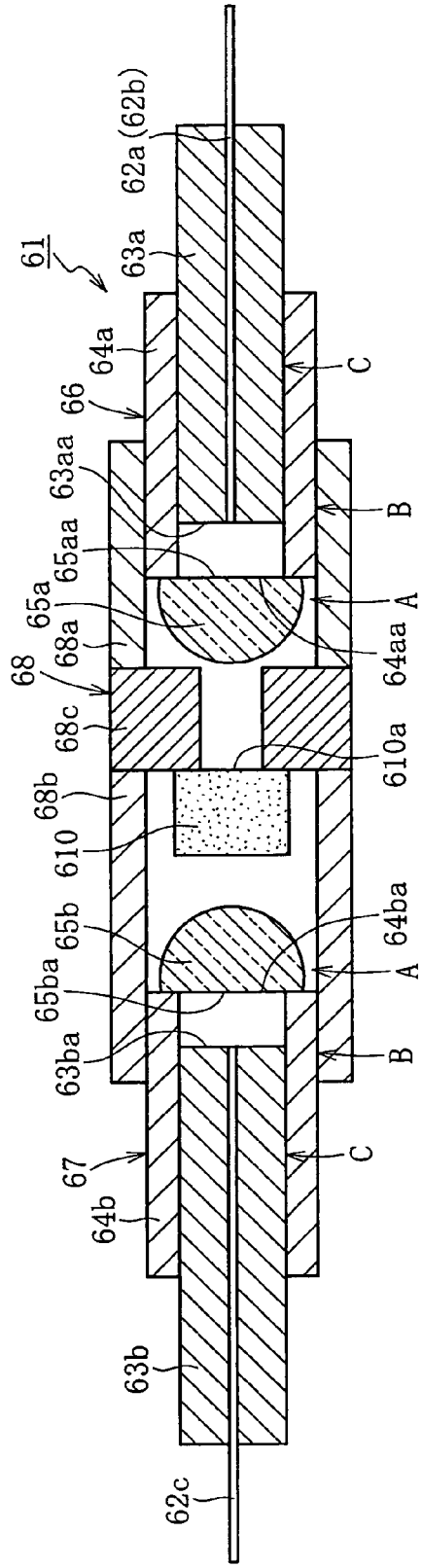
FIG. 19a is a horizontal sectional plan view showing a schematic structure of an optical device according to an eighteenth embodiment of the present invention.
Figure 19B:
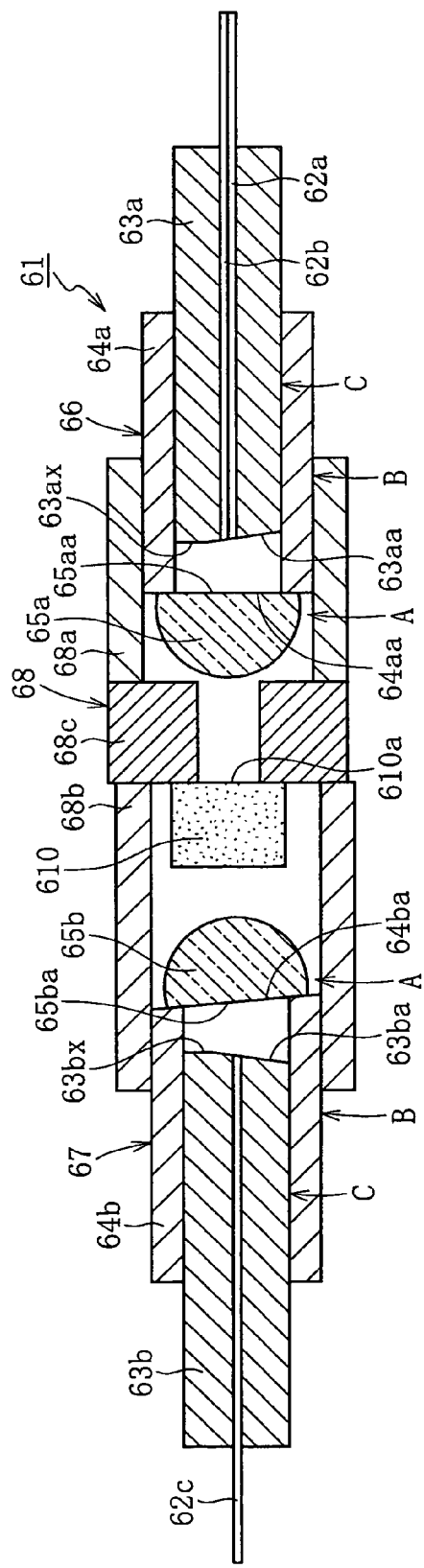
FIG. 19b is a vertical sectional side view thereof.

FIG. 19 shows a schematic structure of the optical device 61 according to an eighteenth embodiment of the present invention. The optical device 61 according to the eighteenth embodiment of the present invention differs from that of the above fourteenth embodiment in that the accommodation sleeve 68 is divided into three, that is, the first accommodation sleeve 68a and the second accommodation sleeve 68b on both end sides in the axial direction and a third accommodation sleeve 68c in a central portion in the axial direction, and that the third accommodation sleeve 68c and the mounting sleeve are unified and the optical filter 610 is fixed to one end surface of the third accommodation sleeve 68c. With the optical device 61 according to the eighteenth embodiment of the present invention, similarly to the fourteenth embodiment of the present invention, the optical axis adjustment of the first lens capillary tube assembly 66 and the second lens capillary tube assembly 67 can be accurately performed, and thinning of the adhesive layer can be advantageously performed, in addition, it is possible to obtain an advantage in that the position adjustment of the optical filter 610 can be accurately performed. The other structural features are the same as those of the sixth embodiment of the present invention, so the common components are denoted by the same reference symbols, and the descriptions of those will be omitted.

FIG. 20 shows a schematic structure of the optical device 61 according to a nineteenth embodiment of the present invention. The optical device 61 according to the nineteenth embodiment differs from that of the above eighteenth embodiment in that the leading end surface 63aa of the first capillary tube 63a and the leading end surface 63ba of the second capillary tube 63b are symmetrically inclined in a plan view and are not inclined in a side view. Also with this structure, the same operational effects as those of the eighteenth embodiment of the present invention are obtained. The other structural features are the same as those of the sixth embodiment of the present invention, so the common components are denoted by the same reference symbols, and the descriptions of those will be omitted.

Figure 21A:
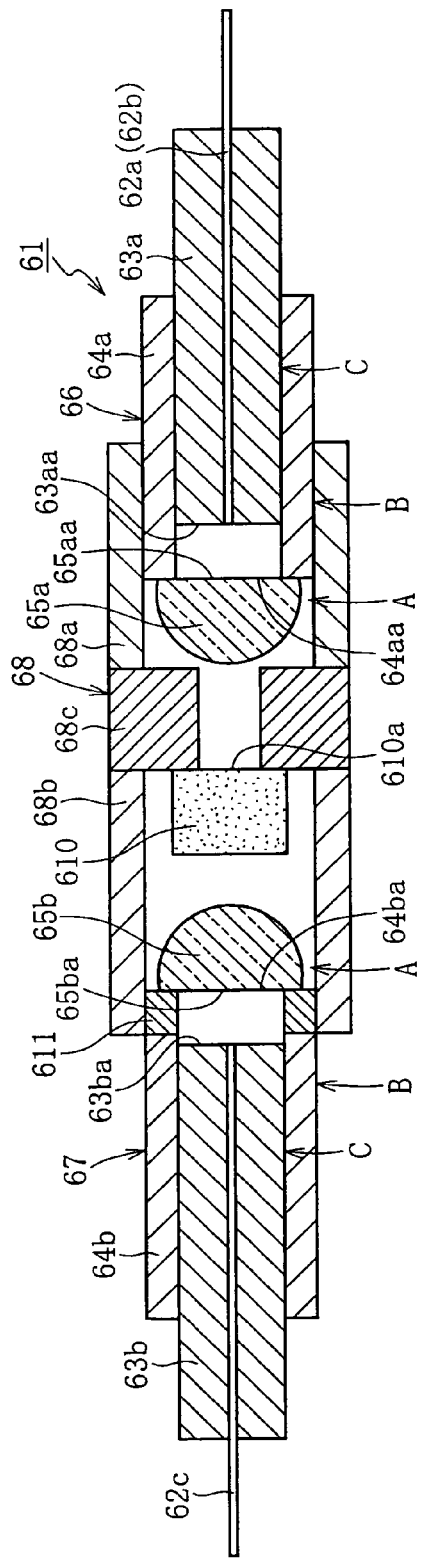
FIG. 21a is a horizontal sectional plan view showing a schematic structure of an optical device according to a twentieth embodiment of the present invention.
Figure 21B:
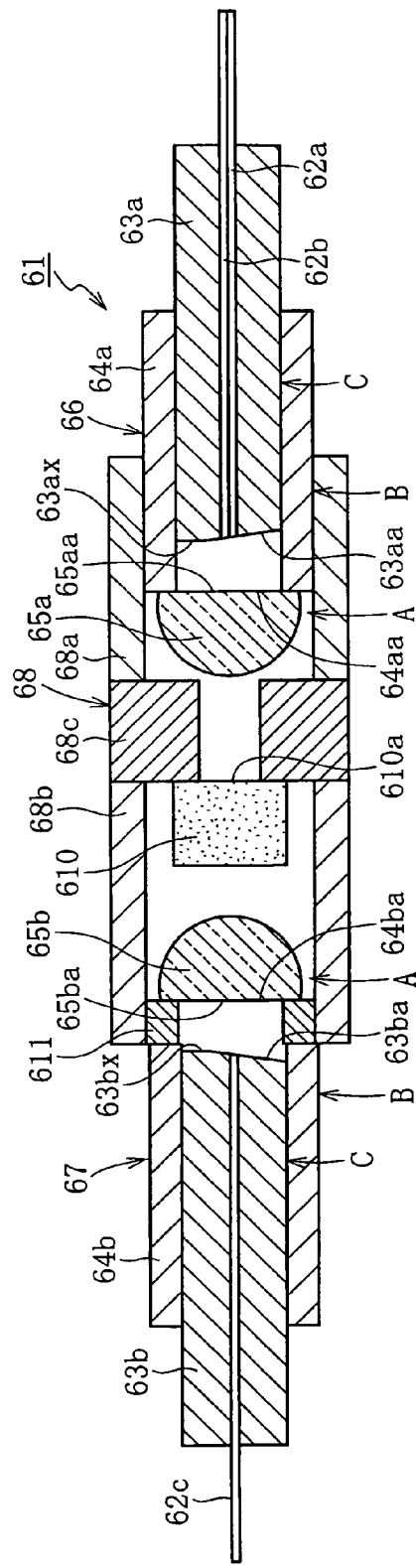
FIG. 21b is a vertical sectional side view thereof.

FIG. 21 shows a schematic structure of the optical device 61 according to a twentieth embodiment of the present invention. The optical device 61 according to the twentieth embodiment of the present invention differs from that of the above eighteenth embodiment in that the first accommodation sleeve 68a, the second accommodation sleeve 68b, and the third accommodation sleeve 68c which are obtained by dividing the accommodation sleeve 68 into three are arranged and fixed on the same axis without being decentered, that the second retaining sleeve is divided into two in the axial direction, the auxiliary retaining sleeve 611 on the leading end side is inserted into the inner hole of the second accommodation sleeve 68b, and the retaining sleeve 64b on the base end side is fixed to the base end of the auxiliary retaining sleeve 611 while being decentered, and that the second lens 65b is fixed to the leading end of the auxiliary retaining sleeve 611 in the non-inclined state in both a plan view and a side view. Also with this structure, the same operational effects as those of the eighteenth embodiment of the present invention are obtained. The other structural features are the same as those of the sixth embodiment of the present invention, so the common components are denoted by the same reference symbols, and the descriptions of those will be omitted.

Figure 22A:
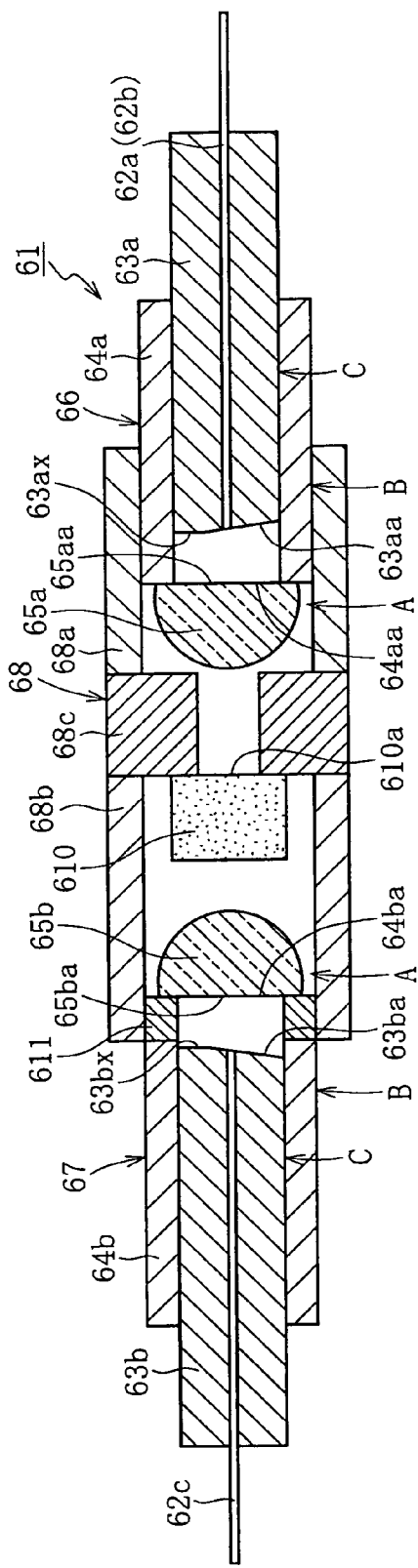
FIG. 22a is a horizontal sectional plan view showing a schematic structure of an optical device according to a twenty-first embodiment of the present invention.
Figure 22B:
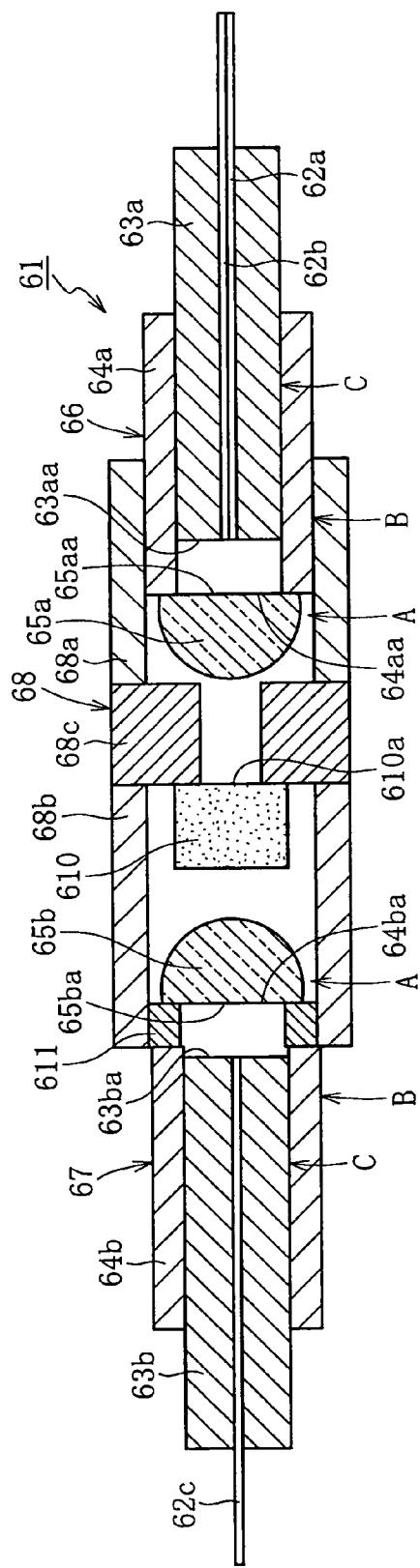
FIG. 22b is a vertical sectional side view thereof.

FIG. 22 shows a schematic structure of the optical device 61 according to a twenty-first embodiment of the present invention. The optical device 61 according to the twenty-first embodiment of the present invention differs from that of the above twentieth embodiment in that the leading end surface 63aa of the first capillary tube 63a and the leading end surface 63ba of the second capillary tube 63b are symmetrically inclined in a plan view and are not inclined in a side view. Also with this structure, the same operational effects as those of the eighteenth embodiment of the present invention are obtained. The other structural features are the same as those of the sixth embodiment of the present invention, so the common components are denoted by the same reference symbols, and the descriptions of those will be omitted.

Figure 23A:
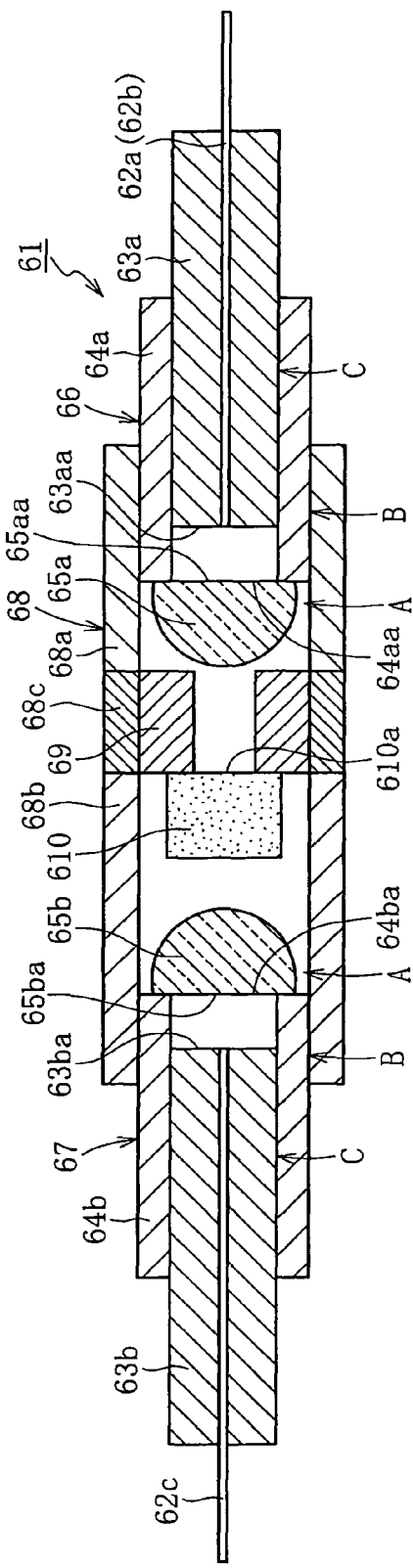
FIG. 23a is a horizontal sectional plan view showing a schematic structure of an optical device according to a twenty-second embodiment of the present invention.
Figure 23B:
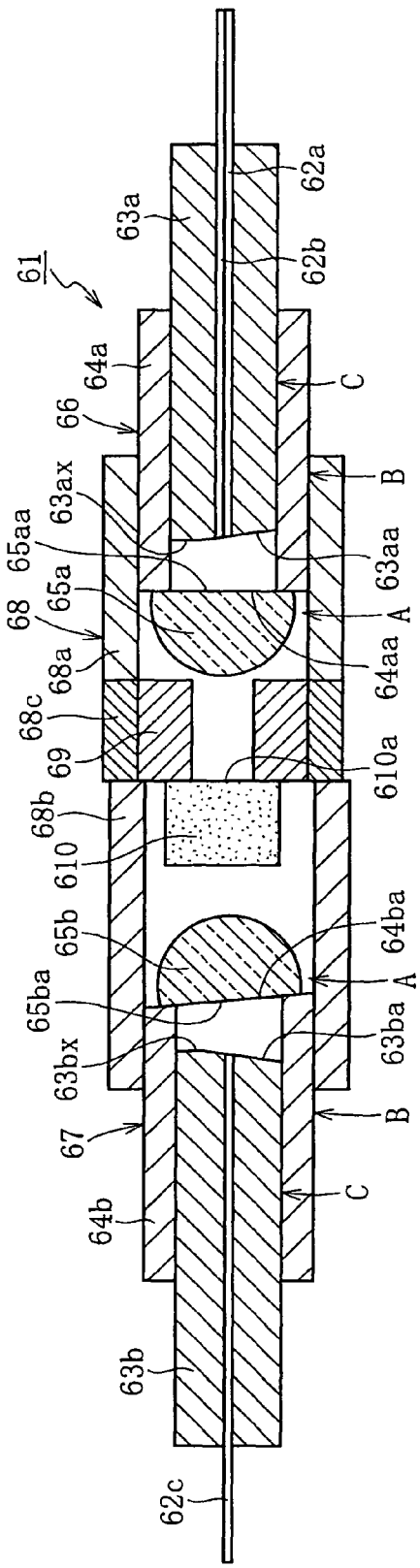
FIG. 23b is a vertical sectional side view thereof.

FIG. 23 shows a schematic structure of the optical device 61 according to a twenty-second embodiment of the present invention. The optical device 61 according to the twenty-second embodiment of the present invention differs from that of the above eighteenth embodiment in that the third accommodation sleeve 68c has the same thickness as that of each of the first accommodation sleeve 68a and the second accommodation sleeve 68b and the mounting sleeve 69 is fitted and fixed to the inner hole of the third accommodation sleeve 68c. Also with this structure, the same operational effects as those of the eighteenth embodiment of the present invention are obtained. The other structural features are the same as those of the sixth embodiment of the present invention, so the common components are denoted by the same reference symbols, and the descriptions of those will be omitted.

Figure 24A:
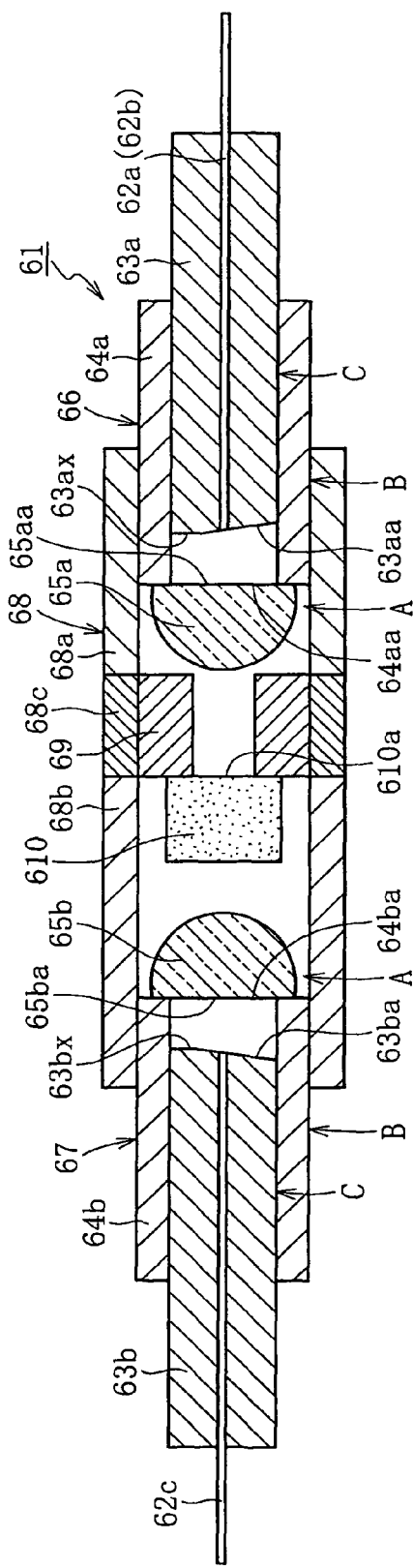
FIG. 24a is a horizontal sectional plan view showing a schematic structure of an optical device according to a twenty-third embodiment of the present invention.
Figure 24B:
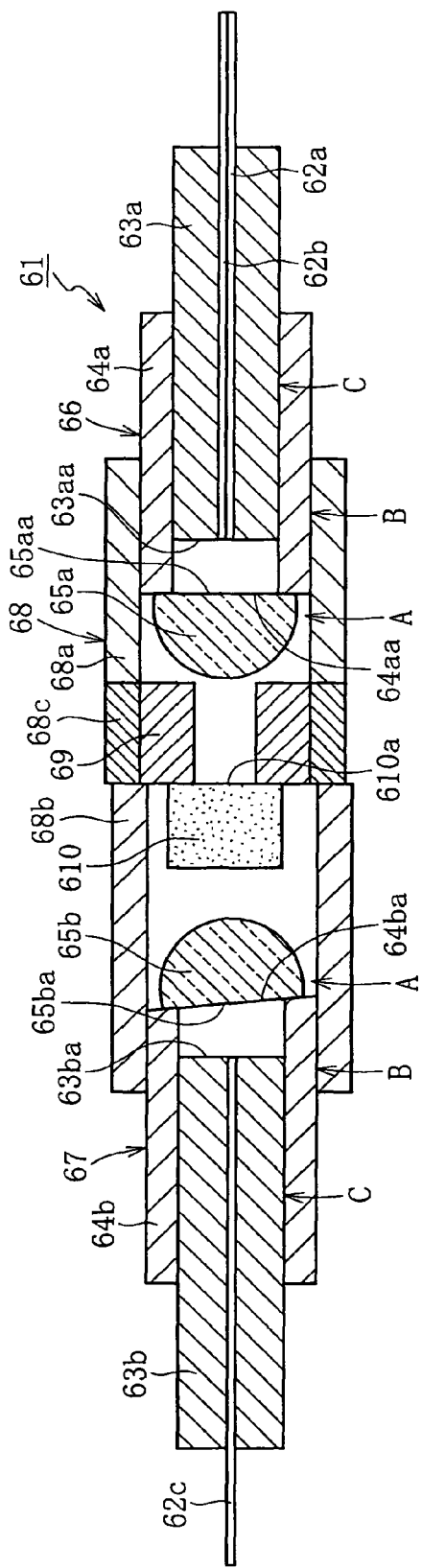
FIG. 24b is a vertical sectional side view thereof.

FIG. 24 shows a schematic structure of the optical device 61 according to a twenty-third embodiment of the present invention. The optical device 61 according to the twenty-third embodiment differs from that of the above twenty-second embodiment in that the leading end surface 63aa of the first capillary tube 63a and the leading end surface 63ba of the second capillary tube 63b are symmetrically inclined in a plan view and are not inclined in a side view. Also with this structure, the same operational effects as those of the eighteenth embodiment of the present invention are obtained. The other structural features are the same as those of the sixth embodiment of the present invention, so the common components are denoted by the same reference symbols, and the descriptions of those will be omitted.

FIG. 25 shows a schematic structure of the optical device 61 according to a twenty-fourth embodiment of the present invention. The optical device 61 according to the twenty-fourth embodiment of the present invention differs from that of the above twenty-second embodiment in that the first accommodation sleeve 68a, the second accommodation sleeve 68b, and the third accommodation sleeve 68c which are obtained by dividing the accommodation sleeve 68 into three are arranged and fixed on the same axis without being decentered, that the second retaining sleeve is divided into two in the axial direction, the auxiliary retaining sleeve 611 on the leading end side is inserted into the inner hole of the second accommodation sleeve 68b, and the retaining sleeve 64b on the base end side is fixed to the base end of the auxiliary retaining sleeve 611 while being decentered, and that the second lens 65b is fixed to the leading end of the auxiliary retaining sleeve 611 in the non-inclined state in both a plan view and a side view. Also with this structure, the same operational effects as those of the twenty-second embodiment of the present invention are obtained. The other structural features are the same as those of the sixth embodiment of the present invention, so the common components are denoted by the same reference symbols, and the descriptions of those will be omitted.

Figure 26A:
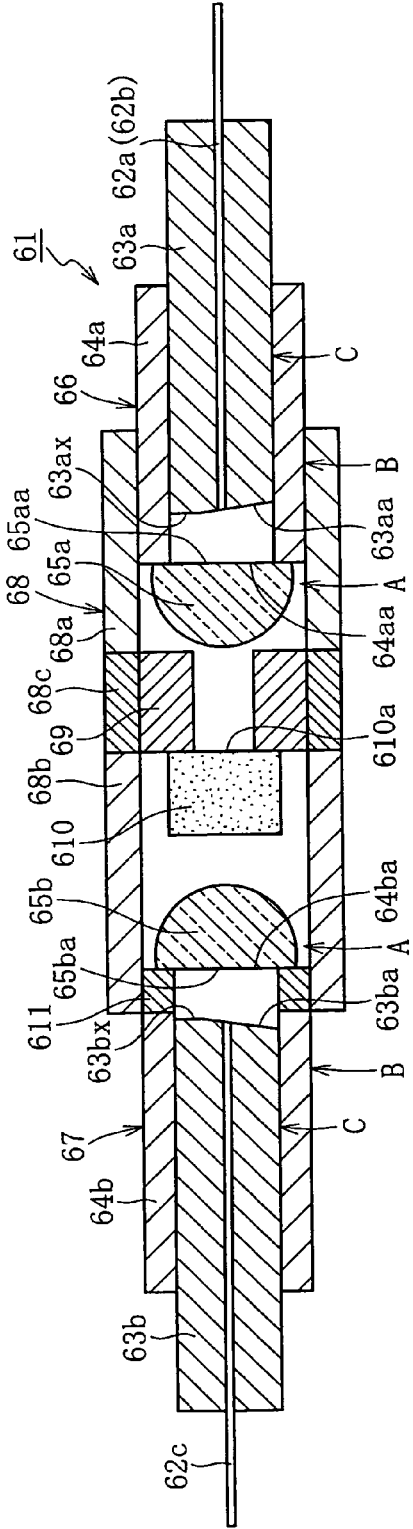
FIG. 26a is a horizontal sectional plan view showing a schematic structure of an optical device according to a twenty-fifth embodiment of the present invention.
Figure 26B:
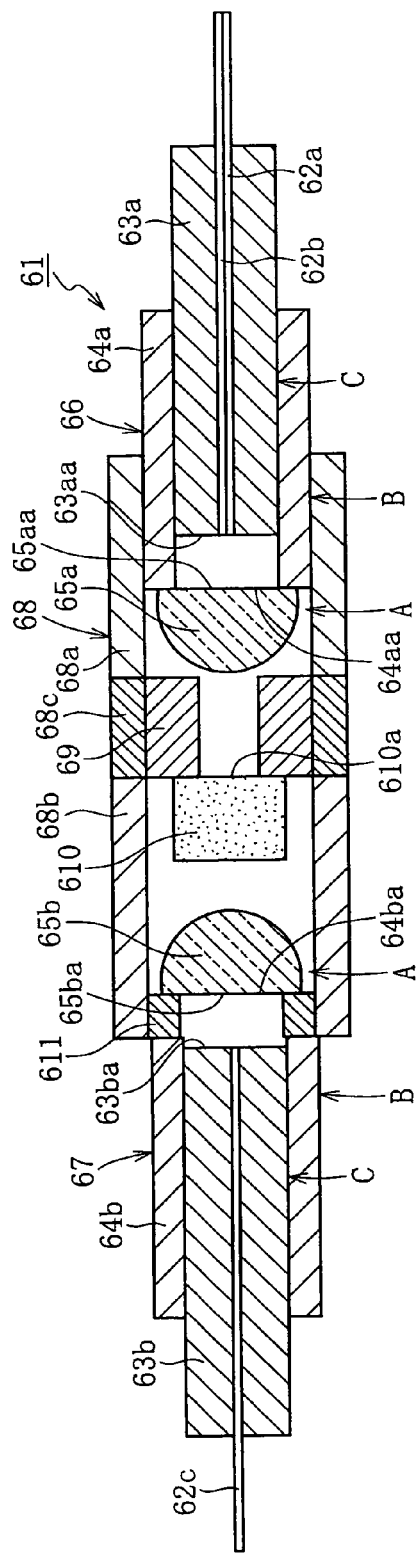
FIG. 26b is a vertical sectional side view thereof.

FIG. 26 shows a schematic structure of the optical device 61 according to a twenty-fifth embodiment of the present invention. The optical device 61 according to the twenty-fifth embodiment of the present invention differs from that of the above twenty-fourth embodiment in that the leading end surface 63aa of the first capillary tube 63a and the leading end surface 63ba of the second capillary tube 63b are symmetrically inclined in a plan view and are not inclined in a side view. Also with this structure, the same operational effects as those of the twenty-second embodiment of the present invention are obtained. The other structural features are the same as those of the sixth embodiment of the present invention, so the common components are denoted by the same reference symbols, and the descriptions of those will be omitted.

Figure 27A:
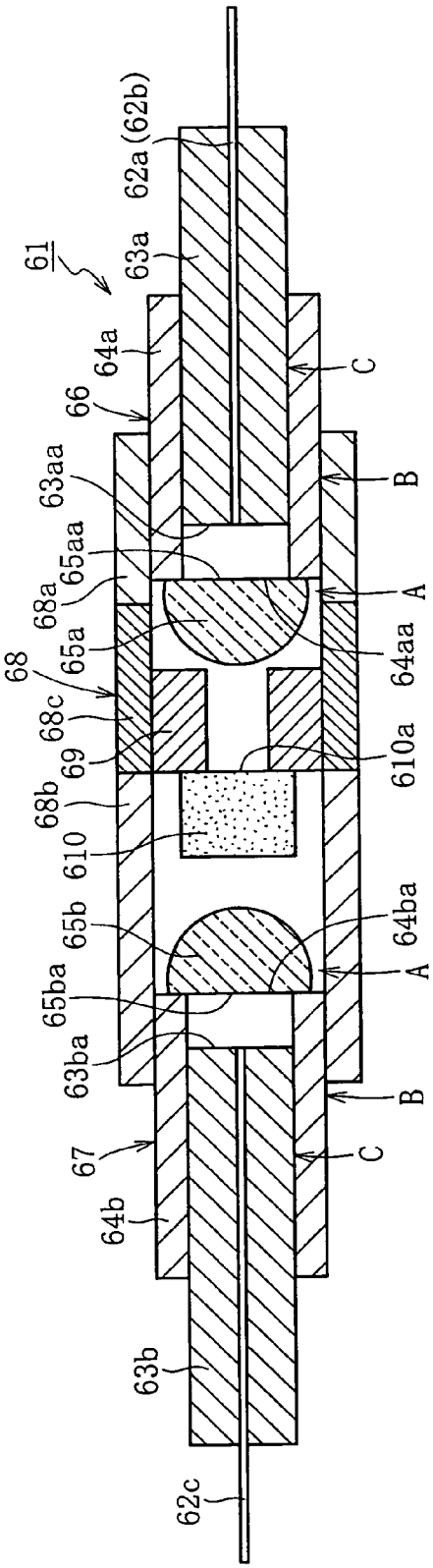
FIG. 27a is a horizontal sectional plan view showing a schematic structure of an optical device according to a twenty-sixth embodiment of the present invention.
Figure 27B:
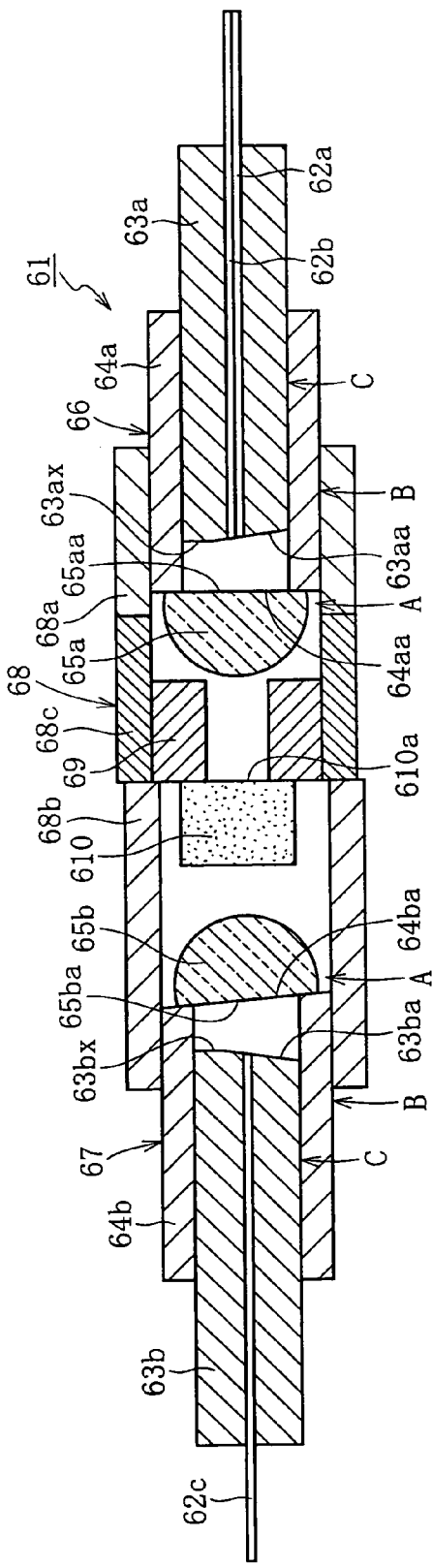
FIG. 27b is a vertical sectional side view thereof.

FIG. 27 shows a schematic structure of the optical device 61 according to a twenty-sixth embodiment of the present invention. The optical device 61 according to the twenty-sixth embodiment of the present invention differs from that of the above twenty-second embodiment in that the third accommodation sleeve 68c extends to such a position that covers an outer peripheral side of the first lens 65a to be longer than the mounting sleeve 69 in the axial direction. Also with this structure, the same operational effects as those of the twenty-second embodiment of the present invention are obtained. The other structural features are the same as those of the sixth embodiment of the present invention, so the common components are denoted by the same reference symbols, and the descriptions of those will be omitted.

Figure 28A:
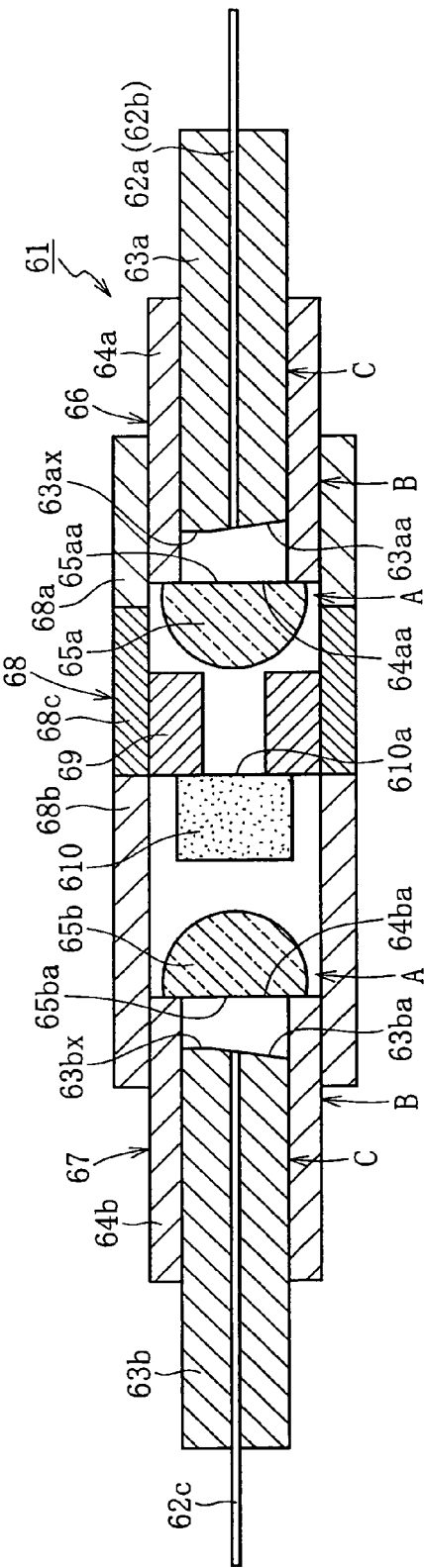
FIG. 28a is a horizontal sectional plan view showing a schematic structure of an optical device according to a twenty-seventh embodiment of the present invention.
Figure 28B:
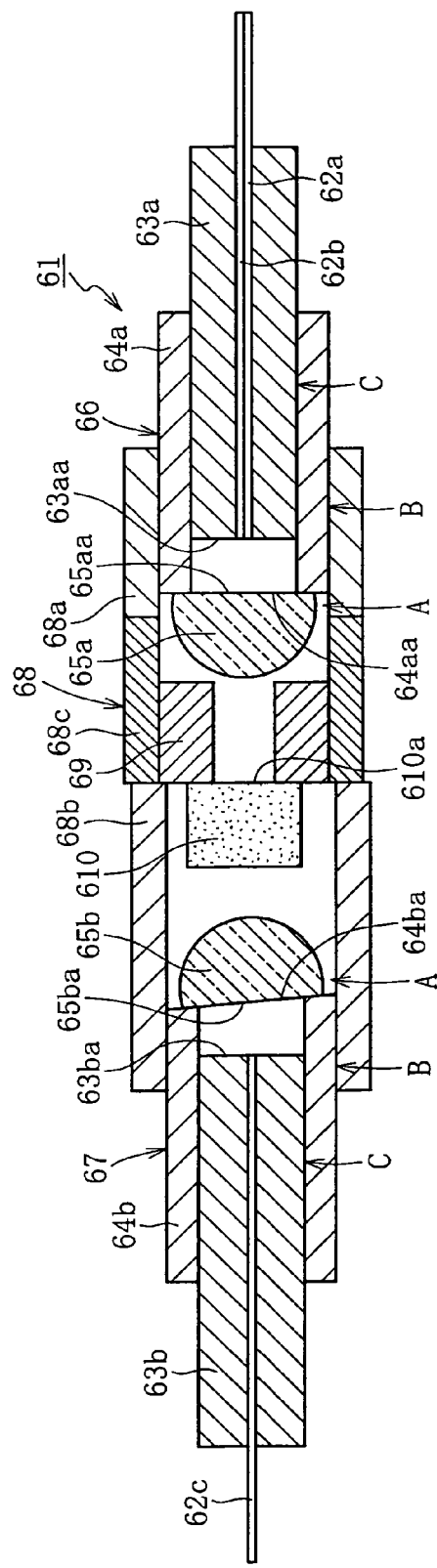
FIG. 28b is a vertical sectional side view thereof.

FIG. 28 shows a schematic structure of the optical device 61 according to a twenty-seventh embodiment of the present invention. The optical device 61 according to the twenty-seventh embodiment differs from that of the above twenty-sixth embodiment in that the leading end surface 63aa of the first capillary tube 63a and the leading end surface 63ba of the second capillary tube 63b are symmetrically inclined in a plan view and are not inclined in a side view. Also with this structure, the same operational effects as those of the twenty-sixth embodiment of the present invention are obtained. The other structural features are the same as those of the sixth embodiment of the present invention, so the common components are denoted by the same reference symbols, and the descriptions of those will be omitted.

FIG. 29 shows a schematic structure of the optical device 61 according to a twenty-eighth embodiment of the present invention. The optical device 61 according to the twenty-eighth embodiment of the present invention differs from that of the above twenty-sixth embodiment in that the first accommodation sleeve 68a, the second accommodation sleeve 68b, and the third accommodation sleeve 68c which are obtained by dividing the accommodation sleeve 68 into three are arranged and fixed on the same axis without being decentered, that the second retaining sleeve is divided into two in the axial direction, the auxiliary retaining sleeve 611 on the leading end side is inserted into the inner hole of the second accommodation sleeve 68b, and the retaining sleeve 64b on the base end side is fixed to the base end of the auxiliary retaining sleeve 611 while being decentered, and that the second lens 65b is fixed to the leading end of the auxiliary retaining sleeve 611 in the non-inclined state in both a plan view and a side view. Also with this structure, the same operational effects as those of the twenty-sixth embodiment of the present invention are obtained. The other structural features are the same as those of the sixth embodiment of the present invention, so the common components are denoted by the same reference symbols, and the descriptions of those will be omitted.

FIG. 30 shows a schematic structure of the optical device 61 according to a twenty-ninth embodiment of the present invention. The optical device 61 according to the twenty-ninth embodiment differs from that of the above twenty-eighth embodiment in that the leading end surface 63*aa* of the first capillary tube 63*a* and the leading end surface 63*ba* of the second capillary tube 63*b* are symmetrically inclined in a plan view and are not inclined in a side view. Also with this structure, the same operational effects as those of the twenty-sixth embodiment of the present invention are obtained. The other structural features are the same as those of the sixth embodiment of the present invention, so the common components are denoted by the same reference symbols, and the descriptions of those will be omitted.

The invention claimed is:

1. An optical device comprising:
    a first retaining sleeve having a first capillary tube retained therein, the first capillary tube having an optical fiber inserted thereinto and fixed thereto;
    a second retaining sleeve having a second capillary tube retained therein, the second capillary tube having an optical fiber inserted thereinto and fixed thereto; and
    a lens assembly which includes
        a first lens and a second lens each of which has one end surface provided with a spherical portion,
        an optical functional component, and
        an accommodation sleeve for accommodating the optical functional component;
    wherein the first lens is fixed to the accommodation sleeve with the spherical surface portion of the first lens abutted on a one end-side opening edge portion of the accommodation sleeve;
    wherein the second lens is fixed to the accommodation sleeve with the spherical surface portion of the second lens abutted on an another end-side opening edge portion of the accommodation sleeve; and
    wherein an end surface of the first retaining sleeve is fixed to one end surface of the accommodation sleeve, and an end surface of the second retaining sleeve is fixed to the other end surface of the accommodation sleeve.

2. The device of claim 1, further comprising:
    an inner sleeve fitted to an inner periphery of the accommodation sleeve;
    wherein the inner sleeve is fixed to the spherical surface portion of the first lens and an inner peripheral surface of the accommodation sleeve with one end side opening edge portion of the inner sleeve abutted on the spherical portion of the first lens; and
    wherein the optical functional component is fixed to an end surface of the inner sleeve opposite to the first lens.

3. The device of claim 2, wherein the one end-side opening edge portion of the accommodation sleeve is a first edge formed where the inner circumferential surface of the accommodation sleeve meets the one end surface of the accommodation sleeve,
    wherein the other end-side opening edge portion of the accommodation sleeve is a second edge formed where the inner circumferential surface of the accommodation sleeve meets the other end surface of the accommodation sleeve, and
    wherein the spherical surface portion of the first lens contacts the first edge of the accommodation sleeve, and the spherical surface portion of the second lens contacts the second edge of the accommodation sleeve.

4. The device of claim 2, wherein each of the first lens and the second lens is manufactured by machining a part of a spherical lens to have a flat surface portion, and
    wherein a shape of each of the first lens and the second lens is formed such that a line extending from a vertex of a spherical surface of the spherical surface portion to the flat surface portion through a center of curvature is longer than a radius of curvature of the spherical surface portion.

5. The device of claim 1, wherein the one end-side opening edge portion of the accommodation sleeve is a first edge formed where the inner circumferential surface of the accommodation sleeve meets the one end surface of the accommodation sleeve,
    wherein the other end-side opening edge portion of the accommodation sleeve is a second edge formed where the inner circumferential surface of the accommodation sleeve meets the other end surface of the accommodation sleeve, and
    wherein the spherical surface portion of the first lens contacts the first edge of the accommodation sleeve, and the spherical surface portion of the second lens contacts the second edge of the accommodation sleeve.

6. The device of claim 1, wherein each of the first lens and the second lens is manufactured by machining a part of a spherical lens to have a flat surface portion, and
    wherein a shape of each of the first lens and the second lens is formed such that a line extending from a vertex of a spherical surface of the spherical surface portion to the flat surface portion through a center of curvature is longer than a radius of curvature of the spherical surface portion.

* * * * *